(12) United States Patent
Pinto et al.

(10) Patent No.: US 9,740,507 B2
(45) Date of Patent: Aug. 22, 2017

(54) INTERACTING WITH REMOTE APPLICATIONS DISPLAYED WITHIN A VIRTUAL DESKTOP OF A TABLET COMPUTING DEVICE

(75) Inventors: Gus Pinto, Boca Raton, FL (US); David Koretsky, Boca Raton, FL (US); Adam Marano, Parkland, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1495 days.

(21) Appl. No.: 13/078,846

(22) Filed: Apr. 1, 2011

(65) Prior Publication Data
US 2011/0246904 A1 Oct. 6, 2011

Related U.S. Application Data

(60) Provisional application No. 61/320,249, filed on Apr. 1, 2010.

(51) Int. Cl.
| G06F 3/14 | (2006.01) |
| G06F 9/44 | (2006.01) |
| H04L 29/08 | (2006.01) |

(52) U.S. Cl.
CPC ............ G06F 9/4445 (2013.01); *H04L 67/08* (2013.01)

(58) Field of Classification Search
CPC .................................... G06F 3/14; G06F 3/17
USPC ......... 715/200–277, 700–867; 700/701–866; 709/201–229; 705/50–79; 345/30–111; 345/173; 707/610; 717/177; 718/1
See application file for complete search history.

(56) References Cited

U.S. PATENT DOCUMENTS

| 7,725,737 B2* | 5/2010 | Konanka et al. ............. 713/190 |
| 8,245,129 B2* | 8/2012 | Wilkinson et al. ........... 715/236 |
| 2005/0231517 A1 | 10/2005 | Tuli |

(Continued)

FOREIGN PATENT DOCUMENTS

| CN | 101017411 | 8/2007 |
| WO | WO-2009/143294 | 11/2009 |

OTHER PUBLICATIONS

Chinese Office Action on 201180027146.X dated May 20, 2013.
(Continued)

*Primary Examiner* — Ruay Ho
(74) *Attorney, Agent, or Firm* — Foley & Lardner LLP; John D. Lanza; James De Vellis

(57) ABSTRACT

Virtual desktops generated by a virtual desktop application locally executing on a tablet computing device, can further display remote applications. The tablet computing device executes an operating system that does not contemplate a mouse pointer and that displays a native desktop. In many instances, the virtual desktop is displayed on the tablet computing device such that the virtual desktop appears to be the native desktop. The virtual desktops therefore include a mouse pointer which can be used to interact with the remote applications. The remote applications generate graphical application output when they execute on a remote server. The graphical application output is transmitted to the tablet computing device and displayed in an application output window displayed within the virtual desktop. Using a virtual trackpad or other virtual input device, a user can interact with the remote applications via the application output displayed on the virtual desktop.

20 Claims, 41 Drawing Sheets

(56) References Cited

U.S. PATENT DOCUMENTS

| | | | |
|---|---|---|---|
| 2007/0056009 A1 | 3/2007 | Spilo et al. | |
| 2007/0180449 A1* | 8/2007 | Croft et al. | 718/1 |
| 2008/0248834 A1 | 10/2008 | Chatterjee et al. | |
| 2008/0320145 A1* | 12/2008 | Rivera | 709/227 |
| 2009/0100129 A1 | 4/2009 | Vigil et al. | |
| 2009/0276771 A1* | 11/2009 | Nickolov et al. | 717/177 |
| 2010/0122196 A1* | 5/2010 | Wetzer et al. | 715/769 |
| 2010/0138780 A1* | 6/2010 | Marano et al. | 715/804 |
| 2010/0245260 A1* | 9/2010 | Louch | 345/173 |
| 2010/0299436 A1* | 11/2010 | Khalid et al. | 709/226 |
| 2010/0306381 A1* | 12/2010 | Lublin et al. | 709/226 |
| 2011/0137974 A1* | 6/2011 | Momchilov | 709/202 |
| 2011/0225513 A1* | 9/2011 | Lauwers et al. | 715/756 |
| 2011/0251992 A1* | 10/2011 | Bethlehem et al. | 707/610 |
| 2012/0079080 A1* | 3/2012 | Pishevar | 709/220 |

OTHER PUBLICATIONS

International Preliminary Report on Patentability on PCT/US2011/031025 dated Oct. 11, 2012.
International Search Report on PCT/US2011/031025 dated Sep. 23, 2011.
Written Opinion on PCT/US2011/031025 dated Sep. 23, 2011.
Chinese Office Action on 201180027146.X dated Nov. 25, 2013.

* cited by examiner

INTERACTING WITH REMOTE APPLICATIONS DISPLAYED WITHIN A VIRTUAL DESKTOP OF A TABLET COMPUTING DEVICE

RELATED APPLICATIONS

This patent application claims priority to U.S. Provisional Patent Application Ser. No. 61/320,249, filed on Apr. 1, 2010, the disclosure of which is considered part of the disclosure of this application and is herein incorporated by reference in its entirety.

FIELD OF THE DISCLOSURE

This application generally relates to displaying and controlling remote applications displayed on a tablet computing device. In particular this application relates to displaying and controlling applications within a virtual desktop displayed on a tablet computing device.

BACKGROUND OF THE DISCLOSURE

Tablet computers and computing devices typically execute operating systems that execute within a paradigm where user input is generated using a touch screen. Many of today's tablet computers are designed to capture and process touch input and many of the applications displayed on tablet computers are designed to accommodate a paradigm where user input is generated using a touch screen. Some applications are designed specifically for a tablet operating system environment such that a user can interact with menus, input fields and other application interface elements through a touch screen.

There exist various applications that are not configured to operate within a system paradigm where a touch screen is the primary means by which user input is received. Many of these applications are configured to execute within a system that contemplates the availability of both a mouse pointer and a mouse. In most cases, the different environments pose few problems because applications that are not configured to execute on a tablet typically cannot be loaded or executed on a tablet computer. Issues may arise when a user remotely accesses an application that is not designed to execute on a tablet computer.

There exist remote access applications which allow users to remotely display and interact with remote applications on a tablet computer. These applications display remote applications that execute on a remote computer and in most cases within an environment that contemplates the existence of a mouse pointer and a mouse. When a user accesses these applications from a tablet computer that does not provide a mouse pointer and that does not contemplate the use of a mouse, the user may be unable to successfully interact with all the elements of the remote application. Thus a need exists for a system that displays a mouse pointer on a computer that executes an operating system which does not otherwise provide a mouse pointer. Further, a need exists for a way to control movement of the mouse pointer throughout the desktop of the tablet computer.

SUMMARY OF THE DISCLOSURE

In one aspect, described herein are methods and systems for displaying remote applications within a virtual desktop and controlling displayed remote applications using device mouse pointer displayed within the virtual desktop. Tablet computing devices often execute operating systems that do not contemplate the use of a mouse pointer. These operating systems are designed to function within a system paradigm that contemplates primarily receiving input through a touch screen. Remote applications typically execute within a system paradigm that contemplates receiving a portion of user input through a mouse or pointing device. In many instances, these remote applications are designed to interact with a mouse pointer. For this reason, some of the functionality of the remote application may be unavailable to an end user when they interact with the remote application within the tablet computing system paradigm that does not contemplate the use of a mouse pointer. Systems and methods that display a virtual desktop over a native desktop of a tablet computing device, where the virtual desktop includes a mouse pointer, can overcome the inherent limitations presented when a remote application designed to execute within a system paradigm that contemplates a mouse pointer is displayed within a tablet system paradigm that does not contemplate a mouse pointer.

In another aspect, described herein are methods for interacting with a remote application displayed within a virtual desktop on a tablet computing device using a mouse pointer. In some instances, a virtual desktop application executes locally on the tablet computing device to generate and display a virtual desktop. In other instances, a virtual desktop locally executes on the tablet computing device. The tablet locally executes an operating system that generates and displays a native desktop. In some embodiments, the tablet computing device operating system does not contemplate a mouse pointer. The virtual desktop can be displayed within a context of the native desktop such that the virtual desktop appears to be the native desktop. A mouse pointer can be displayed within the virtual desktop. The virtual desktop can receive a request from a user of the tablet computing device to execute a remote application within a context of the virtual desktop. The user request can be transmitted to a remote server over a virtual channel. In response to receiving the user request, the remote server can execute the remote application and transmit application output generated by the remote application to the tablet computing device. Upon receiving the application output, the tablet computing device can display the application output within an application output window that is displayed within a context of the virtual desktop. An end user can then interact with the remote application using the mouse pointer.

In some embodiments, icons representative of remote applications are displayed within the virtual desktop. The remote applications corresponding to the displayed icons, in one embodiment, are applications that are not available within the native desktop. In other embodiments, displaying the icons further includes receiving from the remote server a list of user applications that correspond to the user of the tablet computing device. Upon receiving the list, application icons are displayed on the virtual desktop where each application icon corresponds to a listed user application.

The virtual desktop, in some embodiments, can comprise one or more customizations of the native desktop. In some instances, customizations can include displaying a wallpaper of the native desktop on a background of the virtual desktop. In other instances, customizations can include displaying elements within the virtual desktop according to a theme of the native desktop.

In one embodiment, the mouse pointer displayed within the virtual desktop can be controlled using a virtual trackpad. The virtual trackpad, in some embodiments, comprises an interactive image of a trackpad displayed within the virtual desktop.

In another embodiment, the mouse pointer displayed within the virtual desktop can be controlled using an external input device. In some instances, the external input device can include a virtual trackpad.

In yet another aspect, described herein are methods for interacting with a remote application displayed within a virtual desktop on a tablet computing device using a mouse pointer. In some instances, a virtual desktop application executes locally on the tablet computing device to generate and display a virtual desktop. In other instances, a virtual desktop locally executes on the tablet computing device. The tablet locally executes an operating system that generates and displays a native desktop. In some embodiments, the tablet computing device operating system does not contemplate a mouse pointer. The virtual desktop can be displayed within a context of the native desktop such that the virtual desktop appears to be the native desktop. A mouse pointer can be displayed within the virtual desktop. In some instances, a user of the tablet computing device can control the mouse pointer using an interactive trackpad displayed within the virtual desktop. The virtual desktop can receive a request from a user of the tablet computing device to execute a remote application within a context of the virtual desktop. The user request can be transmitted to a remote server over a virtual channel. In response to receiving the user request, the remote server can execute the remote application and transmit application output generated by the remote application to the tablet computing device. Upon receiving the application output, the tablet computing device can display the application output within an application output window that is displayed within a context of the virtual desktop. An end user can then interact with the remote application using the mouse pointer.

Embodiments of this aspect can include displaying icons representative of remote applications within the virtual desktop. The remote applications corresponding to the displayed icons, in one embodiment, are applications that are not available within the native desktop. In other embodiments, displaying the icons further includes receiving from the remote server a list of user applications that correspond to the user of the tablet computing device. Upon receiving the list, application icons are displayed on the virtual desktop where each application icon corresponds to a listed user application.

In still another aspect, described herein is a system for interacting with a remote application that is displayed within a desktop, wherein a user can interact with the remote application using a mouse pointer. The system can include a tablet computing device that executes an operating system which generates and displays a native desktop. In some instances, the tablet computing device operating system does not contemplate a mouse pointer. The system can further include a virtual desktop that is generated by a virtual desktop application. The virtual desktop can be displayed within a context of the native desktop such that the virtual desktop appears to be the native desktop. In some instances, the virtual desktop can include a mouse pointer. The virtual desktop application can locally execute on the tablet computing device, and can receive a request from a user of the tablet computing device to execute a remote application within a context of the virtual desktop. The received user request can be transmitted to a remote server over a virtual channel, and application output generated by the remote application executing on the server can be displayed. The application output can be displayed in an application output window that is further displayed within a context of the virtual desktop. A user of the tablet computing device can interact with the remote application using the mouse pointer.

In some embodiments, the virtual desktop can further include a virtual trackpad. A user of the tablet computing device can control the movement of the mouse pointer using the virtual trackpad. In some embodiments, controlling the movement of the mouse pointer can include capturing user input from the virtual trackpad and repositioning the mouse pointer according to the captured user input.

In some embodiments, the system can include a virtual desktop that further includes icons representative of remote applications.

In other embodiments, the server can respond to receiving the user request by executing the remote application identified in the request. Upon executing the application, the server can transmit the application output generated by the remote application to the tablet computing device.

BRIEF DESCRIPTION OF THE DRAWINGS

The following figures depict certain illustrative embodiments of the methods and systems described herein, in which like reference numerals refer to like elements. These depicted embodiments are to be understood as illustrative of the disclosed methods and systems and not as limiting in any way.

DETAILED DESCRIPTION OF THE DRAWINGS

Figure 1A:
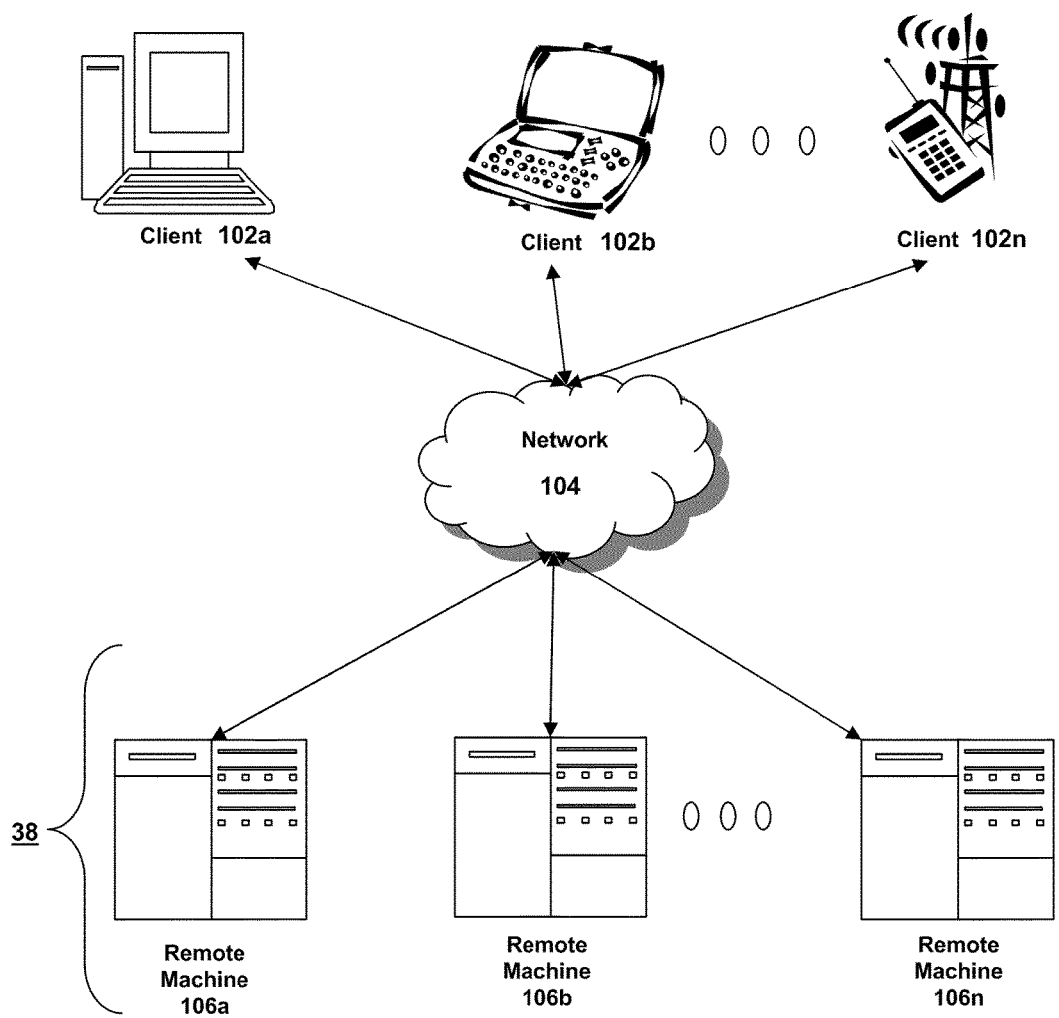
FIG. 1A depicts embodiments of network environments that provide remote access to computing devices that can execute application programs.

The methods, systems and apparatus described herein are not limited to the specific devices, methods, applications, conditions or parameters described and/or shown herein. It is to be appreciated that certain features of the methods, systems and structures described herein are described in the context of separate embodiments, and may be provided in any combination or sub-combination of the embodiments described herein.

The following terminology is used throughout this disclosure:

As used herein, a tablet computing device can be any mobile computing device. For example, a tablet computing device can be an IPAD, MOTOROLA XOOM, DELL STREAK, ARCHOS, BLACKBERRY PLAYBOOK, AMAZON KINDLE, FUJITSU LIFEBOOK, HP SLATE, NETBOOK NAVIGATOR, TOSHIBA PORTEGE, SAMSUNG GALAXY, VIEWSONIC VIEWPAD, or any other table computer. A tablet computing device can execute any of the following operating systems: ANDROID operating system, WINDOWS operating system, iOS published by APPLE, BLACKBERRY OS, or any other operating system or embedded operating system suitable for executing on a tablet computer. In some embodiments, a mobile computing device or mobile device, as these terms are used herein, refers to a tablet computing device.

As used herein, a virtual desktop can be any desktop application able to display application output generated by applications executing in a remote location. In some embodiments, a virtual desktop application can be a CITRIX XENDESKTOP. In other embodiments, a virtual desktop can be a desktop application executing locally on a tablet computing device, but configured to display remote applications. In still other embodiments, a virtual desktop can be a virtual machine executing remotely, locally or both on a tablet computing device. Virtual desktops can execute locally on a tablet computing device or they can execute remotely on an external computer and can be transmitted or streamed to the tablet computing device.

As used herein, displaying something within the context of something else can mean that, for example, an application is displayed within a desktop. When that application is a remote application, the remote application can be displayed within a virtual desktop. Another example can be when a virtual desktop is displayed within the context of a native desktop. In some embodiments, this can mean that the virtual desktop is displayed overtop of the native desktop such that the virtual desktop appears to be the native desktop. The native desktop, although not visible, continues to execute and can be accessed by closing the virtual desktop. In this example, the virtual desktop is displayed within a context of the native desktop.

For purposes of reading the description of the various embodiments below, the following descriptions of the sections of the specification and their respective contents may be helpful:

Section A describes embodiments of a computing environment;

Section B describes displaying a virtual desktop on multiple display screens;

Section C describes displaying and interacting with a virtual resource on a mobile device; and Section D describes displaying and interacting with applications displayed within a virtual desktop.

Section A: Embodiments of a Computing Environment

FIG. 1A illustrates one embodiment of a computing environment 101 that includes one or more client machines 102A-102N (generally referred to herein as "client machine(s) 102") that are in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can mange client/server connections, and in some cases can load balance client connections amongst a plurality of backend servers.

The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 102 can be a virtual machine 102C. The virtual machine 102C can be any virtual machine, while in some embodiments the virtual machine 102C can be any virtual machine managed by a hypervisor developed by XenSolutions, Citrix Systems, IBM, VMware, or any other hypervisor. In other embodiments, the virtual machine 102C can be managed by any hypervisor, while in still other embodiments, the virtual machine 102C can be managed by a hypervisor executing on a server 106 or a hypervisor executing on a client 102.

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The server 106, in some embodiments, executes a remote presentation client or other client or program that uses a thin-client or remote-display protocol to capture display output generated by an application executing on a server 106 and transmits the application display output to a remote client 102. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 1B:
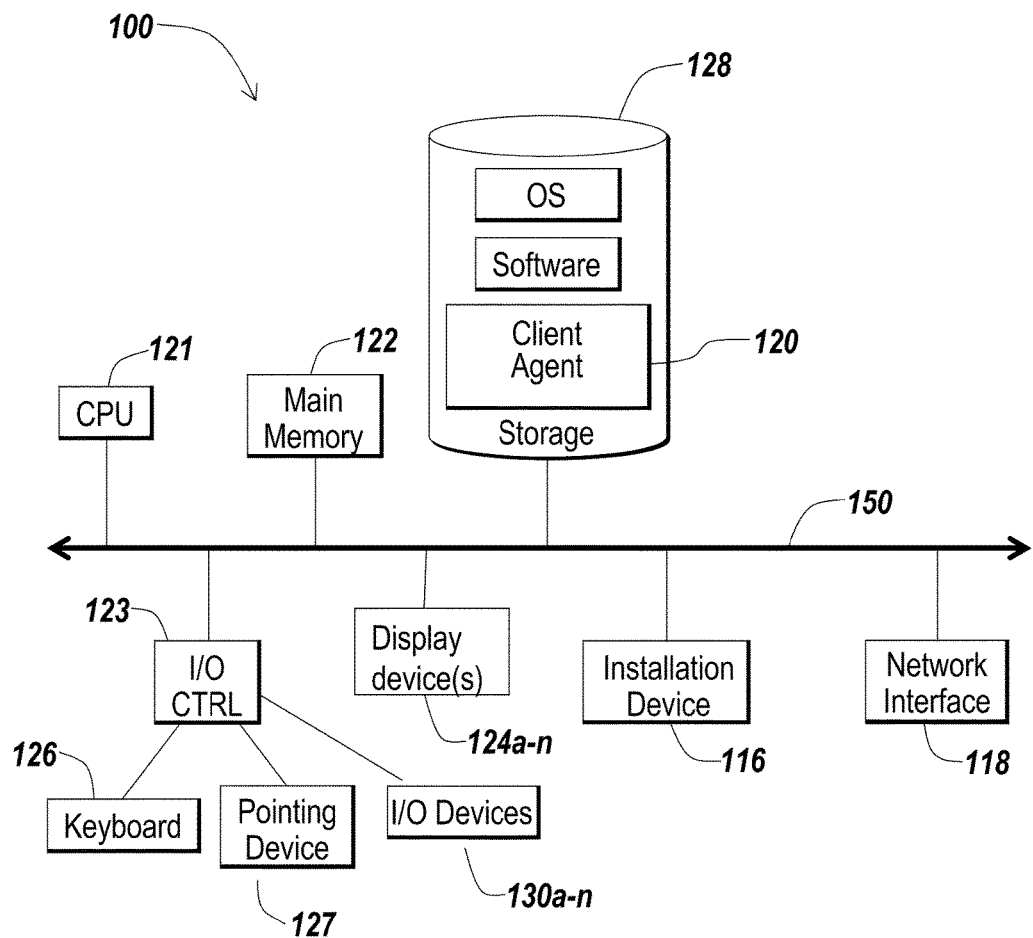
FIG. 1B and FIG. 1C are block diagrams that depict embodiments of computing devices.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
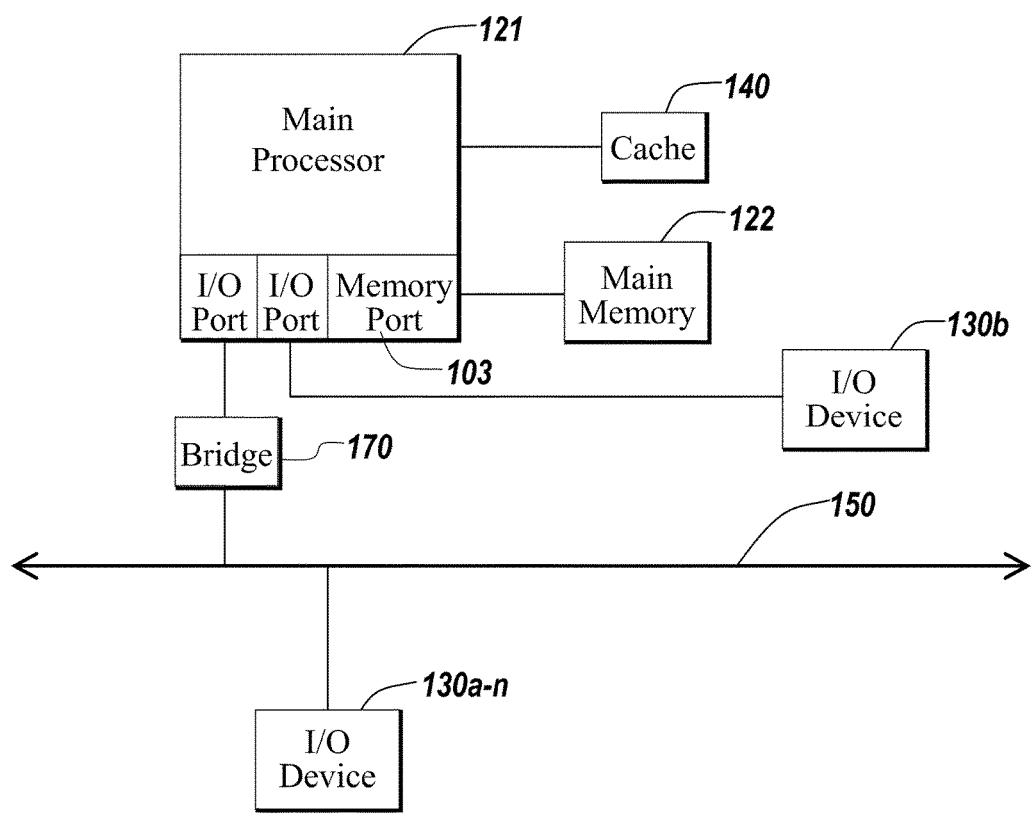

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121, may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a MicroChannel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N, these configurations include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments, the computing machine 100 can execute any operating system, while in other embodiments the computing machine 100 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95c1, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; the iPad manufactured by Apple Computer; Palm Pre; a Pocket PC; a Pocket PC Phone; or any other handheld mobile device.

Section B: Displaying a Virtual Desktop on Multiple Display Screens

Figure 2A:
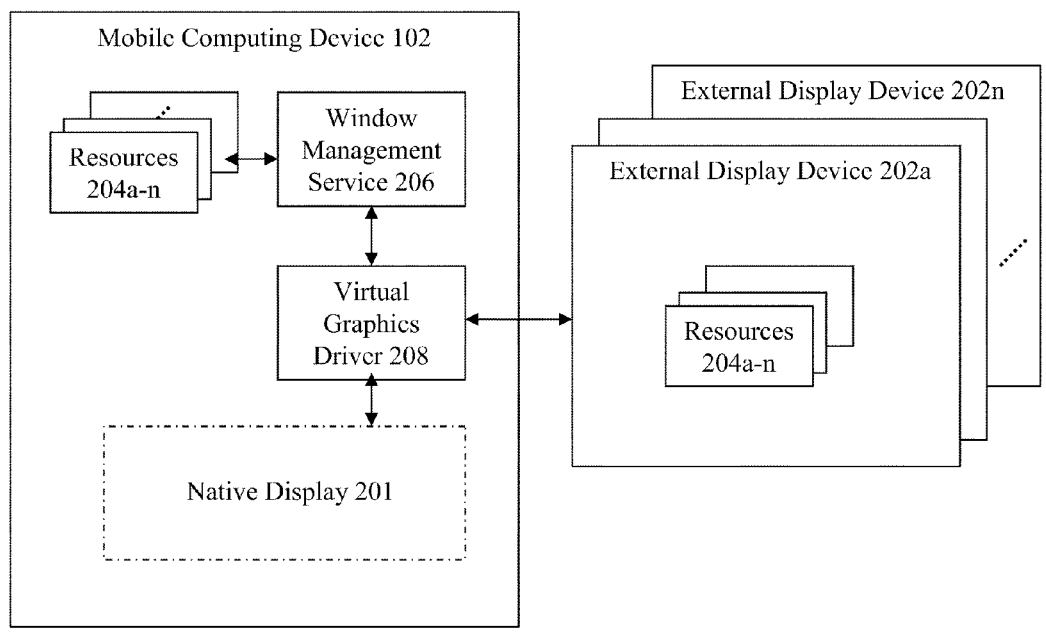
FIG. 2A is a block diagram depicting one embodiment of a system for displaying a plurality of resources in a user-configurable display layout on an external display device.

Referring now to FIG. 2A, a block diagram depicts one embodiment of a system for displaying a plurality of resources on one or more display devices. In brief overview, the system includes a mobile computing device 102 that may communicate with one or more external display devices 202*a-n*. The embodiment in FIG. 2A shows a mobile computing device 102 with a native display 201, although devices without native displays may be used in other embodiments. The mobile computing device 102 executes a plurality of resources 204*a-n* (collectively, 204). The window management system 206 and virtual graphics driver 208 manage the locations and sizes of the display of output data associated with each of the plurality of resources in a user-configurable display layout. In many embodiments, the mobile computing device 102 transmits the output data associated with each of the plurality of resources 204 to an external display device 202. In some of these embodiments, the mobile computing device 102 transmits the output data upon establishing a connection with the external display device 202. In various embodiments, the mobile computing device 102 transmits the output data associated with each of the plurality of resources 204 to the device's native display 201. In many embodiments, the mobile computing device 102 transmits the output data associated with certain of the plurality of resources 204 to the native display 201 and transmits the output data associated with other of the plurality of resources 204 to the external display devices 202*a-n*.

Referring now to FIG. 2A, and in greater detail, a mobile computing device 102 executes a plurality of resources 204. In one embodiment, the mobile computing device 102 is a client 102 as described above in connection with FIGS. 1A-1C. In another embodiment, the mobile computing device 102 displays the output data associated with a resource 204*a* in a plurality of resources 204*a-n* executed by the mobile computing device 102. In some embodiments, the mobile computing device 102 displays the output data associated with each of the plurality of resources 204. In one embodiment, a resource in the plurality of resources 204 may include, without limitation, a data file, an executable file, configuration files, an application, a desktop environment (which may itself include a plurality of applications for execution by the user), a computing environment image (such as a virtual machine image), and/or operating system software or other applications needed to execute a computing environment image.

In one embodiment, the mobile computing device 102 includes a window management service 206 allowing an external display device 202 to display the output data associated with each of a plurality of resources 204 executed on the mobile computing device 102. In still another embodiment, the window management service 206 allows multiple resources running on the mobile computing device 102 to be viewed on an external display device 202 or the native display 201 at substantially the same time, as opposed to allowing the output of one resource 204 to be viewed exclusively on the native display 201 or external display device 202. In yet another embodiment, the window management service 206, in conjunction with a virtual graphics driver 208, manages the display layout of the windows displayed on the external display device 202 and the native display 201. In some embodiments, the virtual graphics driver 208 is a driver-level component that manages a virtual screen frame buffer storing output data that will be displayed by the native display 201 on the mobile computing device 102 or an external display device 202. In one of these embodiments, the window management service 206, in conjunction with the virtual graphics driver 208, manages the boundaries and size of a screen space used to display output data and on which display device the output data is displayed.

In some embodiments, an external display device 202 receives output data associated with each of the plurality of resources 204 and displays the output data in a user-configurable display layout. In one embodiment, the external display device 202 includes a dock to which the mobile computing device 102 connects. In another embodiment, the external display device 202 includes a receiver for communicating with the mobile computing device 102 wirelessly, for example, via BLUETOOTH, Wi-Fi or other networking protocols, as described above in connection with FIGS. 1A-1C. In still another embodiment, the external display device 202 is a display device 124 as described above in connection with FIG. 1B-1C.

Figure 2B:
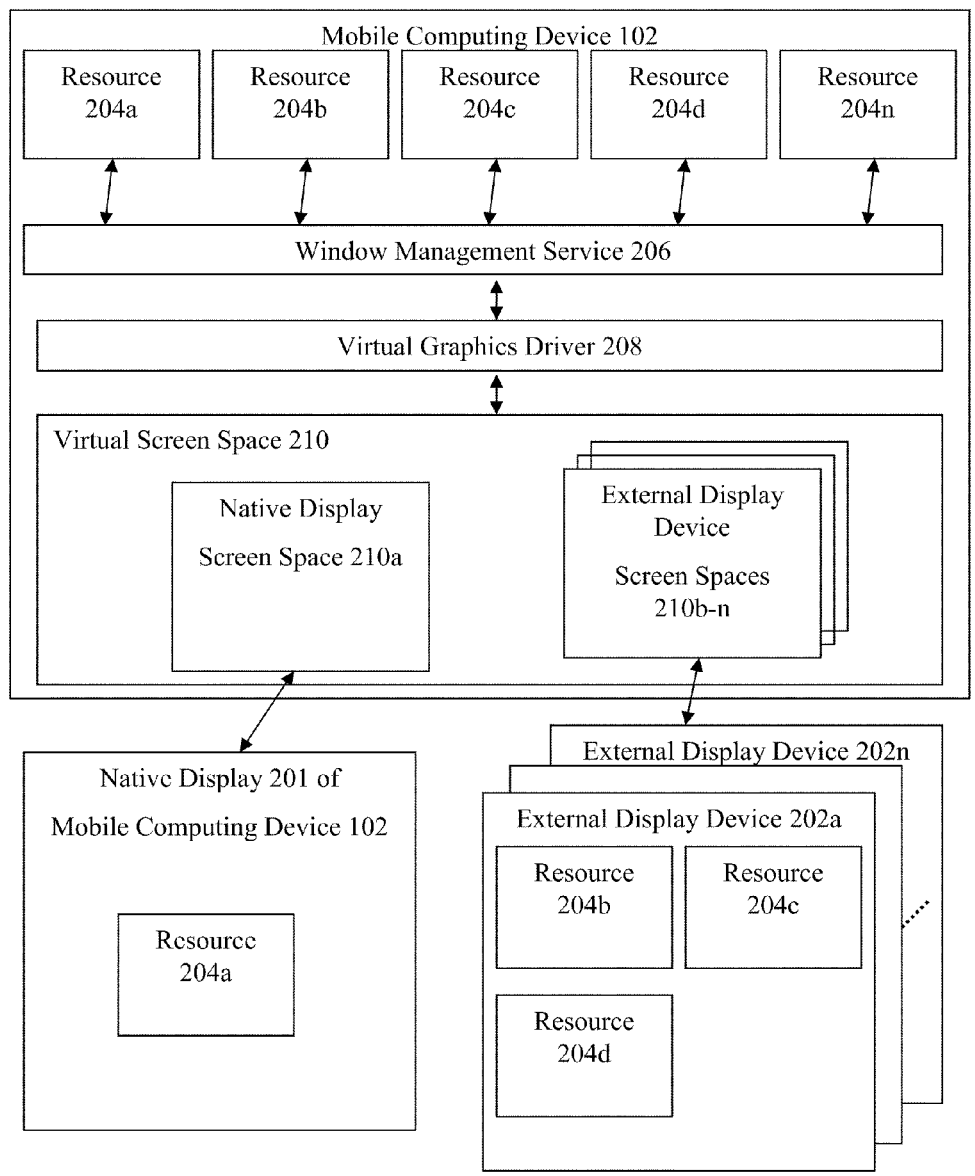
FIG. 2B is a block diagram depicting a system for mapping a display of one or more resources to one or more display devices.

Referring now to FIG. 2B, a block diagram depicts one embodiment of a system for mapping the display of one or more resources 204 of the mobile computing device 102 on one or more display devices 201 and/or 202. In various embodiments, the window management service 206 manages a virtual screen space 210. The virtual screen space 210 may map to the native display 201 and one or more external display devices 202. The window management service 206 may position output data associated with the user interfaces of one or more resources 204 on the virtual screen space 210 to specify where each user interface will be displayed. In some embodiments, the window management service 206 positions the output data according to a user preference. In additional embodiments, the window management service 206 positions the output data according to a policy. In various embodiments, the window management service 206 positions the output data based on the resource 204 associated with the output data.

The window management service 206 communicates with the virtual graphics driver 208 to transmit output data associated with user interfaces of resources 204 to the native display 201 and one or more external display devices 202. In some embodiments, the window management service 206 may transmit output data and associated coordinates from the virtual screen space 210 to the virtual graphics driver 208. In various embodiments, the virtual graphics driver 208 stores the output data in a virtual screen frame buffer. In many embodiments, the virtual graphics driver 208 transmits the entries in the virtual screen frame buffer to the native display 201 and external display devices 202. In many embodiments, the virtual graphics driver 208 transmits an entry in the virtual screen frame buffer to a native display 201 or an external display device 202 based on the position of the entry in the frame buffer.

Figure 2C:
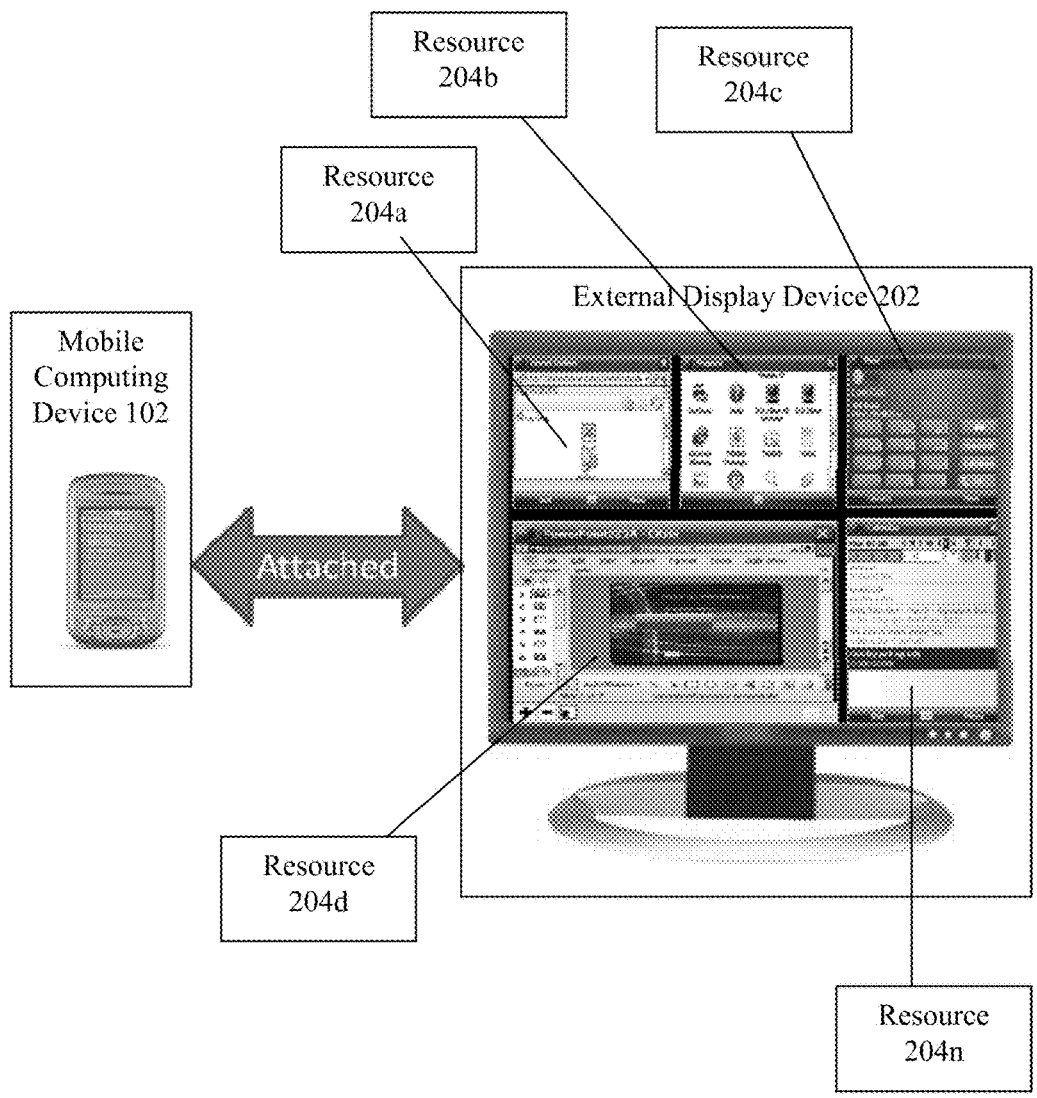
FIG. 2C is a screen shot depicting one embodiment of a system for displaying a plurality of resources in a user-configurable display layout on an external display device, the user-configurable display layout divided into a grid.

Referring now to FIG. 2C, a screen shot depicts one embodiment of a user-configurable display layout in which the external display device 202 displays the output data of the resources 204. In this embodiment, the output data of the resources 204 is displayed in a grid display layout. The grid display layout may include one or more cells in an arrangement. A cell may display output data associated with a resource. In some embodiments, more than one cell displays output data associated with the same resource.

In some embodiments, the cells are uniformly sized, whereas in other embodiments, the cells have different sizes. The cells may be arranged in any configuration. In some embodiments, the cells may be arranged in rows, columns, or both. A cell may have a descriptor associated with the cell's position in the grid. The descriptor may indicate the position of a cell within a row. In the embodiment depicted in FIG. 2C, the cell for resource 204*a* may have the descriptor "1-1," the cell for resource 204*b* may have the descriptor "1-2," the cell for resource 204*c* may have the descriptor "1-3," the cell for resource 204*d* may have the descriptor "2-1," and the cell for resource 204d may have the descriptor "2-2." In other embodiments, the cells may be numbered, e.g. "Cell 1," "Cell 2," etc. However, any system of choosing descriptors known to those of ordinary skill in the art may be used.

In various embodiments, the window management service 206 configures a grid display layout according to the resources 204 being displayed on the native display 201 or the external display device 202. In some embodiments, the service 206 configures a grid display layout according to the number of resources 204 being displayed. In other embodiments, the service 206 configures a grid display layout according to the size or amount of content in the user interfaces of the resources 204. For example, if an external display device 202 will display four resources with comparable amounts of content, the window management service 206 may configure a grid display layout with four uniform cells. In another example, if an external display device 202 will display four resources and one resource includes three times as much content as the others, the window management service 206 may configure a grid display layout with three uniform cells in a first row and a single cell in a second row. The single cell in the second row may be three times as wide as the cells in the first row. In various embodiments, the window management service 206 may configure a grid display layout to reserve a cell for displaying information about the resources being displayed, such as a menu of the resources. In many embodiments, the window management service 206 may configure a grid display layout to reserve a cell for allowing a user to configure the grid display layout.

Figure 2D:
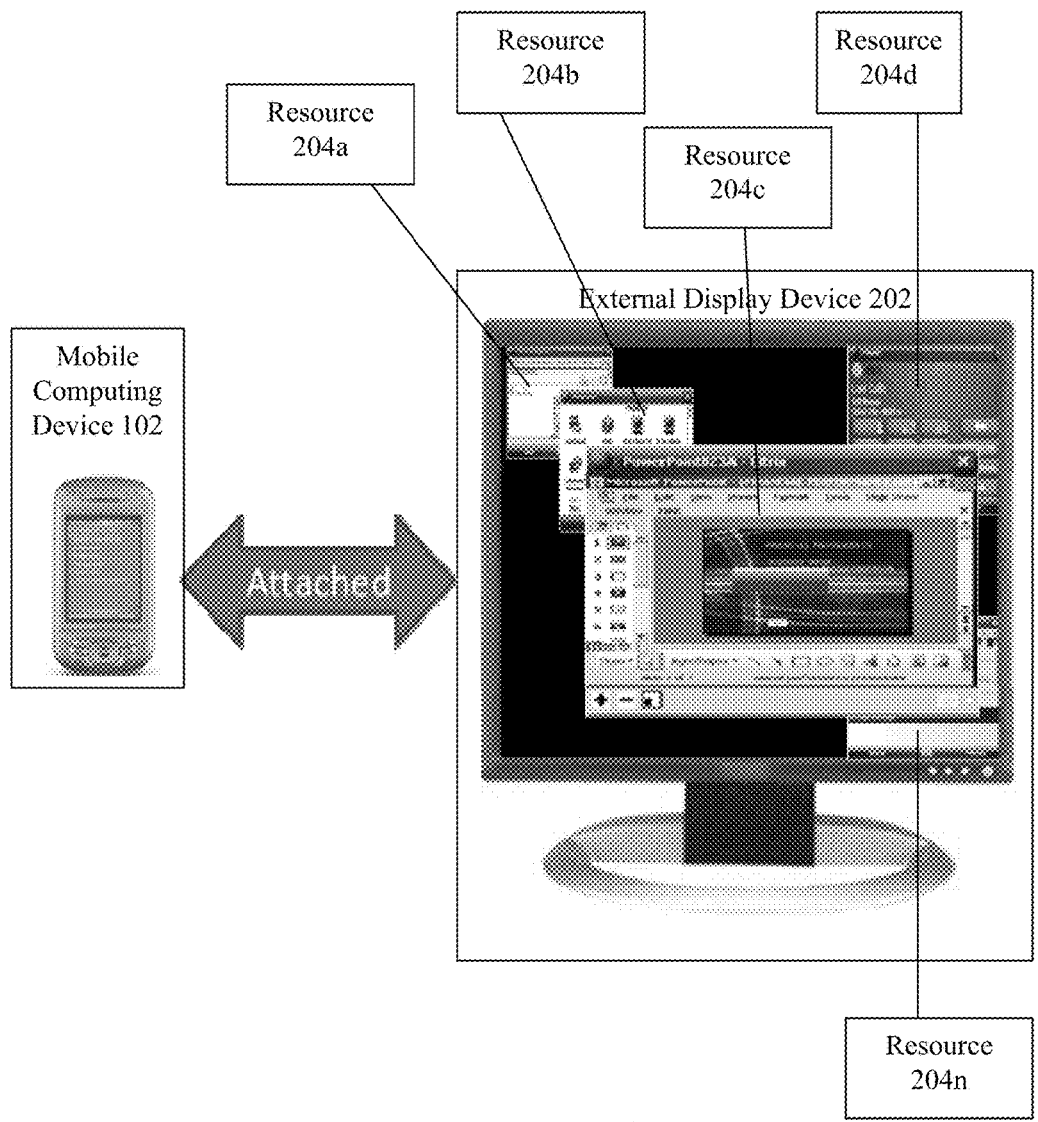
FIG. 2D is a screen shot depicting one embodiment of a system for displaying a plurality of resources in a user-configurable, dynamic display layout on an external display device.

Referring now to FIG. 2D, a screen shot depicts one embodiment of a user-configurable display layout providing a dynamic display layout in which the external display device 202 displays the output data associated with the plurality of resources 204. In this embodiment, windows on the external display device 202 that display output data for resources 204 may be dynamically positioned and sized. The window management service 206 may position a user interface for a resource at a default position and with a default size chosen according to a policy, the resource 204, or any other method. The window management service 206 may order overlapping user interfaces such that higher-order user interfaces obscure lower-order user interfaces. The window management service 206 may transmit output data to the virtual graphics driver 208 reflecting the obfuscation. The user may re-position or re-size a window by, for example, clicking and dragging the window or a window edge. In these embodiments, the virtual graphics driver 208 may detect the user's change to the window, and transmit information about the user's change to the window management service 206. The window management service 206 may process the change and transmit updated output data to the virtual graphics driver 208. In some embodiments, the user moves the user interface for a resource 204 to any location on a native display 201 or external display device 202. In some embodiments, the user moves the user interface for a resource 204 to a different display device. In some embodiments, the updated output data indicates that one user interface's size has been increased or location has been adjusted to obscure another user interface. In other embodiments, the updated output data indicates that one user interface's size has been decreased or location has been adjusted such that more of another user interface shall be visible.

Figure 3A:
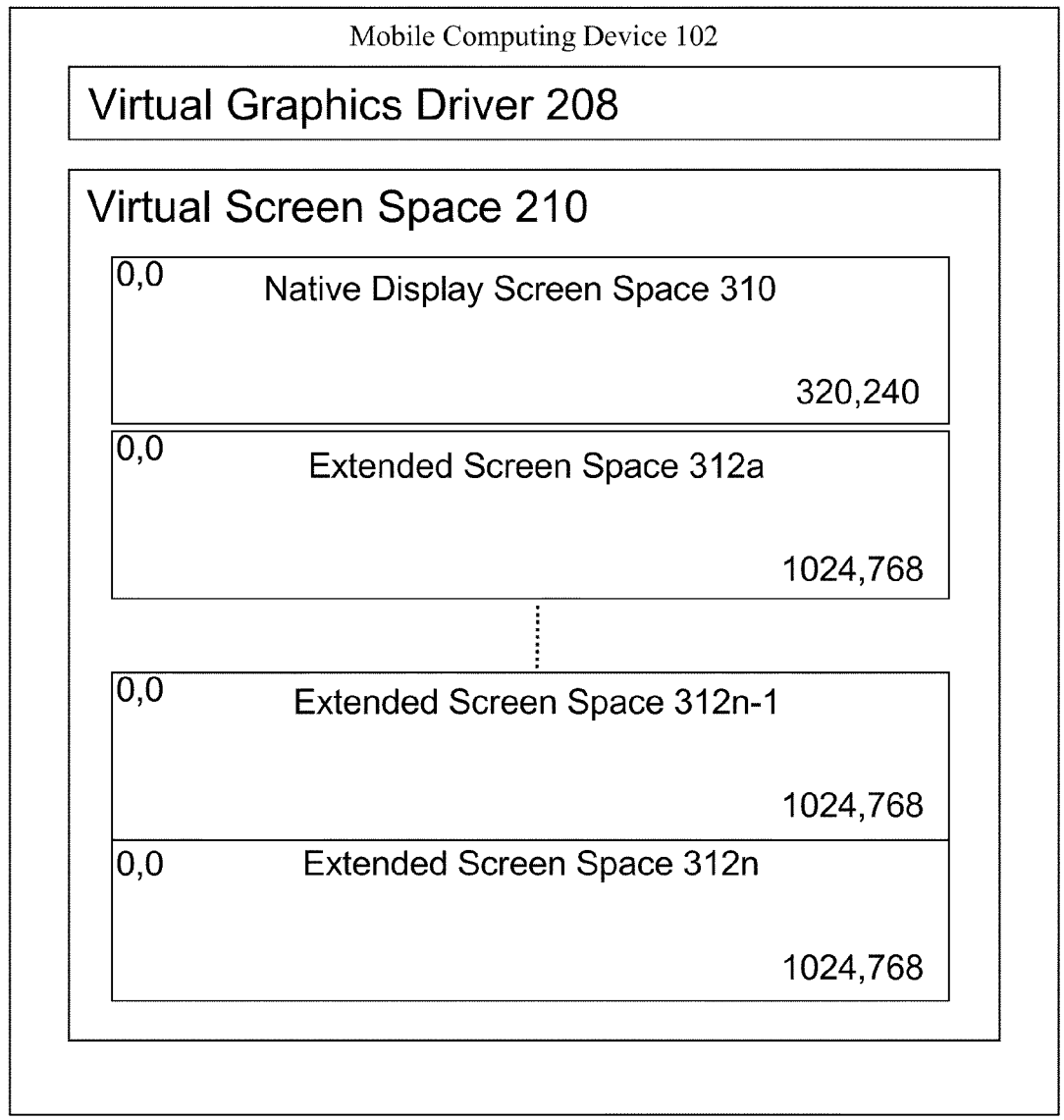
FIG. 3A is a block diagram depicting one embodiment of a plurality of screen spaces provided by a mobile computing device attached to one or more external display devices.

Referring now to FIG. 3A, a block diagram depicts one embodiment of virtual screen spaces 210 provided by a mobile computing device attached to one or more external display devices. As shown in FIG. 3A, the mobile computing device 102 includes a virtual graphics driver 208 and a virtual screen 210. The virtual screen 210 includes a plurality of virtual screen spaces 310 and 312a-n. Virtual screen space 310 may be a native display screen space for the native display 201 on the mobile computing device 102. The other virtual screen spaces 312a-n may be extended screen spaces that correspond to the displays of external display devices 202. The window management service 206 and virtual graphics driver 208 manage the virtual screen 210. In one embodiment, the virtual graphics driver 208 uses a virtual screen frame buffer to manage the mobile computing device's native display 201 and change the native display's 201 screen resolution. In another embodiment, the virtual graphics driver 208 uses a virtual screen frame buffer to manage an extended screen space 312 and to change a resolution of the extended screen 312.

In some embodiments, the virtual graphics driver 208 allocates and manages a plurality of virtual screen spaces 310, 312a-n and virtual screen frame buffers. In some of these embodiments, each virtual screen space and virtual screen frame buffer has a resolution independent of the other screen spaces and frame buffers. In one of these embodiments, output data associated with each of the plurality of resources 204 can reside within any of the virtual screen spaces 310, 312a-n. In another of these embodiments, each of the extended screen spaces 312a-n is associated with at least one external display device 202, depending on the capabilities of the device.

In various embodiments, the window management service 206 and the virtual graphics driver 208 allocate and manage the display, on a plurality of external display devices 202, of output data associated with a plurality of resources. In one of these embodiments, for example, output data associated with a resource 204a can be displayed on a mobile computing device 102, output data associated with a resource 204b can be displayed on one external display device 202a, and output data associated with a resource 204c can be displayed on another external display device 202b. In another of these embodiments, the window management device 206 identifies one of the external display devices 202 for displaying output data generated by a resource 204a based upon a type of the resource 204a. For example, the window management service 206 may determine that a type of resource rendering a video may display on a television screen, while a type of resource rendering a word processing application may render on a display of a laptop computer.

Figure 3B:
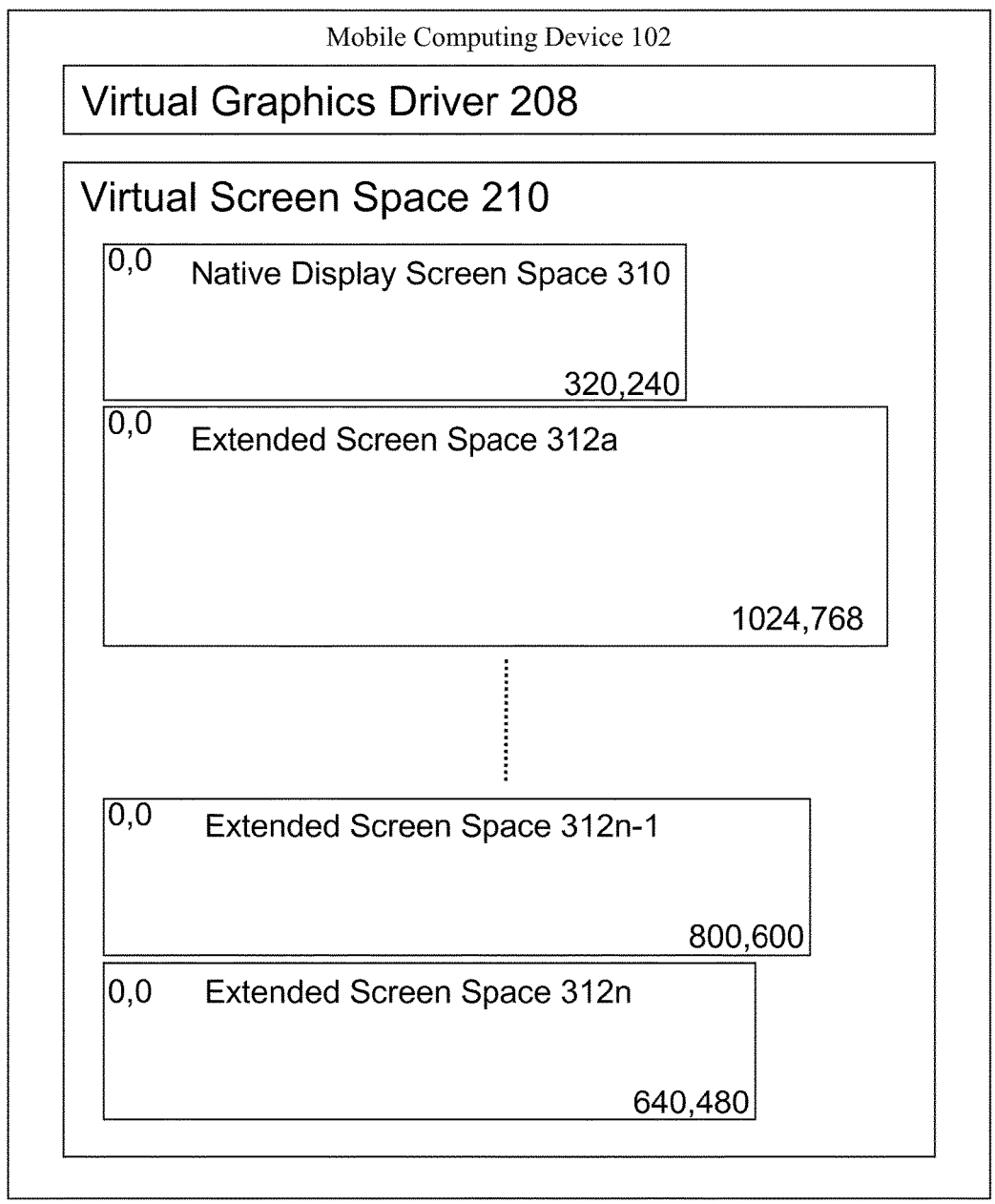
FIG. 3B is a block diagram depicting one embodiment of a mobile computing device providing a plurality of screen spaces.

Referring now to FIG. 3B, a block diagram depicts one embodiment of a mobile computing device 102 providing a virtual screen 210 with virtual screen spaces 310, 312a-n of varying resolutions. In this embodiment, the virtual screen 210 includes a native display screen space 310 corresponding to the native display 201 of the mobile computing device 102 with a resolution of 320 pixels×240 pixels. The virtual screen 210 also includes an extended screen 312a corresponding to the display of an external display device 202 with a resolution of 1024 pixels×768 pixels, an extended screen 312n-1 corresponding to the display of an external display device 202 with a resolution of 800 pixels×600 pixels, and an extended screen 312n corresponding to the display of an external display device 202 with a resolution of 640 pixels×480 pixels. In many embodiments, the virtual screen 210 may include a native display screen space 310 and any number of extended screens 312 of any resolution. The entire virtual screen space 210 may be mapped into a single virtual screen frame buffer, although embodiments that map into multiple buffers may be used.

Figure 3C:
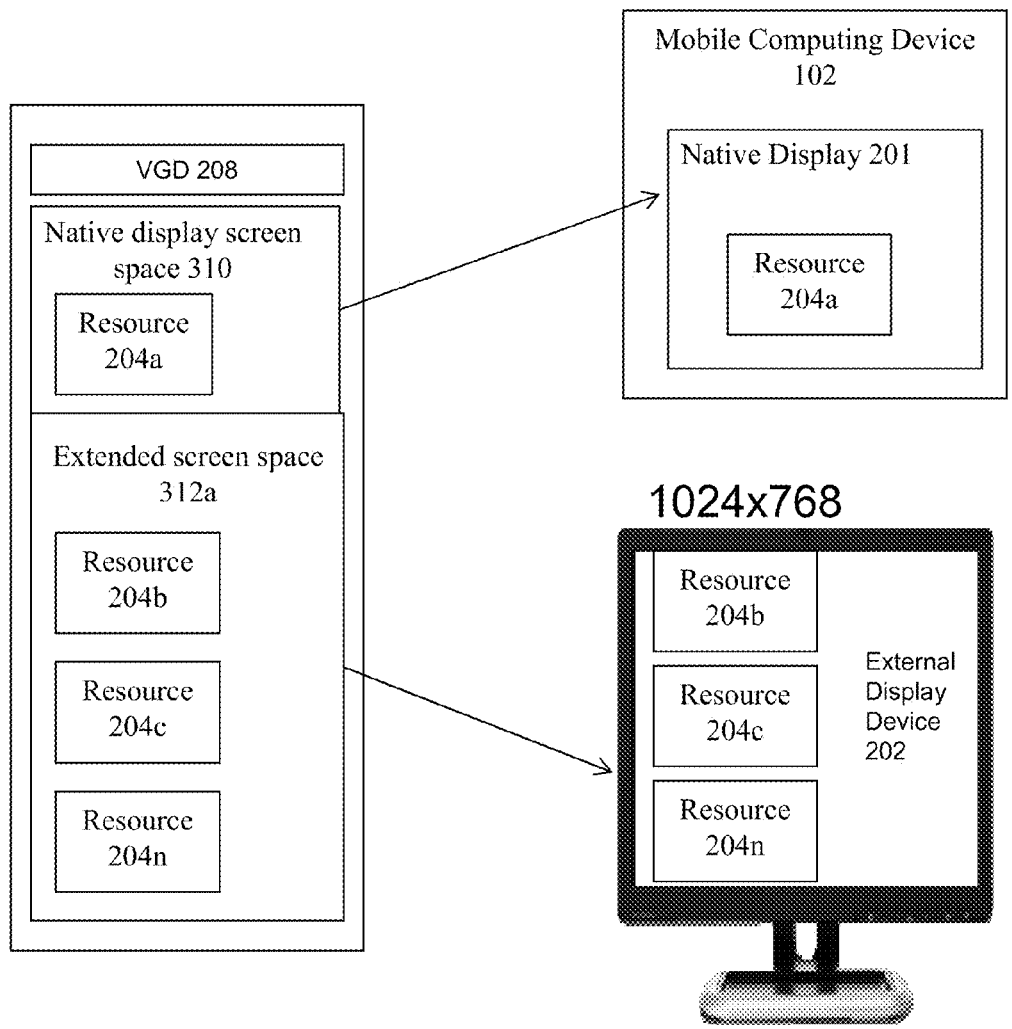
FIG. 3C is a block diagram depicting one embodiment of a logical representation of a plurality of screen spaces managed by a virtual graphics driver.

Referring now to FIG. 3C, a block diagram depicts one embodiment of a logical representation of a plurality of virtual screen spaces managed by a virtual graphics driver. In this embodiment, the virtual graphics driver 208 manages multiple virtual screen spaces with different resolutions in a virtual screen frame buffer. In this embodiment, the native display 201 of the mobile computing device is the primary display and the external display device 202, corresponding to the extended screen 312a, is a secondary display. In various embodiments, output data associated with resources 204 on the native display screen space 310 will be displayed on the native display 201 and output data associated with resources 204 on the extended screen space 312a will be displayed on the external display device 202 associated with the extended screen spaces 312a.

Figure 4A:
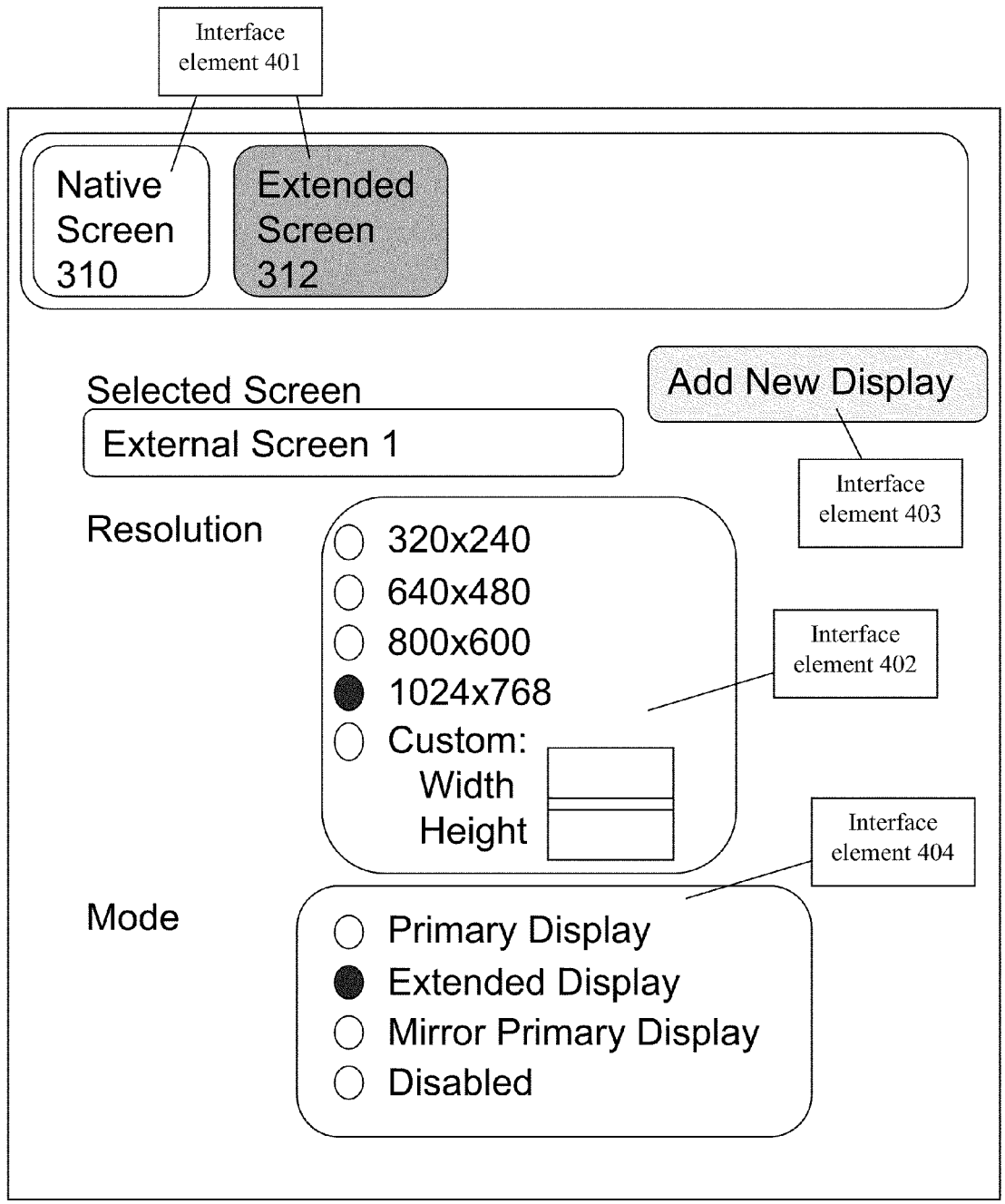
FIG. 4A is a block diagram depicting one embodiment of a graphical user interface for the addition of and configuration of additional screen spaces.

Referring now to FIG. 4A, a block diagram depicts one embodiment of a graphical user interface for customizing a dynamic display layout. In general overview, the user selects a screen space and sets parameters to configure the space. In this embodiment, the user selects a screen space from interface element 401. In various embodiments, the user may select a screen space by selecting a tab, icon, button, or radio button associated with a screen space, selecting a screen space from a drop-down menu, typing the name of a screen space into a text box, or any other methods known to persons of ordinary skill in the art. In further embodiments, the user may create a new screen space. In this embodiment, the user may create a new screen space by selecting the "Add New Display" button 403, and an interface element 401 corresponding to the new screen space may be created and added to the graphical user interface. The user may name the new screen space, assign an external display device 202 corresponding to the space, and configure the screen space according to the methods described below.

In various embodiments, the graphical user interface may include interface elements the user manipulates to set parameters for the space. In this embodiment, the graphical user interface includes interface elements 402 and 404 for setting the resolution and mode of the screen space, respectively, and in many embodiments, the graphical user interface may include interface elements for setting any other parameters such as z-order or default position. In this embodiment, the user sets the resolution by selecting a radio button from an interface element 402 corresponding to a predetermined resolution or selecting a radio button to customize the width and height of the screen's resolution. In other embodiments, the user may set the resolution by adjusting a slider to a desired resolution, selecting a thumbnail from a group of thumbnails representing displays of the screen space at different resolutions, or clicking and dragging a boundary of an image representing the screen space to change the resolution. In this embodiment, the user sets the mode by selecting a radio button from an interface element 404 indicating whether the user wishes the screen space to be a primary display, an extended display, a display that mirrors the primary display, or a disabled display, although any other modes may be used. In other embodiments, the user may set the mode by selecting an icon representing the mode, selecting the mode from a drop-down menu, or any other method.

Figure 4B:
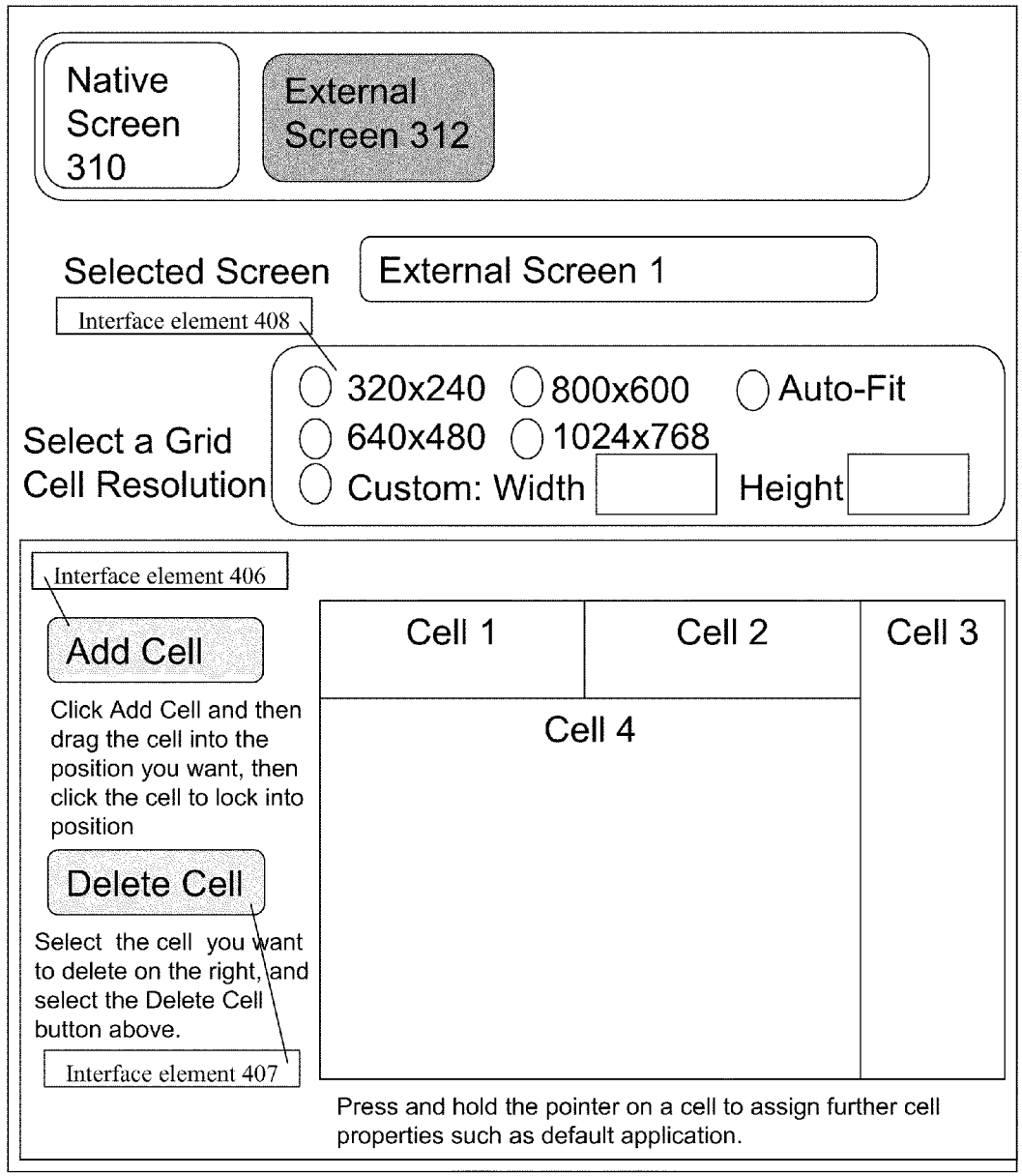
FIG. 4B is a block diagram depicting one embodiment of a graphical user interface for customizing a grid display layout.

Referring now to FIG. 4B, a block diagram depicts one embodiment of a graphical user interface for customizing a grid display layout. The user may select the screen space to customize according to any of the methods described in FIG. 4A. In many embodiments, the graphical user interface allows users to configure the number, size, and position of cells within a grid in which the output data for each of the plurality of resources 204 is displayed.

In one embodiment, the user may add cells to the grid by selecting the user interface element 406, an "Add Cell" button. Each time the user selects the "Add Cell" button, a new numbered cell appears in the grid, and the user may delete a cell by selecting the cell and the user interface element 407, a "Delete Cell" button. In many embodiments, the user may configure the position, resolution, or both of each cell. In some embodiments, the user may configure the position by dragging and dropping the cell to the desired location. In other embodiments, the user may configure the position by entering a numerical value corresponding to the desired position for the cell. For example, the user may select a cell and input the position "2-1" to indicate the cell should appear in the second row and first column of the grid. In all of these embodiments, the remaining cells may automatically readjust their positions in response to the user's selection of a position for the new cell.

In various embodiments, the user may configure the resolution of each cell. In some embodiments, the user configures the resolution by dragging and dropping a boundary of a cell to the desired size. In other embodiments, the user configures the resolution by selecting from a group of resolutions. The embodiment shown in FIG. 4B depicts a user interface element 408 in the form of radio buttons corresponding to a group of resolutions, including a radio button that permits the user to customize the resolution of the cell. In other embodiments, a user may select a resolution by selecting a check box, clicking a button, choosing a resolution from a drop-down menu, or any other known method of inputting information.

In many embodiments, a user may configure the grid display layout prior to the display of output data by the external display device 202. For example, the user may choose a setting associated with a preferred cell position and resolution for each resource in the plurality of resources 204 in a user profile. Upon execution of the resource, the window management service 206 may consult the user profile to determine how to display the user interface of the resource 204. In other embodiments, the user may configure the grid display layout during the display of output data by the external display device 202. For example, upon execution of a resource 204 by the mobile computing device 102, the user may choose or modify a setting associated with a preferred cell position and resolution for the resource 204.

In various embodiments, a user may associate output data for a resource 204 with a cell in the grid display layout. In some embodiments, the user may select a cell on the grid display layout and associate a resource with the cell such that output data of the resource appears in the selected cell. In some embodiments, the user may associate a plurality of resources with the same cell and prioritize the resources to determine which output data will be displayed in the cell if more than one of the associated resources are being executed. In other embodiments, the user may associate a resource with a cell by dragging the output data generated by the resource to the cell in the grid display layout. The window management service 206 may store the association between the cell and the resource 204.

Figure 4C:
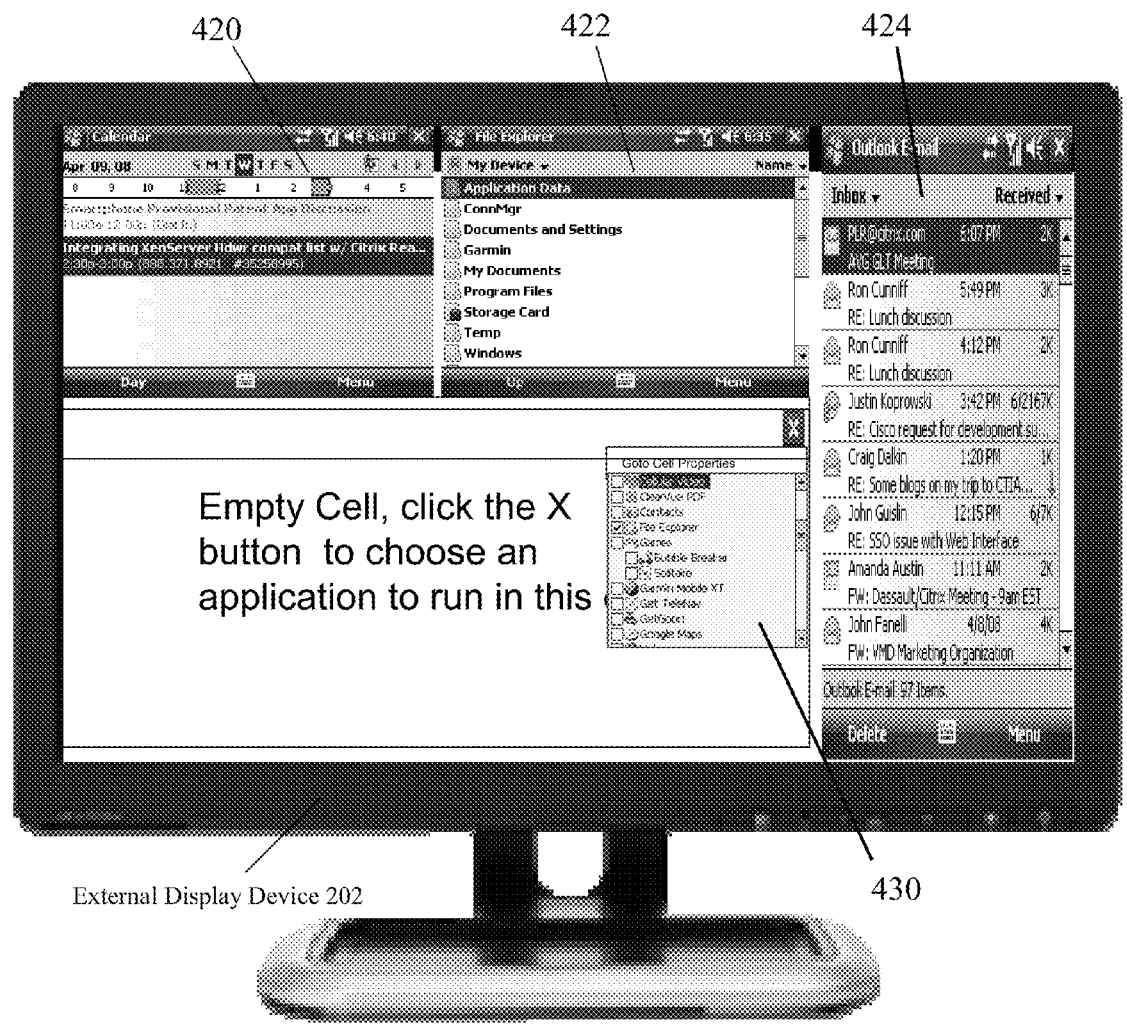
FIG. 4C is a screen shot depicting one embodiment of a customizable grid display layout.

Referring now to FIG. 4C, a screen shot depicts one embodiment of a customized grid display layout. In this embodiment, the grid display layout includes output data for a calendar 420, file explorer 422, and e-mail 424 corresponding to cells 1, 2, and 3 in the grid layout of FIG. 4B. In this embodiment, no resources have been associated with the interface element 430 corresponding to cell 4, an empty cell. In various embodiments, empty cells include a user interface element 430 for selecting a resource whose output data displays in the cell. In some embodiments, the user interface element 430 enumerates at least one resource 204 whose output data is available for display on the external display device 202. In still another embodiment, upon selection of a resource 204 by a user via the user interface element 430, the window management system 206 receives an identification of the selected resource 204. The window management system 206 may associate the selected resource with the cell corresponding to the user interface element 430. In still even another embodiment, the window management system 206, in communication with the virtual graphics driver 208, manages an association between the selected resource and the cell corresponding to the user interface element 430 to output data associated with the resource to the cell in the customizable grid display layout.

Figure 4D:
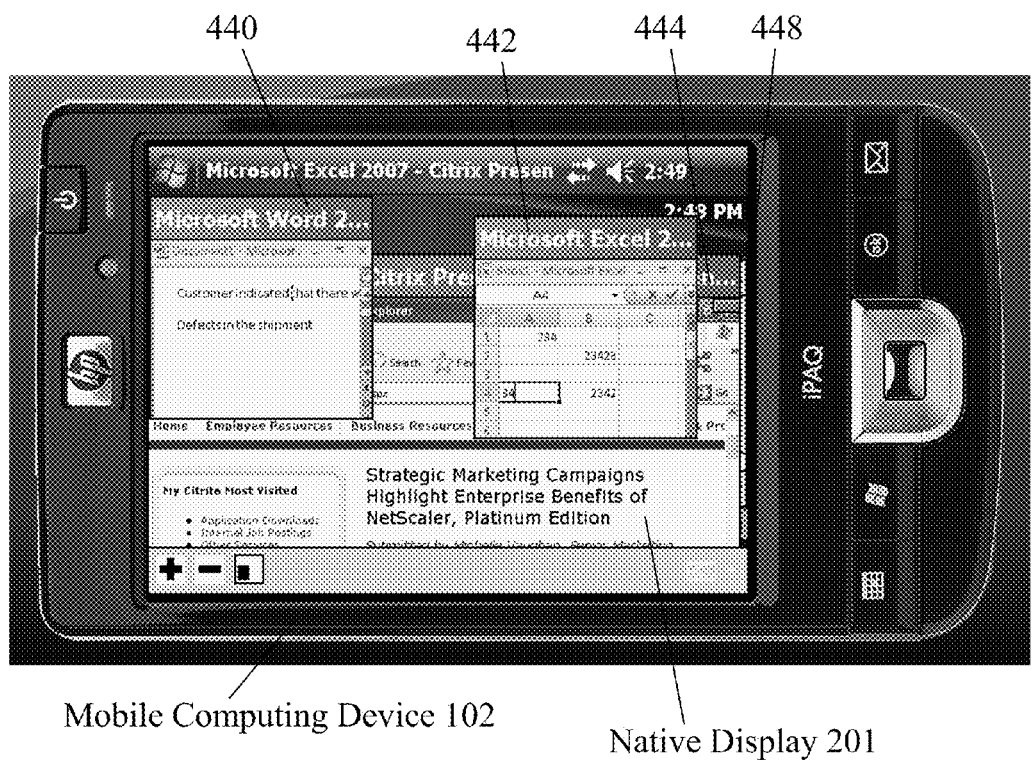
FIG. 4D is a screen shot depicting one embodiment of unstacked displays on a mobile computing device.

Referring now to FIG. 4D, a screen shot depicts one embodiment of a dynamic display layout provided by a mobile computing device 102 displaying the output data generated by each of a plurality of resources 204 on the native display 201 of the mobile computing device 102. In this embodiment, the output data for all the resources may be displayed on the native display 201 because the mobile computing device 102 is not attached to any external display devices. In this embodiment, the dynamic layout includes four windows 440, 442, 444, and 446 that contain output data generated by four resources executing on the mobile computing device 102. In various embodiments, a window 440 for a resource 204 may be dynamically displayed on the native display 201 of the mobile computing device 102 when the resource 204 is first executed. In many embodiments, the user may dynamically resize the window 440 by, for example, dragging and dropping a boundary of a window 440 to the desired location. In further embodiments, the user may move the window 440 to any position on the native display 201. In some embodiments, the user may move the window 440 to an external display device 202 connected to the mobile computing device 102. In some embodiments, the user may minimize the window 440 on the native display 201 of the mobile computing device 102. In many embodiments, the user may change focus from a window displaying output data associated with one resource 204a to a window displaying output data associated with another resource 204b. The user may change focus by selecting the window containing output data for the desired resource 204b. When the user changes the focus to resource 204b, the output data generated by resource 204b may obscure output data generated by other resources 204 executing on the mobile computing device 102. In still another embodiment, the windows 440-448 can be adjusted in any manner and/or form on any display, either the native display 201 or external display devices 202, as apparent to one of ordinary skill in the art.

Figure 4E:
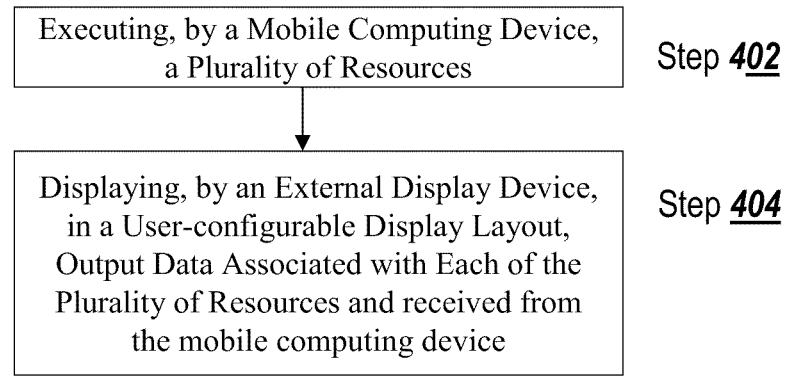
FIG. 4E is a flow diagram depicting one embodiment of the steps taken in a method for displaying, by an external display device, output data generated by a plurality of resources executing on a mobile computing device.

Referring now to FIG. 4E, a flow diagram depicts one embodiment of the steps taken in a method for displaying, by an external display device 202, output data generated by a resource 204 executing on a mobile computing device 102. In brief overview, the method includes the step of executing, by a mobile computing device 102, a plurality of resources 204 (step 402). The method includes the step of displaying, by the external display device 202, in a user-configurable display layout, the received output data associated with each of the plurality of resources 204 (step 404).

Referring still to FIG. 4E, and in greater detail, a mobile computing device 102 executes a plurality of resources 204 (step 402). In one embodiment, the mobile computing device 102 substantially simultaneously executes the plurality of resources 204. In another embodiment, the mobile computing device 102 substantially simultaneously executes a subset of the plurality of resources 204.

The external display device displays, in a user-configurable grid display layout, the received output data generated by each of the plurality of resources 204 (step 404). As described above in connection with FIGS. 2A-2D, in various embodiments, the mobile computing device 102 determines for each of the plurality of resources 204 whether to transfer output data associated with the resource 204 to the external display device 202.

In some embodiments, a window management service 206 manages the size, position, resolution, or any other characteristic of a resource 204 in the virtual screen space 210. In one embodiment, a window management service 206 executing on the mobile computing device 102, and in communication with a virtual graphics driver 208, identifies the resources 204 whose output data the external display device 202 displays. In another embodiment, the window management service 206 receives, from the virtual graphics driver 208, an identification of an external display device 202 attached to the mobile computing device 102. In still another embodiment, the window management service 206 evaluates each of the plurality of resources 204 to determine whether the external display device 202 displays the output data generated by each of the plurality of resources 204. In still even another embodiment, the window management service 206 evaluates a setting associated with each of the plurality of resources 204 to determine whether the external display device 202 should display the output data generated by each of the plurality of resources 204. In yet another embodiment, the window management service 206 evaluates a user-specified preference setting associated with each of the plurality of resources 204 to determine whether the external display device 202 displays the output data generated by each of the plurality of resources 204.

In one embodiment, the window management service 206 instructs the virtual graphics driver 208 to forward output data generated by a resource 204 executing on the mobile computing device to the external display device 202 for display. In another embodiment, the window management service 206 instructs the virtual graphics driver 208 to forward the output data generated by the resource 204 to the external display device responsive to determining that a setting associated with the resource 204 indicates that the output data generated by the resource 204 could be displayed on the external display device 202. In still another embodiment, a plurality of settings are associated with the resource 204, each of the plurality of settings indicating whether the output data generated by the resource 204 should be displayed on each of a plurality of types of external display device 202; for example, a first setting associated with the resource 204 may indicate that the generated output data should be displayed on the external display device 202 if the external display device 202 is a television screen and a second setting associated with the resource 204a may indicate that the generated output data should not be displayed on the external display device 202 if the external display device 202 has a display below a certain size and/or resolution.

In one embodiment, the window management service 206 instructs the virtual graphics driver 208 to have the output data for a resource 204 displayed on the external display device 202 in a grid display layout. In another embodiment, the window management service 206 instructs the virtual graphics driver 208 to have the output data for a resource 204 displayed on the external display device 202 in a dynamic display layout. In still another embodiment, the window management service 206 evaluates a setting associated with each of the plurality of resources 204 to identify a display layout according to which the external display device 202 should display the output data generated by each of the plurality of resources 204. In yet another embodiment, the window management service 206 evaluates a user-specified preference setting associated with each of the plurality of resources 204 to identify a display layout according to which the external display device 202 should display the output data generated by each of the plurality of resources 204; for example, and in some embodiments, a user specifies a subset of the plurality of resources 204 for which the external display device 202 should display output data.

In one embodiment, the virtual graphics driver 208 forwards output data generated by a resource 204 executing on the mobile computing device to the external display device 202 for display. In another embodiment, the virtual graphics driver 208 instructs an operating system of the mobile computing device 102 to forward output data generated by a resource 204 executing on the mobile computing device to the external display device 202 for display. In still another embodiment, the virtual graphics driver 208 forwards an identification of a display layout to the external display device 202. In yet another embodiment, the virtual graphics driver 208 instructs an operating system of the mobile computing device 102 to forward an identification of a display layout to the external display device 202.

Figure 5A:
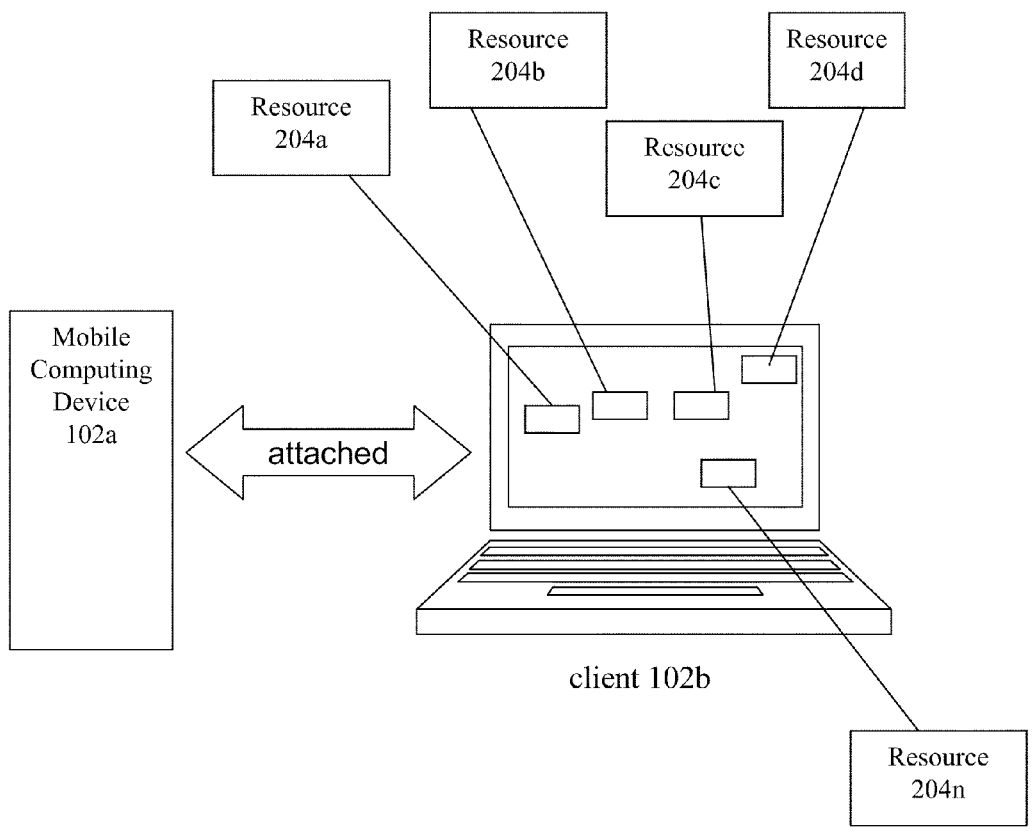
FIG. 5A is a block diagram depicting one embodiment of a system for executing and displaying a plurality of resources on a client computing device.

Referring now to FIG. 5A, a block diagram depicts one embodiment of a system for displaying, by an external display device 202, a second user interface for a resource 204 distinct from a first user interface for the resource 204 displayed by the mobile computing device 102 that is executing the resource 204. The system includes a window management service 206, a virtual graphics driver 208, and resources 204 that may provide more than one user interfaces 502a-n. In some embodiments, the resource 204 may provide a user interface 502a optimized for the native display 201 on the mobile computing device 102. In additional embodiments, the resource 204 may provide a user interface 504b optimized for display on the external display device 202. In further embodiments, the resource 204 may provide user interfaces 502a-n optimized for display on different external display devices 202. In various embodiments, the window management service 206 provides functionality to allow resources to dynamically change user interfaces 502 to adapt to the external display device 202 that will display output data generated by the resource. In some embodiments, the window management service 206 indicates to a resource 204 the properties of the external display device 202 that will display the resource's output data. In response, the resource 204 provides a user interface 502b-n appropriate for the properties of the external display device 202, which may differ from the user interface 502a provided to the native display 201 of the mobile computing device. In various embodiments, the mobile computing device 101 may execute a plurality of resources 204, and each resource may provide a plurality of user interfaces 502 optimized for display on the native display 201 of a mobile computing device 102 or on an external display device 202.

While FIGS. 2A, 2B, 2C, 2D, 3A, 3B, 3C, 4A, 4B, 4C, 4D and 4E contemplate a native display 201, in some embodiments the mobile device 102 can display a virtual desktop that functions substantially similarly to the native display 201. For example, the virtual desktop can have substantially the same look and feel as the native display 201. In some instances, the virtual desktop may be indistinguishable from the native display 201. The virtual desktop can be displayed within a context of the native display 201 such that the virtual desktop appears to be the native display 201. In this instance, a user may interact with the virtual desktop in substantially the same way as the user would interact with the native display 201.

Section C: Displaying and Interacting with a Virtual Resource on a Mobile Device Referring now to FIG. 5A, a block diagram depicts one embodiment of a system for executing and displaying a plurality of resources 204a-204n (204 in general) on a client 102b. In one embodiment, the system includes a client 102a, which is a mobile computing device, in connection with another client 102b. In one embodiment, the client 102b includes a dock to which the mobile computing device 102a attaches. In another embodiment, the client 102b includes a receiver for communicating with the mobile computing device 102a wirelessly, for example, via BLUETOOTH, Wi-Fi or other networking protocols, as described above in connection with FIGS. 1A-1C. In still another embodiment, the client 102b includes an external display 124 as described above in connection with FIG. 1B-1C.

In one embodiment, one or more resources 204 execute on the mobile computing device 102a. In another embodiment, the mobile computing device 102a accesses hardware and/or software components of the client 102b to execute the resources 204. In still another embodiment, a version of a resource 204 is executed on the client 102b. In one embodiment, the version of the resource 204 on the client 102b can be a local copy of the resource 204 installed on the client 102b. In another embodiment, the version on the client 102b can offer more functionalities of the resource 204 than available on the mobile computing device 102a. In still another embodiment, the version on the client 102b can be another resource 204b producing the same output data as the resource 204 executing on the mobile computing device 102a. In yet another embodiment, the mobile computing device 102a and the client 102b share hardware and software resources to execute one or more resources 204.

In some embodiments, the virtual resource can be a virtual desktop or a context desktop. The virtual desktop can be a resource that executes on the client 102b. In some embodiments, the virtual desktop can include one or more icons representative of an application executing on a remote computer. This remote computer can be the client 102b or can be another server or client. While FIG. 5A contemplates a client 102b that includes a virtual resource, in some embodiments the virtual resource resides on a server.

Execution of the resource 204 may be transferred to the client 102b in many ways. In one embodiment, the execution of the resource 204 is terminated on the mobile computing device 102a and the version of the resource 204 on the client 102b is started. In another embodiment, information and/or data values related to the state of execution of the resource 204 on the mobile computing device 102a is transferred to the client 102b. In still another embodiment, no information and/or data values related to the state of execution of the resource 204 on the mobile computing device 102a is transferred to the client 102b. In such an embodiment, recent updates are not transferred to the client 102b when the execution is transferred from the mobile computing device 102a to the client 102b. In yet another embodiment, the resource 204 is transferred to the client 102b when the execution is transferred from the mobile computing device 102a to the client 102b. In one embodiment, information and/or data values related to the state of execution is also transferred when the resource 204 is transferred to the client 102*b*.

In some embodiments, the client 102*b* includes an operational or performance characteristic not provided by the mobile computing device 102*a*. In one of these embodiments, the client 102*b* has a more powerful processor and/or larger memory than the processor and memory of the mobile computing device 102*a*. In another of these embodiments, the client 102*b* provides an I/O device, display device, installation device, or other peripherals, such as a keyboard or printer not available to the mobile computing device 102*a*. In still another of these embodiments, the client 102*b* may provide a feature, a resource, or peripheral desired to be used by the user of the mobile computing device 102*a* For example, the user may want to access a file or an application provided on a remote machine available via a connection across a network. In yet another of these embodiments, the client 102*b* provides access to machines on a network 104, such as those in machine farm 38, not available to the mobile computing device 102*a*, or to a user of the mobile computing device 102*a*.

In one embodiment, one or more resources 204 may execute in a virtual machine on the mobile computing device 102*a*. In another embodiment, a virtual machine executing on the mobile computing device 102*a* provides access to a computing environment based at a remote location. In still another embodiment, an application program stored in the mobile computing device 102*a* executes to access data associated with the computing environment provided on the mobile computing device 102*a*. In another embodiment, the mobile computing device 102*a* executes virtualization software, at least a portion of which is stored on the mobile computing device 102*a*. In still another embodiment, the mobile computing device 102*a* provides access to a computing environment by executing an operating system with access to one or more applications stored on the mobile computing device 102*a*, the operating system and the one or more applications having access to user data stored in the mobile computing device 102*a*.

In one embodiment, the mobile computing device 102*a* executes a virtual machine, responsive to data stored in the mobile computing device 102*a*. In another embodiment, the mobile computing device executes a virtual machine responsive to a policy stored in the mobile computing device 102*a*. In still another embodiment, the mobile computing device 102*a* executes a virtual machine that provides access to a requested resource or computing environment, the virtual machine executed responsive to a virtual machine image stored in the mobile computing device 102*a*. In yet another embodiment, the mobile computing device 102*a* transfers execution of the virtual machine to the client 102*b*.

In another embodiment, the client 102*b* connects to the mobile computing device 102*a*, executes a virtual machine, and provides access to a computing environment responsive to data stored in the mobile computing device 102*a*. In one embodiment, the client 102*b* may mount the storage device of the mobile computing device 102*a* as a removable hard drive or storage element 128 of the client 102*b*. In some embodiments, the mobile computing device 102*a* may be a plug and play device (PnP) of the client 102*b*, such that a PnP protocol such as that manufactured by Microsoft Corporation of Redmond, Wash., is used between the mobile computing device 102*a* and client 102*b*, such as via I/O devices 130*a*-130*n* or a network interface 118.

In one embodiment, the client 102*b* provides access to a computing environment based on a portable computing environment provided in the mobile computing device 102*a*. The client 102*b* executes a virtual machine and a virtualization layer to execute the computing environment based on a virtualization software, virtual machine image, or user data. In some embodiments, the client 102*b* includes a transceiver for accessing data stored in the mobile computing device 102*a*.

In some embodiments, a loading mechanism on the mobile computing device 102*a* actuates the establishment of the computing environment on the client 102*b* based on the portable computing environment stored in the mobile computing device 102*a*. In other embodiments, the loading mechanism of the client 102*b* actuates the establishment of the computing environment. In yet another embodiment, a loading mechanism on the mobile computing device 102*a* works in conjunction with the loading mechanism of the client 102*b* to establish the computing environment.

Figure 5B:
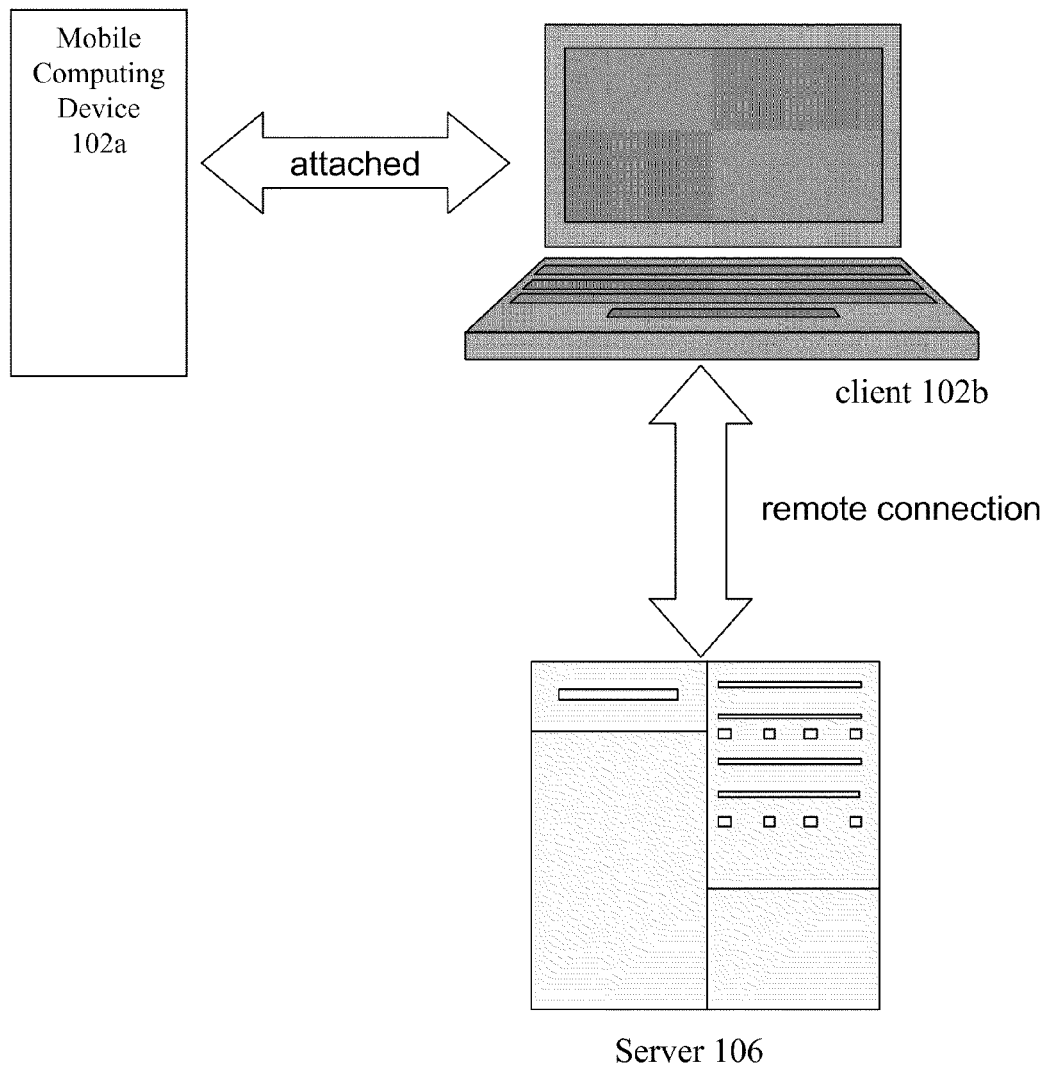
FIG. 5B is a block diagram depicting one embodiment of a system for executing a plurality of resources on a server and displaying them on a client computing device.

Referring now to FIG. 5B, a block diagram depicts one embodiment of a system for executing resources 204 on a remote server 106 and displaying output data on a client computing device 102*b*. In one embodiment, the system includes the mobile computing device 102*a*, a client 102*b* and a server 106. The mobile computing device 102*a* may be attached or connected to the client 102*b* in a plurality of possible ways as described with reference to FIG. 5A.

In one embodiment, the client 102*b* connects to a remote server 106 to request execution of a resource 204 by the server 106. In some embodiments, the server 106 may have an operational or performance characteristic not present in the client 102*b*. In another embodiment, the server 106 has more powerful hardware and/or software resources not available to the client 102*b*. In still another embodiment, the server 106 provides access to machines on a network 104, such as those in machine farm 38, not directly available to the client 102*b*.

In one embodiment, one or more resources 204 execute on the client 102*b*. In another embodiment, the one or more resources 204 may include an application program to establish a remote connection with the server 106. The client 102*b* may execute, operate or otherwise provide the application, which can be any type and/or form of software, program, or executable instructions such as any type and/or form of web browser, web-based client, client-server application, a thin-client computing client, an ActiveX control, or a Java applet, or any other type and/or form of executable instructions capable of executing on the client 102. In some embodiments, the application may be a server-based application executed on behalf of the client 102 on a server 106. In one embodiment, the server 106 may communicate with the client 102 using a presentation layer protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash.

In one embodiment, one or more resources 204 may execute in a virtual machine on the client 102*b* as described above in connection to FIG. 5A. In another embodiment, the server 106 connects to the client 102*b*, executes a virtual machine, and provides access to a computing environment. In one embodiment, the server 106 may transmit the virtual machine image to the client 102*b*. In another embodiment, the server 106 transmits output data generated by the virtual machine image executed on the server 106 to the client 102*b*. In still another embodiment, the virtual machine image includes a version of each of the plurality of resources 204 of the mobile computing device 102*a*.

Output data from the execution of the resources 204 are displayed in one or more ways. In one embodiment, the output data generated by an execution of a resource 204a on the server 106 is displayed on the mobile computing device 102a. In another embodiment, the output data generated by an execution of a resource 204 on the server 106 is displayed on the client 102b. In still another embodiment, the output data from the server 106 is displayed on the client 102b as a part of a computing environment. In yet another embodiment, a resource 204 is executed locally on the mobile computing device 102a and displayed on the client 102b. In some embodiments, output data is simultaneously displayed in the mobile computing device 102a and the client 102b.

In FIGS. 5A and 5B, the resource 204 can be a virtual desktop such as any virtual desktop described herein. In other embodiments, the resource 204 can be a mouse pointer drawn by a virtual desktop application executing on a server 106 or client 102. In still other embodiments, the resource 204 can be a virtual trackpad drawn by a virtual desktop application executing on a server 106 or client 102.

Figure 6A:
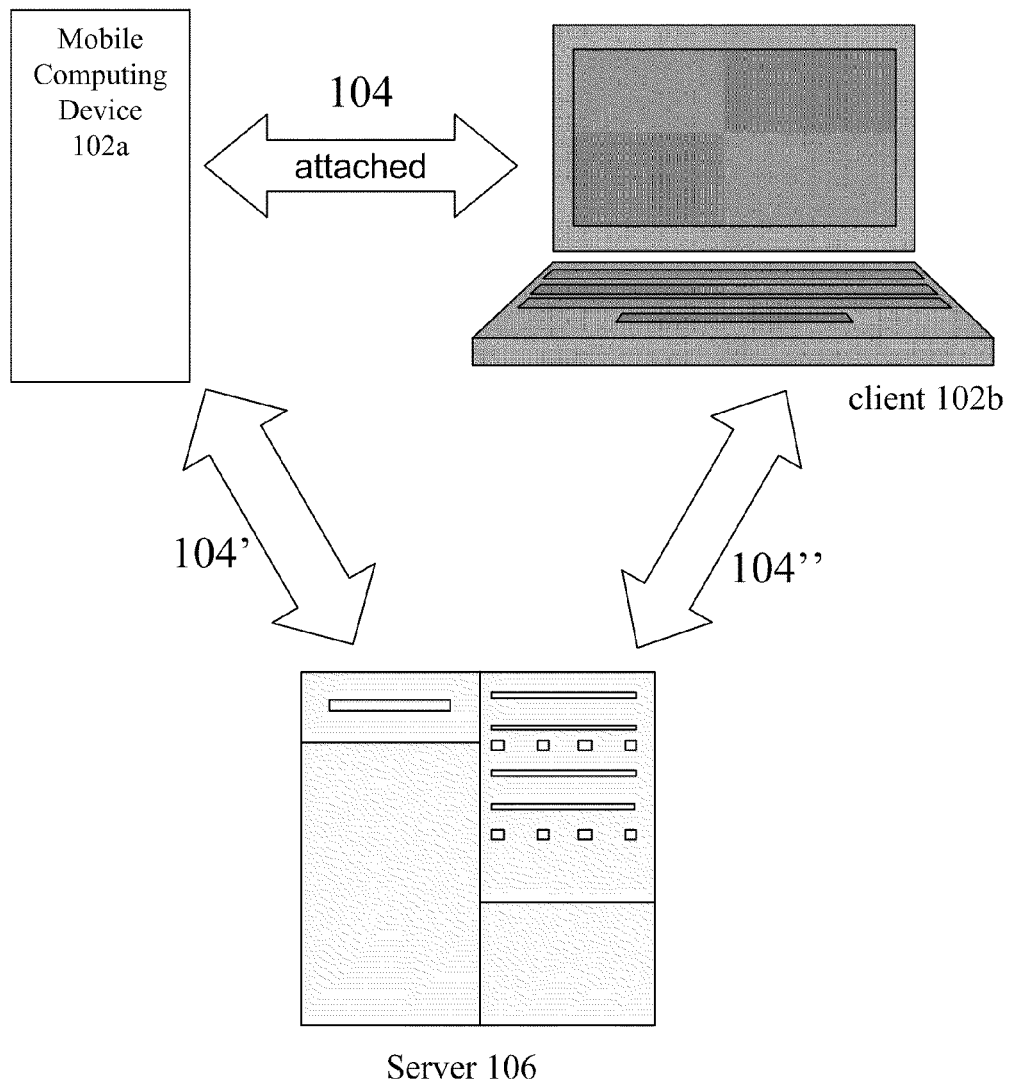
FIG. 6A is a block diagram of one embodiment of a system for executing a plurality of resources from a mobile computing device on a remote server and displaying results on a client computing device.

Referring now to FIG. 6A, a block diagram depicts one embodiment of a system for executing resources for a mobile computing device remotely on a server and displaying output data generated by the resources on the mobile computing device, the client, or both.

In one embodiment, the system includes a mobile computing device 102a in communication with a client 102b over a connection 104. The system also includes a server 106 communicating with the mobile computing device 102a over a connection 104' and the client 102b over a connection 104".

In one embodiment, one or more resources 204 executes on the mobile computing device 102a. In another embodiment, the one or more resources 204 may include an application program to establish a connection 104 with the client 102b and/or a connection 104' with the server 106. In one embodiment, the mobile computing device 102a or the client 102b may execute, operate or otherwise provide the application, which can be any type and/or form of software, program, or executable instructions such as any type and/or form of web browser, web-based client, client-server application, a thin-client computing client, an ActiveX control, or a Java applet, or any other type and/or form of executable instructions capable of executing on the mobile computing device 102. In some embodiments, the application may be a server-based or a remote-based application executed on behalf of the mobile computing device 102a or the client 102b on a server 106. In one embodiments the server 106 may communicate with the mobile computing device 102a or the client 102b using any presentation layer protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash.

In one embodiment, one or more resources 204 may execute in a virtual machine on the mobile computing device 102a as described with respect to FIG. 5A. In one embodiment, the mobile computing device 102a transfers execution of the virtual machine to the client 102b and/or the server 106. In another embodiment, the mobile computing device 102a transfers execution of a resource 204 in a virtual machine to the client 102b and/or the server 106. In one embodiment, when the mobile computing device 102a attaches to the client 102b, the mobile computing device 102a may transmit to the server 106 an identification of the attached client 102b. The server 106 may identify a virtual machine on the client 102b. In some embodiments, the server 106 may disconnect a resource 204 executing in a virtual machine on the mobile computing device 102a and connect the resource 204 to the virtual machine on the client 102b. In these embodiments, the server 106 may transmit information regarding the state of execution of the resource to the virtual machine on the client 102b. In other embodiments, the server 106 may transfer execution of a resource executing in a virtual machine by disconnecting the virtual machine from the mobile computing device 102a and connecting the virtual machine to the client 102b.

In one embodiment, the server 106 provides access to a computing environment to the client 102b. An example of such a computing environment is the XenDesktop distributed by Citrix Inc. of Ft. Lauderdale, Fla. In another embodiment, the output of the resource 204 that is executed on the server 106 for the mobile computing device 102a is displayed as a part of the computing environment on the client 102b through the connection 104". In still another embodiment, the output of the resource 204 executing on the server 106 for the mobile computing device 102a is displayed on the client 102b through the connection 104" but not as a part of the computing environment.

Figure 6B:
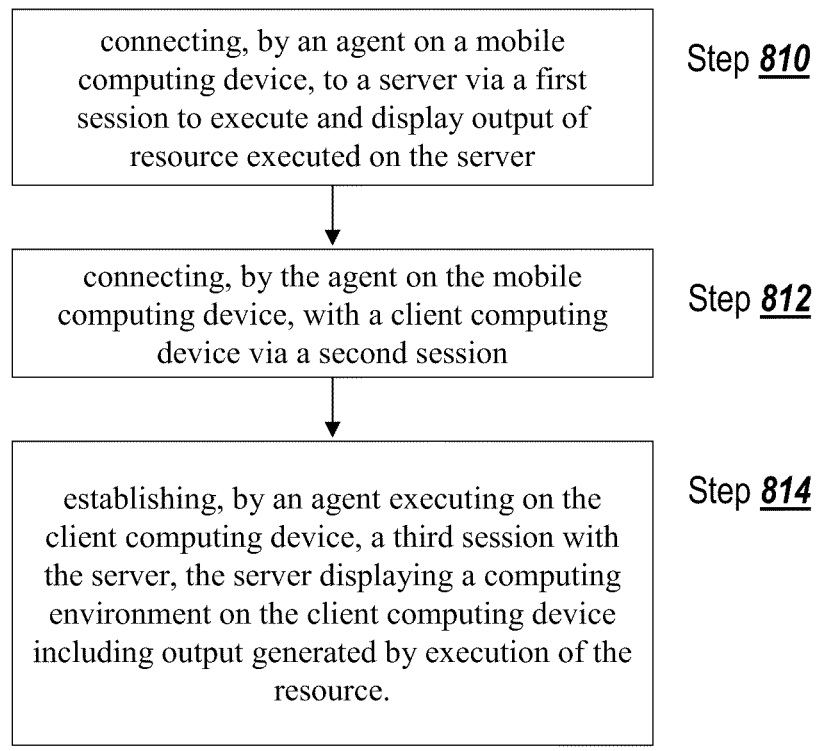
FIG. 6B is a flow diagram depicting one embodiment of the steps taken in a method for executing a plurality of resources from a mobile computing device on a remote server and displaying results on a client computing device.

Referring now to FIG. 6B, a flow diagram depicts one embodiment of the steps taken in a method for executing resources for a mobile computing device remotely on a server and displaying output from the resources on a client device. The method includes the step of connecting, by an agent on a mobile computing device 102a, to a server 106 via a first session to execute and display output data of a resource 204 executed on the server 106 (step 810). The method also includes the step of connecting by the agent on the mobile computing device 102a with a client 102b via a second session (step 812). The method further includes the step of establishing, by an agent executing on the client 102b a third session with the server 106 (step 814). In one embodiment, the server 106 displays a computing environment on the client 102b. In another embodiment, the computing environment includes a display of output generated by an execution, on a remote server 106, of the resource 204.

In one embodiment, an agent or application program on the mobile computing device 102a connects to a server 106 to establish the connection 104' (step 810). In another embodiment, a first session is established between the mobile computing device 102a and the server 106 for the mobile computing device 102a to access resources 204 on the server 106. In still another embodiment, the mobile computing device 102a executes a resource 204 on the server 106 via the first session. In yet another embodiment, the output of the execution is displayed on the mobile computing device 102a. In a further embodiment, the output of the execution is transmitted to a client 102b.

The agent on the mobile computing device 102a connects with a client 102b via a second session over connection 104 (step 812). In one embodiment, the second session is set up by the agent that sets up the first session. In another embodiment, the second session is set up by an agent separate from the agent that sets up the first session. In one embodiment, the first session and the second session function according to a substantially same protocol. In another embodiment, the first session and the second session function according to separate protocols. In still another embodiment, the connection between the mobile computing device 102a and the client 102b may be chosen from a plurality of possible connections.

In one embodiment, an agent on the client 102b establishes a third session between the client 102b and the server 106 over the connection 104" (step 814). In another embodiment, the server 106 transmits to the client 102*b* a computing environment over the connection 104". In an example embodiment, the computing environment is a XenDesktop distributed by Citrix Systems Inc. of Ft. Lauderdale, Fla. In one embodiment, the output data generated by the execution of the resource 204 is incorporated into a display of the computing environment. In another embodiment, the output data generated by the execution of the resource 204 is transmitted from the server 106 to the client computing device 102*b* over the connection 104". In still another embodiment, the output data generated by the execution of the resource 204 is displayed on the client 102*b* separately from the computing environment.

In one embodiment, the resource 204 is executed on the mobile computing device 102*a* and output data generated by the execution of the resource 204 is transmitted to the server 106 over connection 104' to be forwarded to the client 102*b* over the connection 104" for display. In another embodiment, execution of the resource is transferred or relocated to the client 102*b*. In still another embodiment, output data generated by the resource 204 is displayed inside the computing environment. In yet another embodiment, the execution of the resource 204 is transferred to the server 106. In one embodiment the output data from the execution on the server 106 is transmitted to the mobile computing device 102*a* and/or the client 102*b*.

In FIGS. 6A and 6B, a resource 204, in some embodiments, can be a virtual desktop such as any virtual desktop described herein. In other embodiments, the resource 204 can be a mouse pointer drawn by a virtual desktop application executing on a server 106 or client 102. In still other embodiments, the resource 204 can be a virtual trackpad drawn by a virtual desktop application executing on a server 106 or client 102.

Figure 7A:
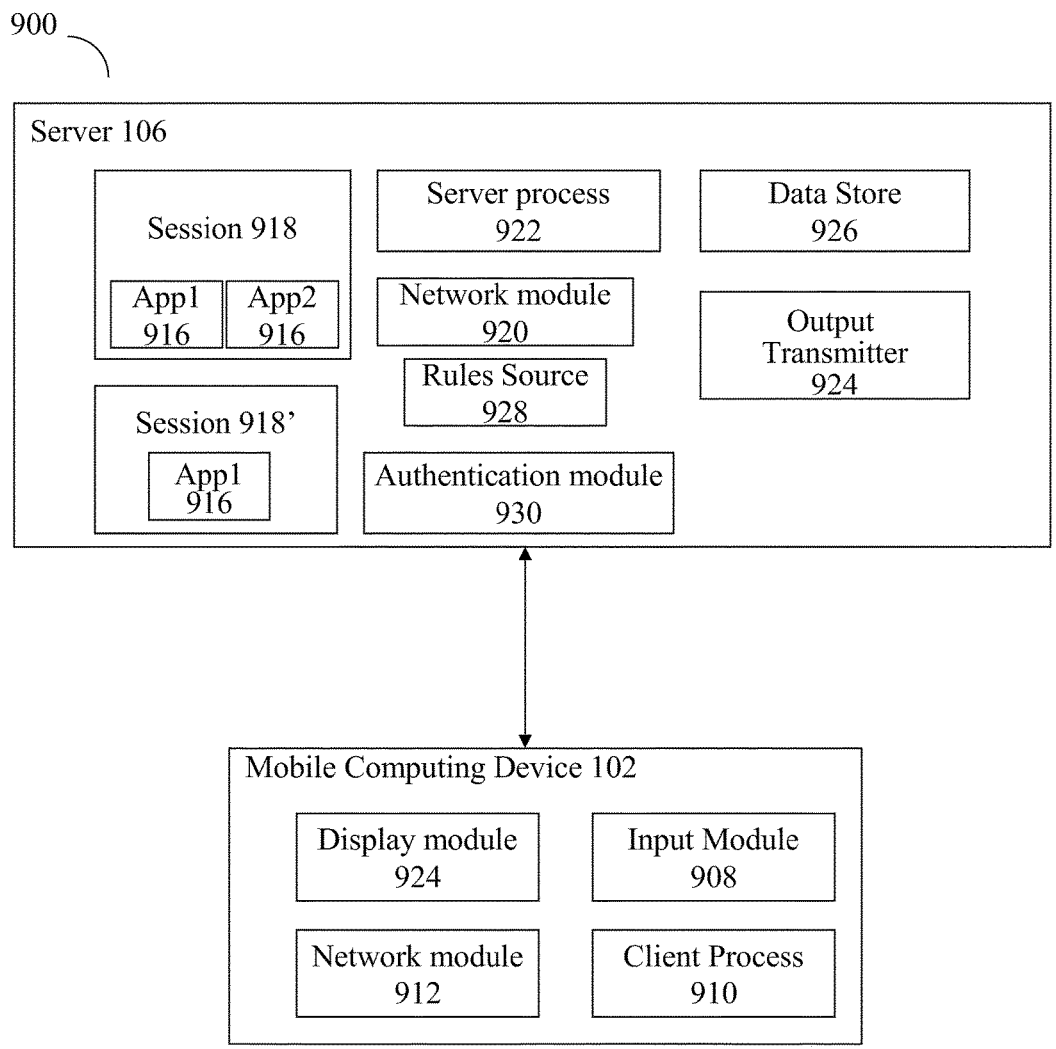
FIG. 7A is a block diagram depicting one embodiment of a server for displaying and activating disconnected sessions with a mobile computing device and/or a client computing device.

FIG. 7A depicts an embodiment of a system for displaying and activating disconnected sessions between a mobile computing device and a server. In FIG. 7A, a block diagram depicts a system 900 including the mobile computing device 102 and the server 106, although any type of client may be used in place of the mobile computing device 102. In one embodiment, the mobile computing device 102 includes an input module 908, a client process 910, a network module 912, and a display module 924. The input module 908 provides an interface for a user of the mobile computing device 102 to interact with the mobile computing device 102, for example, to request the remote execution of an application 916 in a session 918 from the server 106.

Referring now to FIG. 7A, now in greater detail, a server 106 for displaying and activating disconnected sessions includes a network module 920, a data store 926, and a server process 922. The network module 920 receives authentication information associated with a user of a mobile computing device 102. The data store 926 enumerates at least one disconnected session associated with the user. The server process 922 transmits, to the mobile computing device 102, a graphical representation of the at least one disconnected session associated with the user. The server process 922 receives a request to connect to the at least one disconnected session. The server process 922 connects the mobile computing device 102 to the requested at least one disconnected session enumerated in the data store 926.

In one embodiment, a session 918 is a process, executing on the server 106, that supports the execution of one or more applications 916. In some embodiments, execution of a session 918 includes execution of a desktop application 916 from which the execution of other applications 916 can be initiated. In other embodiments, a session 918 is a session between a mobile computing device 102 and a hosted desktop provided by a virtual machine executing on a server 106. In one of these embodiments, a desktop session 918' executes within the session 918. In another of these embodiments, one or more applications 916 execute within a desktop session 918' executing within the session 918. In still other embodiments, a session 918' may execute within a second session 918. In one of these embodiments, for example, a virtual machine on a server 106 executes a session 918 and a second session 918' —such as a desktop session within which a plurality of applications 916 executes—executes within the session 918. In yet another embodiment, the session 918 includes an instance of the execution of a single application 916.

In one embodiment, the input module 908 is, for example, a graphical user interface that provides one or more icons or menu selections for a user to select. In another embodiment, at least one icon or menu selection represents a specific application 916 available for remote execution. In still another embodiment, selecting an icon or menu selection initiates the transmittal of a log-on request to the server 106 for access to that application 916. In still even another embodiment, an icon or menu selection does not represent any specific application 916, but instead represents a general server 106 log-on procedure. In yet another embodiment, the input module 108 is non-graphical user interface. In this embodiment, the user can enter a command to send a log-on request to server 106. Entering a command can include typing a predefined set of characters or depressing a specified key sequence on an input device (e.g., a keyboard or keypad). In one embodiment, the log-on request includes user-provided authentication information. In another embodiment, the input module 908 accepts the input of the user-provided authentication information, which can include any type of authentication information, including, without limitation, any of user name-password/PIN combinations, voice samples, one-time passcodes, biometric data, digital certificates, or smart card data. In some embodiments, the input module 908 is in communication with additional hardware peripherals to facilitate acceptance of user authentication information.

Information associated with a user may be transmitted from the mobile computing device and received by the server. In one embodiment, the input module 908 accepts authentication information and provides it to the client process 910. In another embodiment, the client process 910 manages the mobile computing device-side functionality of the remotely-executing session. In still another embodiment, the client process 910 forwards user input including the authentication information and requests for termination or disconnection of sessions 918 to the server 106. In still even another embodiment, the server 106 receives the information associated with a user of a mobile computing device 102 and authenticates the user responsive to the information. In yet another embodiment, the client process 910 processes data received from the server 106, for example, by forwarding graphical output data generated in a session 918, or a graphical representation of output data from a session 918, to the display module 924.

The network module 912 provides for communication between a mobile computing device 102 and the server 106. The network module 920 provides communication functionality for the server 106. In one embodiment, the network module 912 sends user input, such as authentication information and requests for access to, disconnection from, or termination of sessions 918 executing on the server 106. In another embodiment, the network module 912 also receives output data from the sessions 918 and forwards the output data to the client process 910. In still another embodiment, the network module 912 encapsulates user input into, and reconstitutes session output data from, a predetermined protocol for transmission to the server 106. In yet another embodiment, the network module 912 encrypts outgoing transmissions and decrypts incoming transmissions.

In some embodiments, the network module 920 receives authentication information associated with a user of a mobile computing device 102. In another embodiment, the network module 920 receives communications from the mobile computing device 102 over one or more data networks or links 921. In still another embodiment, the network module 920 transmits output data to the mobile computing device 102. In still even another embodiment, the network module 920 encrypts outgoing communications and decrypts incoming communications. In one embodiment, the network module 920 of the server 106 communicates with the network module 912 of a mobile computing device 102 over a network 104. In another embodiment, incoming communications, once decrypted or retrieved from a protocol (if necessary), are forwarded to a session 918 or to the server process 922, as appropriate.

In some embodiments, the network module 920 encapsulates outgoing communications in a protocol for transmission and retrieves incoming data from transmissions received according to a communications protocol. In one of these embodiments, network module 920 uses at least one communication protocol to encapsulate data. In another of these embodiments, a first communication protocol, capable of encapsulating secondary protocols used in communications between the mobile computing device and the host service, ensures that data is maintained during a disrupted network connection. In still another of these embodiments, data communicated between the mobile computing device and the host service is buffered. When, for example, a mobile computing device roams between different access points in the same network, the buffered data is maintained during the temporarily disrupted network connection. Similarly, in another example, when a mobile computing device switches between networks (e.g., from a wired network to a wireless network) the buffered data is maintained during the temporarily disrupted connection to the host service. In still even another of these embodiments, buffered data can also be maintained, for example, when the network connection is disrupted due to a failure of a server side component (e.g., a failure of a server side proxy), due to a time-out in the system, or due to other reasons. In yet another of these embodiments, the network module 920 provides session persistence and reliability by encapsulating secondary protocols within the first communication protocol.

In one embodiment, at least one previously disconnected application session already associated with the user is identified responsive to the authentication information. In another embodiment, at least one previously disconnected desktop session already associated with the user is identified responsive to the authentication information. In some embodiments, the mobile computing device 102 receives output data generated by the at least one previously disconnected session. In one of these embodiments, an application executing within the at least one previously disconnected session generates the output data. In another of these embodiments, the mobile computing device 102 generates a graphical representation of the at least one previously disconnected session using the received output data. In still another of these embodiments, the mobile computing device 102 receives a graphical representation of the output data.

The mobile computing device 102 may receive and display a graphical representation representing at least one previously disconnected session associated with the user. In one embodiment, the display module 924 displays the graphical representation of the at least one previously disconnected session to a user of the mobile computing device 102. In some embodiments, output data is displayed to the user. In other embodiments, a graphical user interface is displayed to the user with the received graphical representation. In still other embodiments, the received graphical representation incorporates a graphical user interface element. In yet other embodiments, a text-based representation of output data generated by a disconnected session is displayed to the user.

In one embodiment, the display module 924 displays the output data generated by an application 916 or a session 918 from a remotely-executing session 918. In another embodiment, the display module 924 forwards output data received from the client process 910 directly to a display device, such as the display device 124 described above in connection with FIGS. 1B and 1C, or other suitable form of display device. In some embodiments, the received output data is encrypted, encapsulated in a protocol, or both. In one of these embodiments, the display module 924 first manipulates the output data so that the output data can be interpreted by a standard display adapter such as a computer video card.

A user may request to connect to at least one previously disconnected session, and the request may be transmitted to the server. In one embodiment, a user of the mobile computing device 102 selects a graphical representation to which to connect. In another embodiment, the mobile computing device 102 transmits the request to connect responsive to selection of a corresponding graphical representation selected by a user. Output data generated by the at least one previously disconnected session associated with the user is received in response to the transmitted request. The output data generated by the session, and by applications executing within the session, are received and displayed as described below.

The server process 922 manages the execution and termination of sessions 918 and the connections and disconnections of those sessions 918 to the mobile computing device 102. In one embodiment, the server process 922 can initiate new sessions 918, disconnect a mobile computing device 102 from a session 918, detect a mobile computing device 102 disconnection from a session 918, locate a session 918 from which a user has disconnected, locate a session 918 to which a user of a mobile computing device 102 is connected to a client computing device 102b, receive a request to connect to a disconnected session, and connect a user to a disconnected session 918. In another embodiment, the sessions 918 are configured with a user's personal preferences and authorization privileges.

The output transmitter 924 transmits output data from a session 918 to a mobile computing device 102 through the network module 920. In one embodiment, the output transmitter 924 intercepts the output data generated in a session 918 and determines which mobile computing device 102 is connected to the session 918. If the session 918 is connected to a mobile computing device 102, the output transmitter 924 transmits the output data to the connected device via the network module 920. In one embodiment, if the session 918 is not connected to a mobile computing device 102, the output transmitter 924 discards the output data and waits to receive future output data. In another embodiment, if the session 918 is not connected to a mobile computing device 102, the output transmitter 924 disregards all further output data until the output transmitter 924 receives notification that a session 918 has connected to a mobile computing device 102. In some embodiments, as described in further detail below, if the sessions 918 are not connected to a mobile computing device 102, the output transmitter 924 transmits, to a mobile computing device 102, a graphical representation of at least one disconnected session associated with the user.

In one embodiment, the output transmitter 924 stores the data until the output transmitter 924 receives notification that the session 918 has connected to a mobile computing device 102. In another embodiment, the output transmitter 924 attempts to send output data to a mobile computing device 102 until the server process 922 notifies the output transmitter 924 that the mobile computing device 102 is disconnected from the server 106. In still another embodiment, the output transmitter 924 determines which of the mobile computing device 102 or other client, if any, the session 918 is connected to by consulting the data store 926. In yet another embodiment, the server process 922 determines to which of the mobile computing device 102 or other client, if any, the session 918 is connected by consulting the data store 926 and transmits the determination to the output transmitter 924.

At least one disconnected session already associated with the user is identified in response to the information. In one embodiment, the at least one disconnected session already associated with the user continues to execute at least one application. In another embodiment, the at least one disconnected session already associated with the user continues to execute a desktop session. In still another embodiment, a server 106 identifies the at least one disconnected session.

In one embodiment, a first session executing on a first server is identified. In some embodiments, a second session executing on a second server is identified. In one of these embodiments, one of the first session and the second session is identified as a disconnected session. In other embodiments, a second session executing on the first server is identified. In one of these embodiments, one of the first session and the second session is identified as a disconnected session.

The data store 926 includes information related to sessions 918 initiated by users. In one embodiment, the data store 926 is stored in volatile or non-volatile memory. In another embodiment, the data store 926 is distributed through multiple servers. Table 1 shows the data included in a portion of an illustrative data store 926.

TABLE 1

| | Session | | |
| --- | --- | --- | --- |
| | Session 1 | Session 2 | Session 3 |
| User ID | User 1 | User 2 | User 1 |
| Client ID | First Client | | First Client |
| Client Address | 172.16.0.50 | | 172.16.0.50 |
| Status | Active | Disconnected | Active |
| Applications | Word Processor | Data Base | Spreadsheet |
| Process Number | 1 | 3 | 2 |
| Server | Server A | Server A | Server B |
| Server Address | 172.16.2.55 | 172.16.2.55 | 172.16.2.56 |

The illustrative data store 926 in Table 1 includes data associating each session 918 with the user that initiated the session 918, an identification of the mobile computing device 102 or the client computing device 102b, if any, from which the user is currently connected to the server 106, and the internet protocol (IP) address of the mobile computing device 102 or the client computing device 102b. The illustrative data store 926 also includes the status of each session. A session 918 status can be, for example, "active" (meaning a user is connected to the session 918), or "disconnected" (meaning a user is not connected to the session 918). In another embodiment, a session status can also be set to "executing-disconnected" (meaning the user has disconnected from the session 918, but applications in the session 918 are still executing), or "stalled-disconnected" (meaning the user is disconnected and applications 916 in the session 918 are not executing, but their operational state immediately prior to the disconnection has been stored). The data store 926 further stores information indicating the applications 916 that are executing within each session 918 and data indicating a process associated with each application 916. In one embodiment, where the server 106 resides in a server farm, the data store 926 also includes the data in the last two rows of Table 1 that indicate on which server in the server farm each application 916 is or was executing, and the IP address of that server. In other embodiments, the data store 926 includes a status indicator for each application 916 in each session 918.

For example, and referring to Table 1, three sessions 918 exist, Session 1, Session 9, and Session 3. Session 1 is associated with User 1, who is currently using terminal 1. Terminal one's IP address is 172.16.2.50. The status of Session 1 is active, and in Session 1, a word processing program is being executed on Server A as process number 1. Server A's IP address is 172.16.2.55. Session 2 in Table 1 is an example of a disconnected session 918. Session 2 is associated with User 2, but Session 2 is not connected to a mobile computing device 102. Session 9 includes a database program that is executing on Server A, at IP address 172.16.2.55 as process number 3. Session 3 is an example of how a user can interact with sessions 918 operating on different servers 106. Session 3 is associated with User 1, as is Session 1. Session 3 includes a spreadsheet program that is executing on Server B at IP address 172.16.2.56 as process number 2, whereas the session 918 included in App Session 1 is executing on Server A.

In one embodiment, the server 106 also includes a rules source 928. In another embodiment, the rules source 928 stores rules specifying a policy applicable to a user requesting access to a session 918, or to an application 916 in a session 918. In still another embodiment, the rules stored in the rules source 928 are specified at least in part by the system administrator. In still even another embodiment, a user specifies at least some of the rules stored in the rules source 928. In this embodiment, the user-specified rule(s) may be referred to as preferences. In yet another embodiment, the rules source 928 can be stored in volatile or non-volatile memory or distributed through multiple servers.

In one embodiment, a rule stored in the rule source 928, for example, might require or forbid automatic connection to disconnected sessions 918. In another embodiment, a rule might require or forbid automatic connection to active sessions 918 currently connected to a different mobile computing device 102. In still another embodiment, a rule might make a connection contingent on the mobile computing device 102 residing within a secure network. In still even another embodiment, a rule might only allow connection to sessions 918 after receiving user approval. In still another embodiment, a rule might only allow connection for a predetermined time after disconnection. In yet another embodiment, a rule may only allow connection to sessions 918 that provide access to specific applications 916.

In some embodiments, the authentication module 930 authenticates a user that attempts to log on to the server 106. In one embodiment, the authentication module 930 receives user-provided authentication information transmitted from the mobile computing device 102. In another embodiment, the authentication module 930 authenticates the user based on user-provided authentication information. In yet another embodiment, the authentication module 930 transmits, responsive to a successful authentication, the results of the authentication process (e.g., allow or deny access, the user's system ID, mobile computing device ID, user access permissions, etc.) to the server process 922.

Unintentional termination of sessions 918 resulting from imperfect network connections or users' failure to terminate their sessions 918 themselves can lead to user difficulties. In one embodiment, these difficulties are addressed by differentiating disconnection (which is treated as if the user is not done working with a session 918) from termination (which is assumed to be an intentional completion of the session) and by correlating sessions 918 with users as opposed to correlating sessions with client computers. In some embodiments, when a user is finished executing an application 916 operating in a session 918, the user can terminate a session 918. In one of these embodiments, termination generally involves the affirmative input of the user indicating that the server should no longer maintain the session 918. In another of these embodiments, affirmative user input can include selecting an "Exit" option from a menu, clicking on an icon, or entering a termination command into a command-line interface. In still another of these embodiments, in response to receiving a termination request, the server process 922 terminates the execution of the session 918 and of any application 916 within that session 918 is halted. In another of these embodiments, data related to the session 918 is also removed from the data store 926.

In other embodiments, disconnection, either intentional or unintentional does not result in termination of sessions 918. In one of these embodiments, the application or applications operating in a session 918 are executing on the server 106 and a connection to the mobile computing device 102 is not usually necessary to continue execution of the applications 916. In another of these embodiments, the applications 916 continue to execute while waiting for a user to connect to the session 918. In still another of these embodiments, upon disconnection of a user, the server process 922 stalls the execution of the applications 916 operating in the session 918. In this embodiment, the server process 922 halts further execution of the applications 916, and the server process 922 stores the operational state of the application 916 and any data the application 916 is processing. In still even another of these embodiments, the server process 922 can selectively stall execution of specific applications 916 after a user disconnects. For example, and in one embodiment, the server continues execution of an application 916 for a fixed time period, and if a user fails to connect within that time period, the server process 922 stalls the application 916. In yet another of these embodiments, the server process 922 stalls specified sessions 918 that cannot continue executing without user input. In other embodiments, the server process 922 updates a data record associated with the application 916 or with the session 918 to include an identification of the status of the application or session.

In some embodiments, the server process 922 continues execution of the application 916 while the session 918 remains disconnected from the mobile computing device 102. In other embodiments, if the user of a mobile computing device 102 disconnects from the server 106 and then connects to the server 106 while operating the mobile computing device 102, the client computing device 102b, or a second client computing device 102n (not shown), the server process 922 can connect the user to one or more previously initiated, non-terminated session(s) 918 associated with the user, and reinitiate execution of any stalled applications 916.

In one embodiment, the server process 922 detects a disconnection. A user can intentionally and manually instruct the server to disconnect a session 918 from the mobile computing device 102. For example, in one embodiment, sessions 918 provide a menu option for disconnection (as distinguished from termination above) that a user can select. The server process 922 can also detect an unintentional disconnection. For example, in one embodiment, the network module 920 of the server 106 informs the server process 922 when a predetermined number of data packets transmitted by the network module 920 to a mobile computing device 102 have not been acknowledged by the mobile computing device 102. In another embodiment, the mobile computing device 102 periodically transmits a signal to the server 106 to confirm that a connection is still intact. If the server process 922 detects that a predetermined number of expected confirmation signals from a mobile computing device 102 have not arrived, the server process 922 determines that the mobile computing device 102 has disconnected. If the server process 922 detects that a user has disconnected from a session 918, either intentionally, or unintentionally, the entry in the data store 926 related to the disconnected session 918 is modified to reflect the disconnection.

A graphical representation of the at least one disconnected session associated with the user may be displayed to the user. The server process 922 transmits, to the client 102, a graphical representation of the at least one disconnected session associated with the user. In one embodiment, the graphical representation displays a representation of output data generated by an executing, disconnected session. In another embodiment, the graphical representation displays a representation of output data generated by an application executing in a disconnected session. In still another embodiment, the server process 922 transmits, to a mobile computing device 102, output data generated by an executing, disconnected session. In still even another embodiment, the mobile computing device 102 displays, to the user, a graphical representation of the output data. In yet another embodiment, the server process 922 transmits, to the mobile computing device 102, a graphical representation comprising a user interface element. In some embodiments, an output transmitter 924 transmits, to the mobile computing device 102, the output data generated by an executing, disconnected session.

In one embodiment, the server process 922 transmits, to the mobile computing device 102, a representation of a state of the at least one disconnected session associated with the user. In another embodiment, the server process 922 transmits, to the mobile computing device 102, a description of a state of the at least one disconnected session associated with the user. In still another embodiment, the server process 922 transmits, to the mobile computing device 102, a text-based description of a state of the at least one disconnected session associated with the user.

In some embodiments, the server process 922 transmits, to the mobile computing device 102 output data generated in the at least one disconnected session. In one of these embodiments, the mobile computing device 102 generates the representation, graphical or text-based, of the output data received from the at least one disconnected session. In another of these embodiments, the mobile computing device 102 displays the output data as described above. In still another of these embodiments, the mobile computing device 102 displays the representation of the output data in a window generated by an internet browser application. In yet another of these embodiments, the mobile computing device 102 replaces an existing representation of output data with an updated version of the representation. In some embodiments, the representation 950 (not shown) of the output data is graphical. In other embodiments, the representation of the output data is text-based.

In some embodiments, a graphical representation 950 may depict the output of multiple applications executing within a disconnected session 918. In one of these embodiments, the graphical representation 950 depicts the output of multiple applications executing from a desktop application, which is provided by a session 918. In other embodiments, a plurality of graphical representations 950 is displayed to the user of the mobile computing device 102. In one of these embodiments, a first graphical representation 950 in the plurality of graphical representations depicts a first type of session 918 and a second graphical representation 950' (not shown) in the plurality of graphical representations depicts a second type of session 918. For example, the first graphical representation 950 may depict the application-output data generated by a single application executing in a session 918, while the second graphical representation 950' may depict the output data generated by a plurality of applications executing within a hosted desktop session 918'. In still other embodiments, a single graphical representation 950 is depicted.

In some embodiments, the server process 922 identifies a change in the at least one disconnected session associated with the user and transmits a modified version of the at least one disconnected graphical representation of the at least one session displayed to the user, responsive to the identified change. In one of these embodiments, the server process 922 requests an identification of a change in the at least one disconnected session. In another of these embodiments, the server process 922 requests the identification of the change from a server executing the session 918. In still another of these embodiments, the server process 922 requests, after a time interval, an identification of a second change in the at least one session associated with the user. In still even another of these embodiments, the server process 922 polls a server executing the session 918 for changes in the at least one application session. In yet another of these embodiments, the server process 922 updates, after a time interval, the graphical representation of the at least one application session displayed to the user, responsive to an identification of a second change in the at least one application session associated with the user.

In other embodiments, the server process 922 queries the data store 926 to determine that a previously connected session has become disconnected from a mobile computing device 102. In one of these embodiments, the server process 922 instructs the output transmitter 924 to transmit, to the mobile computing device 102, the output data generated by the session 918 prior to the disconnection.

In some embodiments, the server process 922 receives a request for the identification of the change. In one of these embodiments, the server process 922 receives the request from the mobile computing device 102. In another of these embodiments, the server process 922 transmits the identification of the change to the mobile computing device 102. In other embodiments, the server process 922 transmits, to the mobile computing device 102, an updated graphical representation of the at least one session, responsive to an identification of a change in the at least one session associated. In still other embodiments, the server process 922 transmits, to the mobile computing device 102, output data generated in the session 918. In one of these embodiments, the mobile computing device 102 generates the graphical representation of the output data and displays the graphical representation to the user.

In some embodiments, the mobile computing device 102 requests, from the server 106, the identification of a change in the at least one previously disconnected session associated with the user. In other embodiments, the mobile computing device 102 requests, from a server 106, which executes the at least one previously disconnected session, the identification of a change in the at least one previously disconnected session associated with the user. In still other embodiments, the mobile computing device 102 requests, after a time interval, an identification of a change in the at least one previously disconnected session associated with the user. In still even other embodiments, the mobile computing device 102 polls a server for an identification of a change in the at least one previously disconnected session associated with the user.

In some embodiments, the mobile computing device 102 receives an identification of a change in the at least one previously disconnected session. In other embodiments, the mobile computing device 102 receives output data generated by a session during a time interval. In still other embodiments, the mobile computing device 102 receives a modified version of the graphical representation. In yet other embodiments, the mobile computing device 102 displays a modified version of the graphical representation.

Figure 7B:
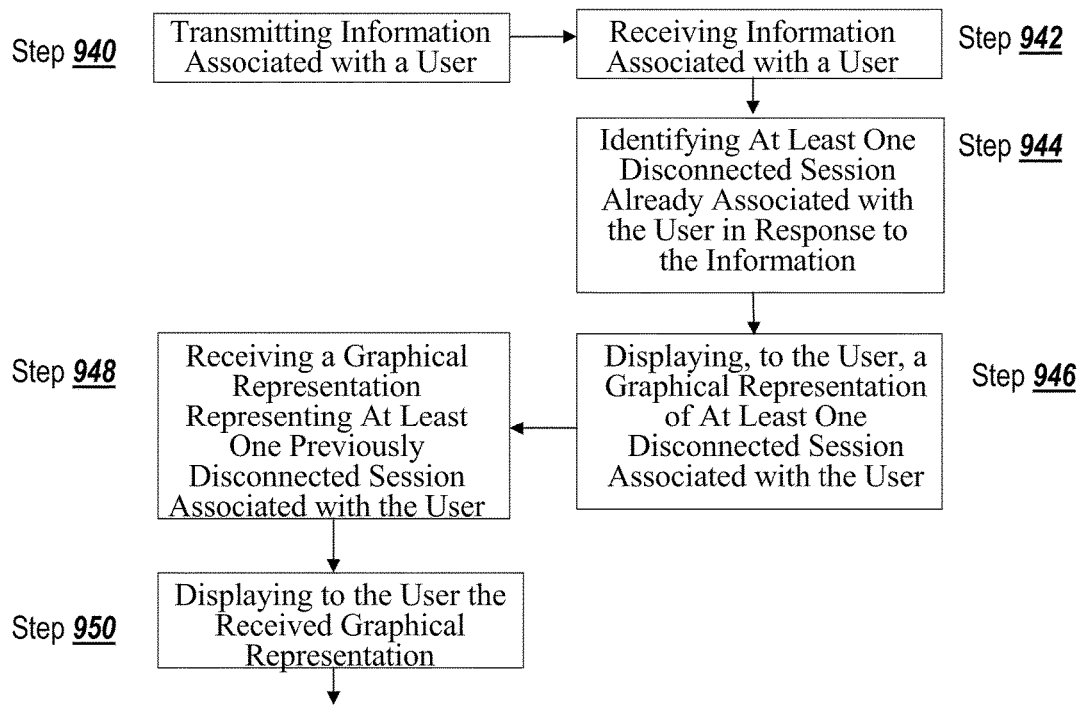
FIG. 7B is a flow diagram depicting an embodiments of the steps taken in a method for receiving output data generated by the at least one previously disconnected session.
Figure 7C:
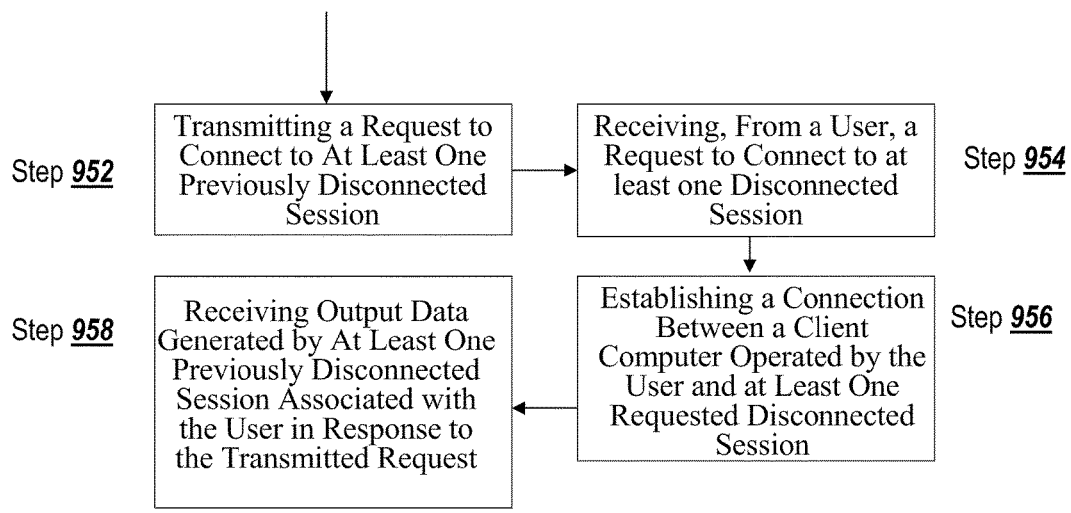
FIG. 7C is a flow diagram depicting one embodiment of the steps taken in a method for displaying and activating disconnected sessions with a mobile computing device and/or a client computing device.

Referring now to FIGS. 7B and 7C, a flow diagram depicts one embodiment of the steps taken in a method for displaying, activating, and providing remote access to disconnected sessions. The steps in the lefthand column may be taken, for example, by a client, such as a mobile computing device. The steps in the righthand column may be taken, for example, by a server. The method includes the step of transmitting information associated with a user. (step 940) The method includes the step of receiving information associated with a user. (step 942) At least one disconnected session already associated with the user is identified in response to the information. (step 944) A graphical representation of at least one disconnected session associated with the user is transmitted to the user. (step 946) A graphical representation representing at least one disconnected session associated with the user is received. (step 948) The graphical representation is displayed to the user. (step 950). A request to connect to the at least one previously disconnected session is transmitted. (step 952) A request from a user to connect to the at least one disconnected session is received. (step 954) A connection is established between a client computer operated by the user and the at least one disconnected session in the request. (step 956) Output data generated by the at least one disconnected session associated with the user is received in response to the transmitted request. (step 958)

Referring to FIG. 7B, and in greater detail, information associated with a user is transmitted. (step 940) In some embodiments, the information is a log-on request. In some embodiments, the information is a log-on request for access to a resource. In other embodiments, the information is a general log-on request for a server. In various embodiments, information may include authentication information. The authentication information may be any type of authentication information, include, for example, any username-password/PIN combinations, voice samples, one-time passcodes, biometric data, digital certificates, or smart card data.

In some embodiments, the information is accepted from a user by an input module, such as input module 208, and provided to a client process, such as client process 910. In some embodiments, the information is forwarded to server by a client process, a network module, or a client process and network module in communication with one another. In any embodiments described herein where information is transmitted, the information may be encapsulated in a predetermined protocol prior to transmission. In any embodiments described herein where information is transmitted, the information may be encrypted prior to transmission. In various embodiments, the information is transmitted over a data network or link.

Referring to FIG. 7B, and in greater detail, information associated with a user is received. (step 942) In various embodiments, the information is received by a server. In any embodiments described herein where information is received, the information may be decrypted. In some embodiments, the user is authenticated according to the received information. The information may be analyzed to authenticate the user according to any known method. For example, a hash function may be performed upon the information and the results compared with entries stored in a look-up table to determine if the user should be authenticated.

Referring to FIG. 7B, and in greater detail, at least one disconnected session already associated with the user is identified in response to the information. (step 944) In various embodiments, the information associated with a user includes information that identifies the user. In many embodiments, sessions may be stored in a database, such as a data store. Each session may include information about the session's status, e.g. active, disconnected, terminated, or any other known status. Each session may include information about a user corresponding to the session. The database may be searched for sessions that have a disconnected status and that correspond to the user. Information about the sessions, such as the sessions' server addresses and process numbers, may be stored in a memory or other buffer.

Referring to FIG. 7B, and in greater detail, a graphical representation of at least one disconnected session associated with the user is transmitted to the user. (step 946) In various embodiments, the graphical representation is generated by at least one disconnected session. In some embodiments, the graphical representation is generated by at least one application executing within the at least one disconnected session. The graphical representation may be a graphical-based or text-based representation of the at least one disconnected session. In some embodiments, the graphical representation includes a description of each of the disconnected sessions. In one embodiment, the graphical representation displays output data or a representation of output data generated by at least one disconnected session. In another embodiment, the graphical representation displays output data or a representation of output data generated by an application executing in at least one disconnected session. In various embodiments, the graphical representation includes a user interface element. In many embodiments, the graphical representation of at least one disconnected session associated with the user is transmitted using an output transmitter. In some embodiments, the output transmitter intercepts output data generated by at least one executing, disconnected session and transmits the output data.

Referring to FIG. 7B, and in greater detail, a graphical representation representing at least one disconnected session associated with the user is received. (step 948) In various embodiments, the graphical representation is received by a client process, a network module, or a client process and network module in communication with one another. In some embodiments, the graphical representation is manipulated into a format suitable for interpretation by a standard display adapter. In many embodiments, the graphical representation is stored in a frame buffer. Further, the graphical representation is displayed to the user. (step 950). In many embodiments, the graphical representation is displayed on a display module 924. In some embodiments, the graphical representation is displayed on a native display 201 of a mobile computing device 102. In other embodiments, the graphical representation is displayed on an external display device 202. In some embodiments, a client process transmits the graphical representation to a display module 924 for display on the device.

Referring to FIG. 7C, and in greater detail, a request to connect to the at least one previously disconnected session is transmitted. (step 952) In various embodiments, the request may include the server address, process number, or any other information about the disconnected sessions the user wishes to connect to. The user may make a request by selecting the graphical representation, in part or in whole, of a disconnected session. For example, the user may select an icon corresponding to the disconnected session to request connection. In another example, the user may select a disconnected session from a list of enumerated disconnected sessions. In yet another example, the user may select a disconnected session from a menu of disconnected sessions.

Referring to FIG. 7C, and in greater detail, a request from a user to connect to at least one disconnected session is received (step 954) and a connection is established between a client computer operated by the user and at least one disconnected session in the request. (step 956) In many embodiments, a server process may establish the connection. The connection may be established by forming a connection using the server address, the process number, and the client address. The connection may be established if the requested connection is consistent with a policy. For example, the connection may be established if the policy permits automatic re-connection of disconnected sessions. In another example, the connection may be established if the policy requires a client to reside on a secure network before a connection may be made, and the client does reside on a secure network. In some embodiments, when the connection is established, applications that may have stalled on the previously disconnected session may be re-executed.

Referring to FIG. 7C, and in greater detail, output data generated by the at least one disconnected session associated with the user is received in response to the transmitted request. (step 958) In various embodiments, the output data may be received from storage, such as a buffer, in an output transmitter. In other embodiments, the output data may be received from an output transmitter that intercepts output data generated by applications executing in the sessions and transmits the output data to a client.

Figure 8A:
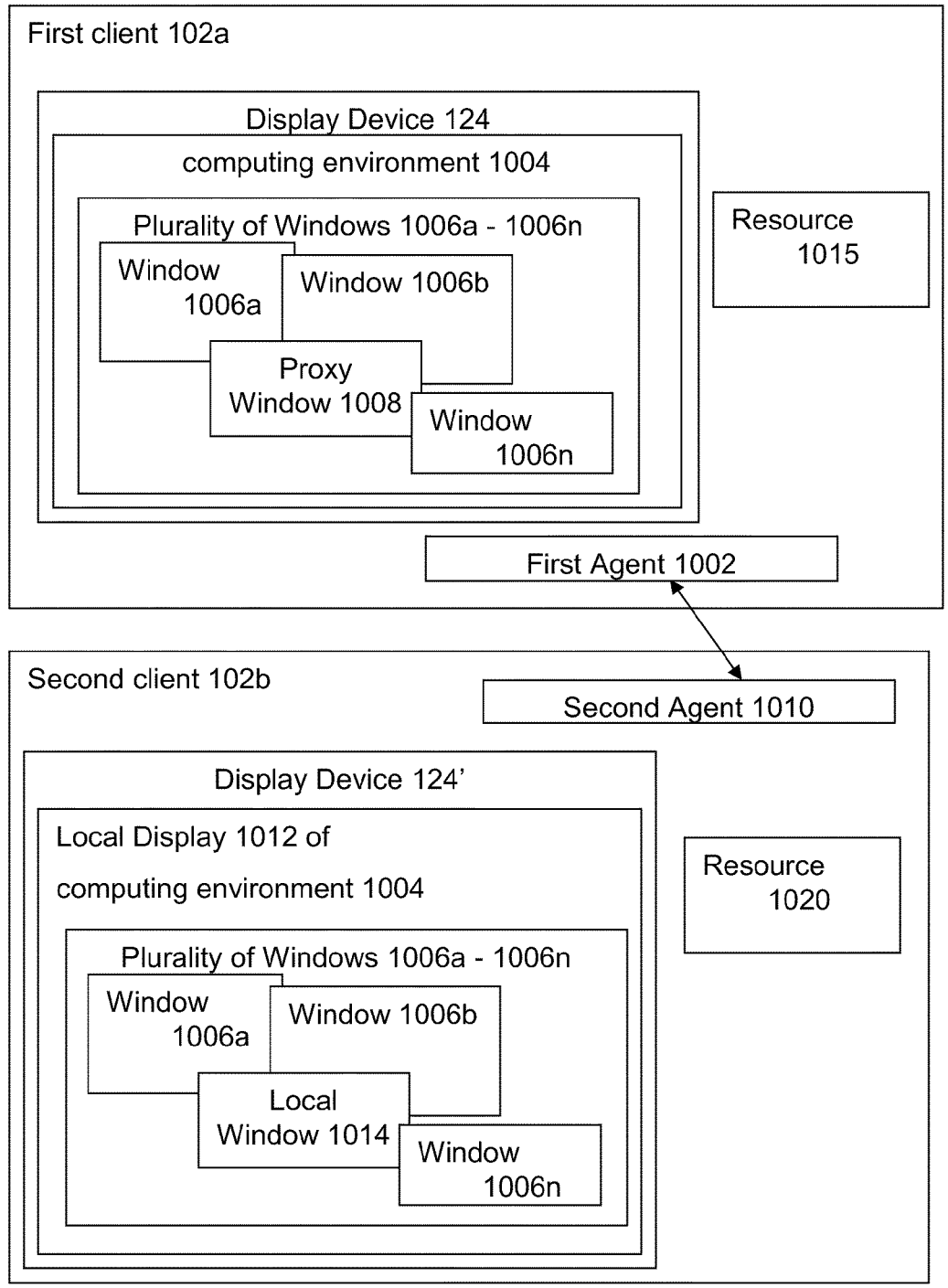
FIG. 8A is a block diagram depicting an embodiment of a system for generating a computing environment on a remote machine for display on a local machine.

Referring now to FIG. 8A, a block diagram depicts one embodiment of a system for generating a computing environment on a remote machine for display on a local machine. In brief overview, the system includes a first client 102*a*, a first agent 1002, a second client 102*b*, and a second agent 1010. The first agent 1002, executing on the first client 102*a*, generates a computing environment 1004, which includes a plurality of windows 1006*a*-1006*n* and provides access to i) a resource 1015 available to a user of the second client 102*b* and provided by the first client 102*a*, and ii) a resource 1020 provided by the second client 102*b* that is available to the user of the second client 102*b*. The first agent 1002 generates a proxy window 1008 for display in the computing environment 1004. The proxy window 1008 represents a local window 1014 on the second client 102*b* that displays output data generated by the resource 1020 provided by the second client 102*b*. The proxy window 1008 has a z-order entry in a z-order list associated with the plurality of windows 1006*a*-*n* in the computing environment 1004. The second agent 1010 on the second client 102*b* receives, from the first agent 1002, at least one entry in the z-order list associated with the computing environment 1004 and transmits, to the first agent 1002, an identification of a change to window attribute data associated with the window 1014 on the second client 102*b* for modification, by the first agent 1002, of the computing environment 1004.

In one embodiment, the first client 102*a* is a mobile computing device. In another embodiment, the second client 102*b* is a client computing device. In still another embodiment, one of the first client 102*a* and the second client 102*b* may be a server 106. In still even another embodiment a resource executes on a mobile computing device 102*a*. In yet another embodiment, the output data generated by an execution of a resource on the mobile computing device 102*a* is displayed on the second client which may be a client computing device. In some embodiments, the output data generated by an execution on a client 102*b* of a resource 204 is integrated into a display on the mobile computing device.

Referring now to FIG. 8A, and in greater detail, the first agent 1002, executing on the first client 102*a*, generates a computing environment 1004, which includes a plurality of windows 1006*a*-1006*n* and provides access to i) a resource 1015 available to a user of the second client 102*b* and provided by the first client 102*a*, and ii) a resource 1020 provided by the second client 102*b* that is available to the user of the second client 102*b*. In one embodiment, the first client 102*a* is a server 106. In another embodiment, the second client 102*b* is a client device 102, connecting to the server 106 to access one or more resource available to a user of the second client 102*b*.

In one embodiment, a resource 1015, 1020 comprises a program, an application, a document, a file, a plurality of applications, a plurality of files, an executable program file, a desktop environment, a computing environment, or other resource made available to a user of the second client 102*b*. The resource 1020 may be delivered to the second client 102*b* via a plurality of access methods including, but not limited to, conventional installation directly on the second client 102*b*, delivery to the second client 102*b* via a method for application streaming, delivery to the second client 102*b* of output data generated by an execution of the resource 1020 on a third machine 106' and communicated to the second client 102*b* via a presentation layer protocol, delivery to the second client 102*b* of output data generated by an execution of the resource 1020 via a virtual machine executing on a first client 102*a*, or execution from a removable storage device connected to the second client 102*b*, such as a USB device. In some embodiments, the second client 102*b* transmits output data generated by the execution of the resource 1020 to another client machine 102'.

In some embodiments, a user of a second client 102*b* connects to a first client 102*a* and views a display on the second client 102*b* of a local version 1012 of a computing environment 1004, comprising a plurality of windows 1006*a*-*n*, generated on the first client 102*a*. In one of these embodiments, at least one resource is provided to the user by the first client 102*a* and displayed in the computing environment 1004. However, there may be resources that the user executes on the second client 102*b*, either by choice, or due to a policy or technological requirement. In another of these embodiments, a user may invoke a local application from the remote desktop interface generated by the first client 102*a* and have the local application appear in the same desktop environment as the remote applications provided by the first client 102*a*. In still another of these embodiments, the user of the second client 102*b* would prefer an integrated desktop environment providing access to all of the resources available to the user, instead of separate desktop environments for resources provided by separate machines. For example, a user may find navigating between multiple graphical displays confusing and difficult to use productively. Or, a user may wish to use the data generated by one application provided by one machine in conjunction with another resource provided by a different machine. In another of these embodiments, requests for execution of a resource, windowing moves, application minimize/maximize, and termination of executing resources may be controlled by interacting with a computing environment that integrates the display of the remote resources and of the local resources. In yet another of these embodiments, an application or other resource accessible via an integrated desktop environment 1004—both those generated on the second client 102*b* and those generated on the first client 102*a*—is shown on the computing environment 1004 as if it were executing on, or executable from, the computing environment. For example, a resource may also appear in a listing of available resources provided in a Start Menu, a shortcut may be provided on the desktop or the Quick Launch menu, and the resources can be launched, selected and interacted with in the same way as an application provided by the first client 102*a*.

In some embodiments, a single computing environment 1004 is displayed. In one of these embodiments, the computing environment 1004 is displayed as a full-screen desktop. In other embodiments, a plurality of computing environments 1004 is displayed. In one of these embodiments, one or more of the computing environments are displayed in non-full-screen mode on one or more display devices 124. In another of these embodiments, the computing environments are displayed in full-screen mode on individual display devices. In still another of these embodiments, one or more of the computing environments are displayed in full-screen mode on one or more display devices 124. In yet another of the embodiments, a resource provided by the second client 102*b* may be integrated with one of the plurality of computing environments 1004.

In some embodiments, the first agent 1002 generates a computing environment 1004 including a plurality of windows 1006*a*-1006*n*. In one of these embodiments, a window 1006*a* in the plurality of windows 1006 displays the output data generated by an execution of a resource provided by the first client 102*a*. In another of these embodiments, a window 1006*b* in the plurality of windows 1006*a*-1006*n* displays the output data generated by an execution of a resource provided by a third machine 106', as discussed in further detail below, in connection with FIGS. 10A and 10B. In still another of these embodiments, a window 1006*c* in the plurality of windows 1006*a*-1006*n* depicts a taskbar from a desktop environment. In still even another of these embodiments, a window 1006*d* represents a menu, such as a Start menu or a context-specific menu associated with an application. In yet another of these embodiments, a window 1006e in the plurality of windows 1006a-n has a z-order entry such that it is displayed beneath the other windows in the plurality of windows 1006a-n and depicts a desktop. In other embodiments, the first agent 1002 transmits, to the second agent 1010, window attribute data associated with each of the plurality of windows 1006a-n. In one of these embodiments, the second agent 1010 displays a local version of the plurality of windows 1006a-n having window attribute data corresponding to the window attribute data received from the first agent 1002.

In one of these embodiments, the graphical display and the window attribute data for the plurality of windows 1006a-n and for the computing environment 1004 are transmitted to the second agent 1010 for generation of a local version of the computing environment 1004. In another of these embodiments, the second agent 1010 displays, to a user of the second client 102b, a local version 1012 of the plurality of windows 1006 and the computing environment 1004.

Figure 8B:
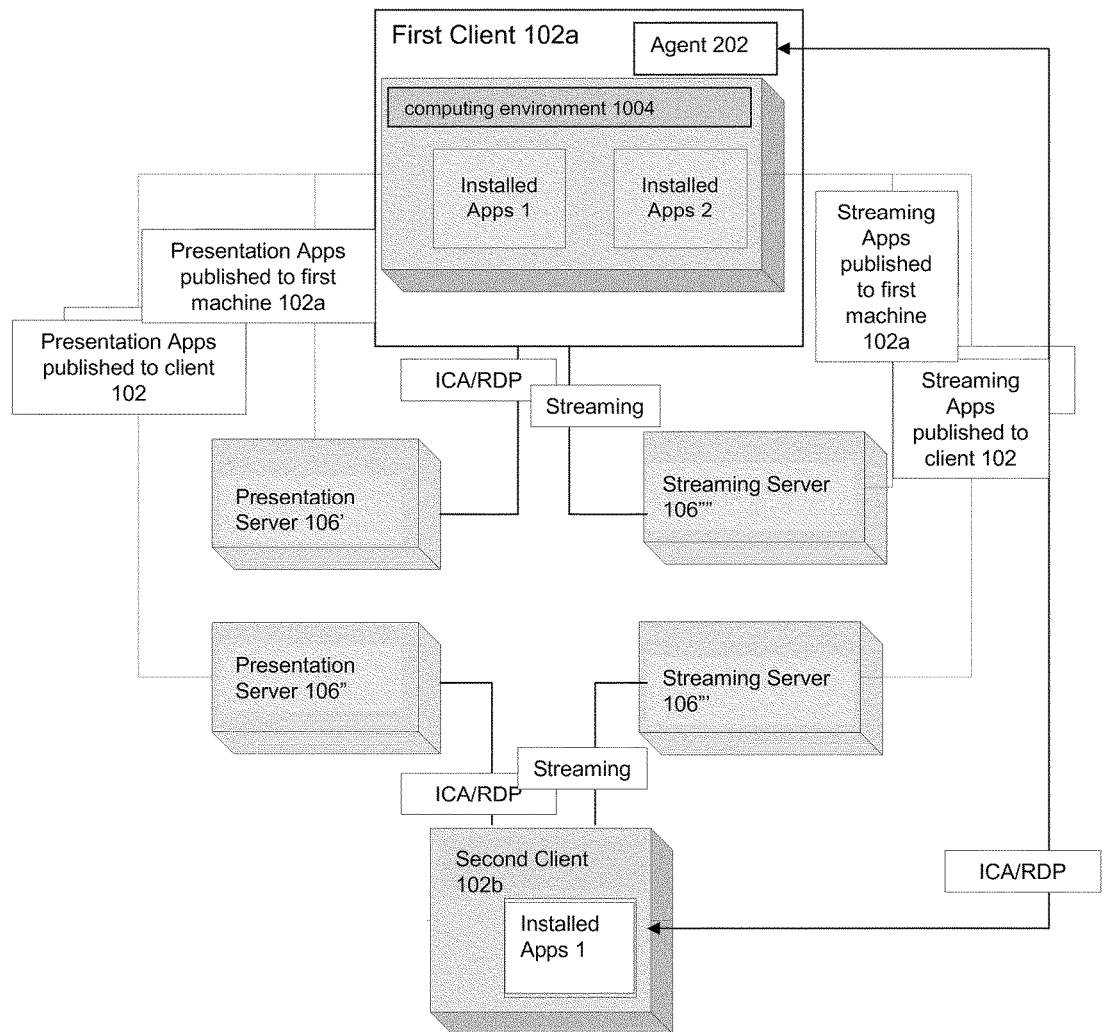
FIG. 8B is a block diagram depicting one embodiment of a system in which an agent integrates applications from various sources into a computing environment.

Referring ahead to FIG. 8B, a block diagram depicts one embodiment of a system in which the first agent 1002 integrates resources from various sources into a computing environment 1004. In some embodiments, and as shown in FIG. 8B, the first agent 1002 may receive the identification of the resources available to a user of the second client 102b from a plurality of servers 106. In one of these embodiments, the first agent 1002 receives an identification of the available resources from machines 106', 106", 106''', and 106''''.

In one of these embodiments, the first client 102a receives an identification of the available resources from server 106', receives the output data generated by an execution of the resource on server 106' and transmits the output data so generated to second client 102b.

In another of these embodiments, the first agent 1002 receives only the identification of the available resources from the machine 106", and the machine 106" transmits the output data generated by an execution of the resource to the second client 102b.

In one of these embodiments, the first agent 1002 receives, from a machine 106''', an identification of resources available to the second client 102b. In another of these embodiments, the first agent 1002 receives, from the second agent 1010, an identification of available resources from the machines 106''' and 106". In still another of these embodiments, the second client 102b receives, via a method for resource streaming, the available resource from the server 106'''. In this embodiment, the second client 102b executes the resource locally and the graphical output data is integrated with the computing environment 1004. In still even another of these embodiments, the first client 102a receives an identification of the available resources from server 106'''', and receives via a method for resource streaming, the available resource from machine 106'''' and transmits the output data generated by an execution of the resource to the second client 102b. In other embodiments, the first agent 1002 receives, from the second agent 1010, an identification of a resource 1020 available to the user of the second client 102b for integration into the computing environment 1004.

In one embodiment, executing a resource provided by the second client 102b may allow a user to leverage a characteristic of the second client 102b that is not provided by the first client 102a; for example, the second client 102b may have more appropriate processing ability, graphics functionality, bandwidth, or license rights for accessing the resource than the first client 102a. In another embodiment, the first client 102a may lack the ability to execute the resource; for example, because only the user of the second client 102b owns an application or owns a resource, such as an operating system, required to execute the application. In still another embodiment, the resource 1020 is a resource such as an application or desktop environment installed on the second client 102b via a method for streaming the application to the second client 102b from a third machine 106'. In still even another embodiment, the resource 1020 is a resource such as an application or desktop environment whose output data the second client 102b receives via a presentation layer protocol communication with a third machine 106'. In yet another embodiment, the first agent 1002 receives an identification of a conferencing or Internet-communication application; a user peripheral, such as a media player, a digital camera or a web camera; or a processor-intense, data-intense, or graphics-intense application, such as a media-editing application or a computer-aided design application.

Referring back to FIG. 8A, the first agent 1002 incorporates the identification of the resource 1020 into the computing environment 1004. In one of these embodiments, the first agent 1002 adds a program execution shortcut to a menu for requesting execution of resources, the program execution shortcut corresponding to the identified resource 1020. In another of these embodiments, the first agent 1002 generates a graphical representation, such as an icon, associated with the resource 1020 for display in the computing environment 1004. The first agent 1002 may alternatively receive the graphical representation from the second agent 1010 for display in the computing environment 1004. In still another of these embodiments, a user requests execution of a resource 1020 by interacting with a program execution shortcut or a graphical representation displayed in the local version of the computing environment 1004.

In one embodiment, the first agent 1002 receives the request for execution of a resource 1020, responsive to the user interaction with a program execution shortcut or a graphical representation, and sends the request for execution to the second agent 1010. In another embodiment, a user requests execution of a resource by interacting with the local display 1012 of the computing environment 1004; for example, by selecting a graphical representation of a file, document, uniform resource locator, or other resource, displayed by the desktop environment.

The first agent 1002 generates a proxy window 1008 for integration into the computing environment 1004. In one embodiment, the first agent 1002 is referred to as a proxy window management component 1002. In another embodiment, the proxy window management component 1002 is responsible for making the proxy window 1008 conform to client-initiated changes to window attribute data. In still another embodiment, the proxy window management component 1002 is responsible for monitoring any desktop-initiated changes to window attribute data and communicating them to the second agent 1010, which applies them to the corresponding local application window 1014.

In yet another embodiment (not shown in FIG. 8A), the proxy window management component 1002 provides additional functionality. In one of these embodiments, such functionality may include a MICROSOFT Active Accessibility (MSAA) hook and other monitoring mechanisms to detect new application windows and window attribute data changes initiated on the desktop. In another of these embodiments, the proxy window management component 1002 may further include support for launching published applications. In still another of these embodiments, the proxy window management component 1002 may send updates initiated from the remote machine 106 [desktop] regarding changes to window attribute data to the second agent 1010 where the updates will be applied to the local window 1014, and to the local displays of the plurality of windows 1006a-n. In still even another of these embodiments, the proxy management component 1002 may be enabled to apply client-initiated updates to window attribute data associated with proxy window 1008 and to the plurality of data objects 1006a-n. In yet another of these embodiments, the proxy management component 1002 may remove proxy windows when the client connection disappears.

In some embodiments, the first agent 1002 and the second agent 1010 include a hooking component for intercepting window-related messages. For example, and in some embodiments, an agent executing on a machine 102 or 106 on which the MICROSOFT WINDOWS operating system executes may use a version of the MICROSOFT Active Accessibility hook to monitor relevant window events. For example, and in other embodiments, an agent may include a MICROSOFT Computer-based Training (CBT) window hook, or other hooking mechanisms, to intercept and monitor window events.

The proxy window 1008 represents a window 1014 on the second client 102b that displays output data generated by the resource 1020 provided by the second machine. The proxy window 1008 has a z-order entry in a z-order list associated with the plurality of windows 1006a-n in the computing environment 1004. In one embodiment, the proxy window 1008 has a traditional window visual state—position, size, Z-order, focus state, minimized/normal/maximized state—and a taskbar button, and appears in the remote desktop Alt-TAB selection dialog. In another embodiment, the proxy window 1008 responds to requests, initiated by the remote desktop, to change visual state or to invoke its taskbar menu. In still another embodiment, the visual state of the local application window 1014 is synchronized with the visual state of the corresponding proxy window 1008. In still even another embodiment, the proxy window 1008 can pass visual state change requests to the second agent 1010, via the first agent 1002, without needing to apply them to itself.

In one embodiment, the first agent 1002 does not transmit the proxy window 1008 to the second agent 1010, only window attribute data associated with the proxy window 1008. In another embodiment, the proxy window 1008 does not need to be painted on the computing environment 1004, or can be painted very efficiently e.g. in a uniform color. In still another embodiment, the first agent 1002 is aware of the clipping regions associated with the proxy window 1008 and does not send window attribute data for those regions.

The second agent 1010 on the second client 102b receives, from the first agent 1002, at least one entry in the z-order list associated with the computing environment 1004.

The second agent 1010 transmits, to the first agent 1002, an identification of a change to window attribute data associated with the window 1014 on the second client 102b for modification, by the first agent 1002, of the computing environment 1004. In one embodiment, the second agent 1010 is an integrated window management component 1010 executing on the second client 102b that enumerates, monitors, and manages local windows 1014 that are integrated into the remote desktop 1004. In another embodiment, the integrated window management component 1010 manages all local windows 1014 that are integrated into the remote desktop 1004. In still another embodiment, the integrated window management component 1010 communicates window existence and client-initiated visual state changes over a virtual channel to the first agent on the first client 102a.

In yet another embodiment, the integrated window management component 1010 provides additional functionality. In one of these embodiments, such functionality may include a MICROSOFT Active Accessibility (MSAA) hook and other monitoring mechanisms to detect new application windows and window attribute data changes initiated on the client. In still another of these embodiments, the proxy window management component 1002 may send updates initiated from the client 102a regarding changes to window attribute data to the first agent 1002 where the updates will be applied to the proxy window 1008, and to the local displays of the plurality of windows 1006a-n. In still even another of these embodiments, the proxy management component 1002 may be enabled to apply desktop-initiated updates to window attribute data associated with local window 1014 and to the local displays of the plurality of windows 1006a-n.

In some embodiments, a first client 102a and a second client 102b communicate using a presentation layer protocol, for example, by communicating via the ICA protocol, or the RDP protocol. In one of these embodiments, the first agent 1002 and the second agent 1010 exchange graphical data, i.e., the data actually displayed in each window on the desktop environment, via a first virtual channel. In another of these embodiments, the first virtual channel is an ICA virtual channel. In still another of these embodiments, information about window positioning, window size, z-ordering of window and other such information is communicated between the first client 102a and the second client 102b via a second virtual channel. In yet another of these embodiments, the second virtual channel is an ICA virtual channel. In other embodiments, the first agent 1002 and the second agent 1010 exchange window attribute data. In one of these embodiments, the first agent 1002 and the second agent 1010 also exchange graphical data. In another of these embodiments, a third agent executing on the first client 102a and the second agent 1010 exchange graphical data. In still another of these embodiments, a third agent executing on the first client 102a and a fourth agent executing on the second client 102b exchange graphical data.

Figure 9A:
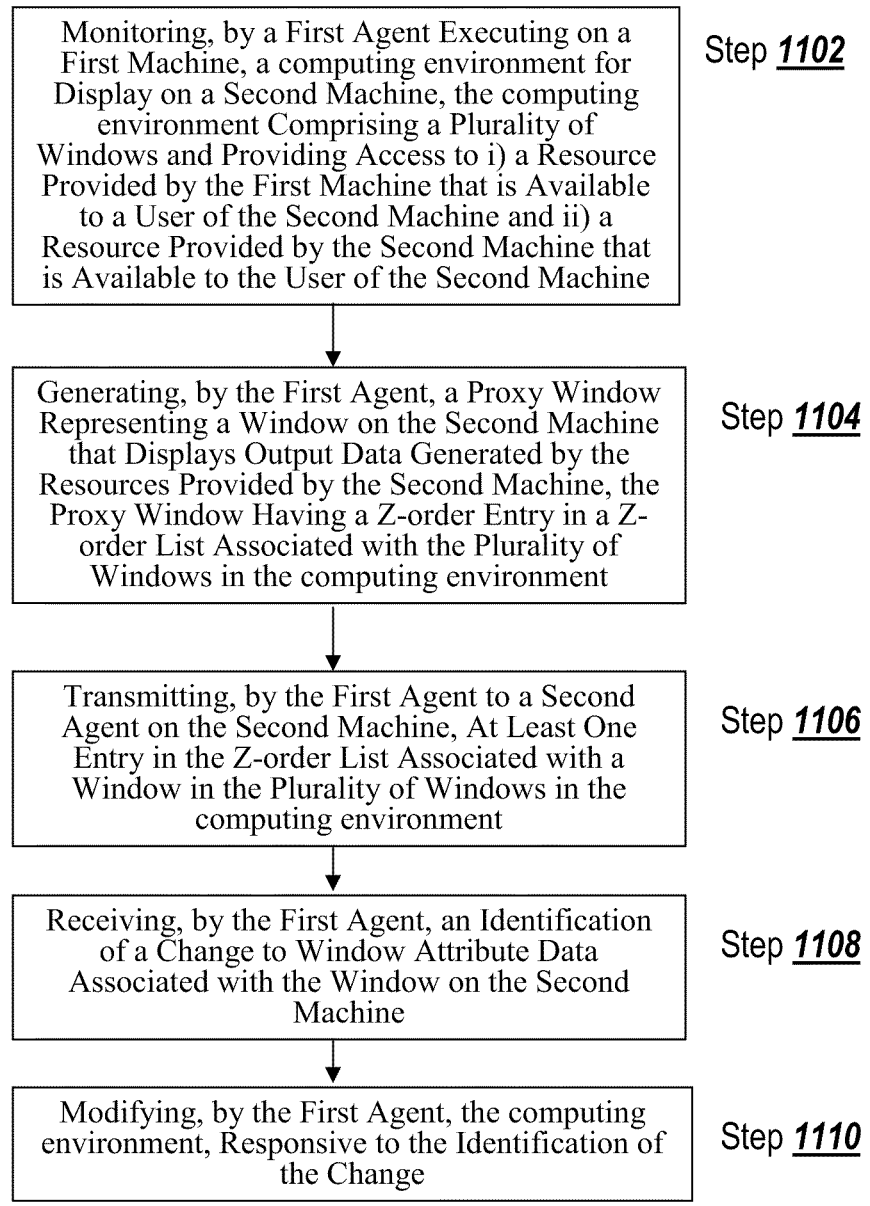
FIG. 9A is a flow diagram depicting one embodiment of the steps taken in a method for generating a computing environment on a remote machine for display on a local machine.

Referring now to FIG. 9A, a flow diagram depicts one embodiment of the steps taken in a method for generating a computing environment on a remote machine for display on a local machine. In a networked computing system including a remote machine and a local machine used by a user, a method for generating a computing environment on the remote machine for display on the local machine, the computing environment providing integrated access both to resources provided by the local machine and to resources provided by the remote machine, includes the step of monitoring, by a first agent executing on a first machine, a computing environment for display on a second machine, the computing environment comprising a plurality of windows and providing access to i) a resource provided by the first machine that is available to a user of the second machine and ii) a resource provided by the second machine that is available to the user of the second machine (step 1102). The first agent generates a proxy window representing a window on the second machine that displays output data generated by the resources provided by the second machine, the proxy window having a z-order entry in a z-order list associated with the plurality of windows in the computing environment (step 1104). The first agent transmits, to a second agent on the second machine, at least one entry in the z-order list associated with a window in the plurality of windows in the computing environment (step 1106). The first agent receives an identification of a change to window attribute data associated with the window on the second machine (step 1108). The first agent modifies the computing environment, responsive to the identification of the change (step 1110).

A first agent executing on a first machine monitors a computing environment for display on a second machine, the computing environment comprising a plurality of windows and providing access to i) a resource provided by the first machine that is available to a user of the second machine and ii) a resource provided by the second machine that is available to the user of the second machine (step 1102). In one embodiment, the first agent 1002 monitors the generation and modification of the computing environment 1004 and of a plurality of windows 1006a-n providing access to a plurality of resources 1015 executing on remote servers, such as the first client 102a, and to at least one resource 1020 provided by the second client 102b.

The first agent generates a proxy window representing a window on the second machine that displays output data generated by the resources provided by the second machine, the proxy window having a z-order entry in a z-order list associated with the plurality of windows in the computing environment (step 1104). In one embodiment, the local window 1014 is reflected into the remote desktop window list using the proxy window 1008, which has dimensions, position, Z-order value and focus state in the computing environment 1004. These window attributes are kept in synch between the second client 102b and the first client 102a.

In some embodiments, the second agent 1010 receives an identification of a region in the computing environment corresponding to a region on the local display 1012 associated with a local resource 1020. In one of these embodiments, the second agent 1010 receives the identification from the first agent 1002. In another of these embodiments, described in additional detail below, the second agent 1010 identifies the region responsive to information received from the first agent 1002. In still another of these embodiments, as described in additional detail below, the second agent 1010 identifies the region responsive to identifying a color key in a communication from the first agent 1002.

In some embodiments, the local display 1012 is a single window that displays the graphical output data of the computing environment 1004, including the window output for the plurality of windows 1006a-n. In one of these embodiments, an individual window 1006a does not need to have a corresponding seamless window on the client. In another of these embodiments, the local display 1012 is maintained as the topmost window, thus keeping local applications underneath the local display 1012 in the client Z-order. In still another of these embodiments, a region of local display 1012 is shown as transparent to allow the correct parts of a local window 1014 to show through the local display 1012, as if the local window 1014 were on the computing environment 1004. In still even another of these embodiments, the proxy window 1008 is displayed on a region of the computing environment 1004 corresponding to the region of local display 1012 which is to be transparently displayed. In yet another of these embodiments, the transparent region is referred to as a clipping region.

In some embodiments, to identify the areas to be made transparent, the first agent 1002 uses the proxy window 1008 to identify a clipping region. In one of these embodiments, the first agent 1002 intercepts a paint request on the computing environment 1004. In another of these embodiments, the first agent 1002 transmits, to the second agent 1010, an identification of a clipping region.

In other embodiments, the second agent 1010 identifies the areas of local display 1012 to be displayed by the local resource 1020. In one of these embodiments, the second agent 1010 identifies the areas responsive to information received from the first agent 1002.

In another of these embodiments, the second agent 1010 identifies a key received from the first agent 1002, such as a color key or an identifiable pattern or tag identifying a clipping region.

In still other embodiments, the second agent 1010 ensures that the resource 1020 paints output data to the appropriate local window 1014, which is located in a region corresponding to the clipping region on the computing environment. In one of these embodiments, the second agent 1010, in communication with a window management component, ensures that the local display 1012 is kept topmost and displays the graphical output data associated with the computing environment 1004, other than the output data that would be displayed in a clipping region. In another of these embodiments, the second agent 1010 instructs a window management component to regard an instruction to paint a particular color or pattern to a region (for example, to a region of the local display 1012) as an instruction to keep the region transparent. This color key may include an alpha value (e.g., a 32-bit {R,G,B,alpha} rather than a 104-bit {R,G,B} value) which can be used to distinguish it from all non-transparent colors (for resources that don't use partial transparency).

In yet other embodiments, the agent 1002 paints a clipping region for a proxy window 1008 by responding to a paint request from a window management component to the proxy window by painting the window in a color key. In one of these embodiments, the agent 1010 associates a paint request in a color key with the appropriate local application window. In another of these embodiments, the agent 1010 also needs to use paint requests in a different color for a (part of) an existing clipping region to remove the painted region from the associated clipping region.

In some embodiments, the first agent 1002 may paint a clipping region in the color key rather than send a z-order entry to the second agent 1010. In other embodiments, the first agent 1002 sends at least one z-order entry for a proxy window 1008 associated with a local window 1014. In one of these embodiments, the second agent 1010 ensures that a local window 1014 has the same relative Z-order relationship on the client as the corresponding proxy window 1008 does on the first client 102a, i.e. if proxy window 1008 is below proxy window 1008' on the first client 102a (regardless of how many server windows there are, and whether they are above or below either A or B), then the second agent 1010 ensures that a local window 1014 is below a local window 1014'.

In other embodiments, the windows underneath the local display 1012 show through wherever the local display 1012 is painted in the color key. In one of these embodiments, the second agent 1010 maintains the local windows in the appropriate relative Z-order so that they will paint correctly and a window that's above another will correctly occlude the other even though both occupy the entire clipping region. In another of these embodiments, the second agent 1010 also ensures that user input will be directed to the correct window—for example a mouse click on a transparent region will be sent to the underlying window, not the local display 1012.

In some embodiments, the first agent 1002 transmits to the second agent 1010 an identification of a clipping region for each proxy window 1008 in a computing environment 1004. In one of these embodiments, the second agent 1010 directs the local resource 1020 to paint output data to the region of local display 1012 corresponding to the clipping region. In another of these embodiments, directing the local resource 1020 to paint output data to a region of the local display 1012 avoids the need for transparency. In still another of these embodiments, the first agent 1002 identifies a clipping region on the computing environment 1004 that corresponds to a region displaying local window 1014. In still even another of these embodiments, the first agent 1002 uses a color key or identifiable pattern or tag as described above to tag a clipping region. In one of these embodiments, the agent 1002 or the agent 1010 associates a paint request in a color key with the appropriate local application window. In another of these embodiments, the agent 1002 or the agent 1010 responds to paint requests in a different color for a (part of) an existing clipping region for an application window by removing the newly painted region from the associated clipping region. In still another of these embodiments, the agent 1002 or agent 1010 associates a different color key for each local window. In yet another of these embodiments, the second agent 1010 identifies a clipping region responsive to information received from the first agent 1002.

In some embodiments, the first agent 1002 may paint a clipping region in a color key rather than send a z-order entry to the second agent 1010. In other embodiments, the first agent 1002 may send an identification of a clipping region to the second agent 1010 rather than send a z-order entry to the second agent 1010. In still other embodiments, the first agent 1002 may send information other than a z-order entry to agent 1010 that allows agent 1010 to identify a clipping region rather than send a z-order entry to the second agent 1010. In yet other embodiments, the first agent 1002 does not send a z-order entry to the second agent 1010 at all.

In other embodiments, the second agent 1010 ensures that the local display 1012 is maintained topmost in the local desktop environment. In one of these embodiments, the local display 1012 is used to show all of the remote desktop graphics output including areas belonging to local window 1014. In another of these embodiments, local windows substantially never show through. In still another of these embodiments, when the second agent 1010 receives output data not containing the color key for a portion of a clipping region associated with a local window, the second agent 1010 removes the output region from the clipping region for that window.

In still other embodiments, the second agent 1010 directs the local resource 1020 to paint the output data it generates to a region in the local display 1012 corresponding to the region identified by the first agent 1002 as a clipping region. In one of these embodiments, the second agent 1010, in communication with a window management component, sends the local resource 1020 a WM_PAINT message for a display context that references a clipping region on the local display 1012. In another of these embodiments, the second agent 1010 sends the messages for any updated portions of a local window's associated clipping region whenever portions of the clipping region change. In still another of these embodiments, the second agent 1010 sends the paint messages in a periodic refresh loop as local windows are always covered by the local display 1012 and can no longer asynchronously update their regions that are visible on the client display. In still even another of these embodiments, the second agent 1010 ensures that user input in clipping regions (including mouse clicks and, where appropriate, keyboard events) are redirected by the local display 1012 to the corresponding local application window. This means detecting mouse events in clipping regions, determining which local window is associated with the mouse event coordinates and sending the event to that window at those coordinates.

As described above, in some embodiments, a clipping region is identified. In one of these embodiments, an agent 1002 or 1010 calculates a clipping region responsive to information associated with the computing environment, including a list of windows, their Z-order, size & position (and, for non-rectangular windows, their shape). In another of these embodiments, the agent 1002 or 1010 acquires the information from one or more sources including, but not limited to, the seamless virtual channel, data used by the Headless Client, subclassing windows, Microsoft Active Accessibility (e.g. using WinEvents and MSAA hooking) and by hooking various Windows APIs. In still another embodiment, the agent 1002 or 1010 identifies a clipping region, or portion of a clipping region, by hooking or responding to window messages (including WM_PAINT, WM_NCPAINT, WM_ERASEBKGND) which allow the agent 1002 or 1010 to see requests by Windows for a window to perform a paint operation within a region. Each time the agent 1002 or 1010 identifies one of these messages, the corresponding region is added to the clipping region for the associated window. The agent 1002 or 1010 uses knowledge of which windows receive which paint requests to maintain a record of which regions of the screen "belong" to each application window. Each time the agent 1002 or 1010 intercepts a paint request for a different window covering (all or part of) an existing clipping region for another window, that part is removed from that window's clipping region. The agent 1002 or 1010 can also directly retrieve the clipping region using Windows API functions such as GetRandomRgn( ) which allows the agent 1002 or 1010 to directly interrogate a window for clipping regions. In some embodiments, the agents 1002 and 1010 communicate as described above to exchange information required by the second agent 1010 to modify the local display 1012 or local windows 1014 or local windows corresponding to the plurality of windows 1006a-n, as described below in connection with FIG. 9B.

The first agent transmits, to a second agent on the second machine, at least one entry in the z-order list associated with a window in the plurality of windows in the computing environment (step 1106). In some embodiments, the first agent 1002 transmits to the second agent 1010 the entire z-order list. In other embodiments, the first agent 1002 transmits to the second agent 1010 a partial z-order list. In one embodiment, the first agent 1002 transmits the at least one entry in the z-order list to the second agent 1010 via a virtual channel coupled to the computing environment 1004. In another embodiment, the first agent 1002 transmits, to the second agent 1010, via a virtual channel conveying window attribute data associated with the proxy window 1008, messages directing the modification of a corresponding local window 1014, which displays, in accordance with the window attribute data conveyed by the virtual channel, graphical output data generated by a resource 1020 executing on the second client 102b.

In one embodiment, the second client 102b displays a local version of each of the plurality of windows 1006a-n. In another embodiment, the second agent 1010 directs a window management component on the second client 102b to assign each of the locally-displayed windows 1006a-n a z-order entry in a z-order list of windows displayed on the second client 102b. Each of the assigned z-order entries for each of the locally-displayed windows 1006a-n result in the display of the locally-displays windows 1006a-n above a local window associated with a local application on the second client 102b other than the local display of a local application displayed in local window 1014. In this embodiment, the local window is kept below the local display 1012 of the computing environment 1004 in the client-side Z-order—that is, it is kept below each of the windows in the plurality of windows 1006a-n and below the local window 1014, which is integrated with the plurality of windows 1006a-n. In still another embodiment, the plurality of windows 1006a-n and the local window 1014 are displayed on the second client 102b according to the z-order list maintained on the first client 102a.

The first agent receives an identification of a change to window attribute data associated with the window on the second machine (step 1108). In one embodiment, the first agent 1002 receives the identification of the change via a virtual channel. In another embodiment, the first agent 1002 receives a message that a user minimized the local window 1014. In still another embodiment, the first agent 1002 receives a message that a user restored a minimized local window 1014. In still even another embodiment, the first agent 1002 receives a message that a user changed a size or position of the local window 1014. In yet another embodiment, the first agent 1002 receives a message that a user maximized a local window 1014.

The first agent modifies the computing environment, responsive to the identification of the change (step 1110). In some embodiments, the first agent 1002 directs a window management component of an operating system executing on the first client 102a to modify a window displayed in the computing environment. In other embodiments, the first agent 1002 sends a message to the second agent 1010 to restore the local window 1014. In one of these embodiments, the second agent 1010 sends a message to the resource 1020 to restore the minimized local window 1014. In another of these embodiments, the first agent 1002 sends a message to a window management component of an operating system executing on the first client 102a to restore the proxy window 1008. In still other embodiments, the first agent 1002 sends a message to the second agent 1010 to terminate the execution of a local resource 1020 when the first agent 1002 terminates the generation and display of the computing environment 1004. In some embodiments, the first agent 1002 sends a message to the second agent 1010 to terminate an operating system executing on the second client 102b.

In one of these embodiments, the first agent 1002 sends a message to the second agent 1010 to shut down the second client 102b.

In one embodiment, when a window 1006a associated with a remote resource 1015 is selected by a user and the local window 1014 loses focus, the second agent 1010 transmits a message to the first agent 1002 instructing the first agent 1002 to direct a window management component to remove focus from the proxy window 1008 and to focus on a window 1006a in the plurality of windows 1006a-n. In another embodiment, when a window 1006a associated with a remote resource 1015 is selected by a user and the local window 1014 loses focus, the second agent 1010 allows the resource 1020 to paint inside its window, resulting in a completely transparent view of local and remote resources.

Figure 9B:
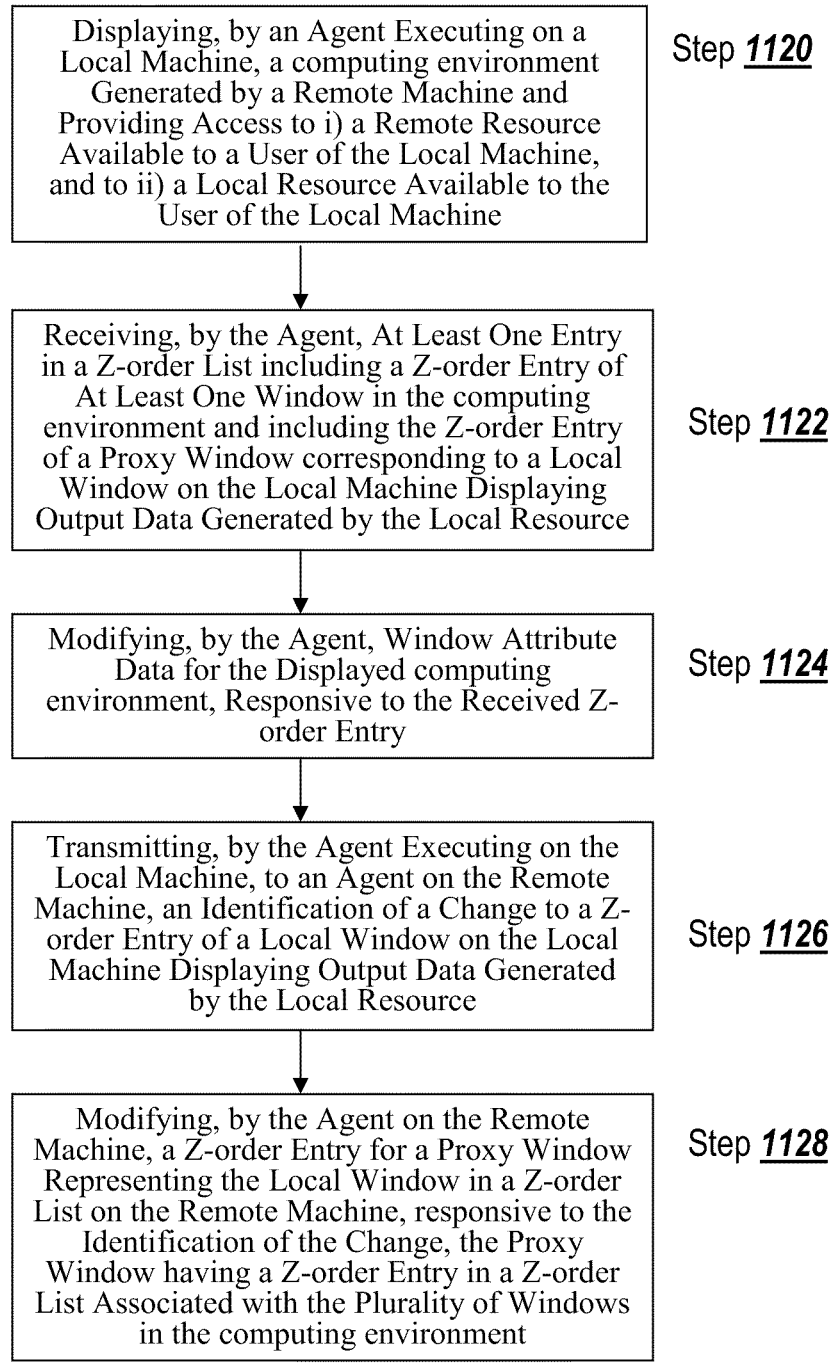
FIG. 9B is a flow diagram depicting one embodiment of the steps taken in a method for displaying, on the local machine, a desktop environment that is generated by the remote machine.

Referring now to FIG. 9B, a flow diagram depicts one embodiment of the steps taken in a method for displaying, on the local machine, a desktop environment that is generated by the remote machine, the computing environment providing integrated access to both resources provided by the local machine and to resources provided by the remote machine. In brief overview, the method includes the step of displaying, by an agent executing on a local machine, a computing environment generated by a remote machine and providing access to i) a remote resource available to a user of the local machine, and to ii) a local resource available to the user of the local machine (step 1120). The agent receives at least one entry in a z-order list including a z-order entry of at least one window in the computing environment and including the z-order entry of a proxy window corresponding to a local window on the local machine displaying output data generated by the local resource (step 1122). The agent modifies window attribute data for the displayed computing environment, responsive to the received z-order entry (step 1124). The agent executing on the local machine transmits, to an agent on the remote machine, an identification of a change to a z-order entry of a local window on the local machine displaying output data generated by the local resource (step 1126). The agent on the remote machine modifies a z-order entry for a proxy window representing the local window in a z-order list on the remote machine, responsive to the identification of the change, the proxy window having a z-order entry in a z-order list associated with the plurality of windows in the computing environment (step 1128).

An agent executing on a local machine displays a computing environment generated by a remote machine and providing access to i) a remote resource available to a user of the local machine, and to ii) a local resource available to the user of the local machine (step 1120). In one embodiment, the agent 1010 receives graphical data and window attribute data from the agent 1002 and displays the graphical data in a window formed according to the window attribute data. In another embodiment, the agent 1010 receives graphical data and corresponding window attribute data for a plurality of windows forming a computing environment and displays the graphical data in a plurality of windows formed according to the window attribute data. In other embodiments, the first agent 1002 and the second agent 1010 exchange window attribute data. In one of these embodiments, the first agent 1002 and the second agent 1010 also exchange graphical data. In another of these embodiments, a third agent executing on the first client 102a and the second agent 1010 exchange graphical data. In still another of these embodiments, a third agent executing on the first client 102a and a fourth agent executing on the second client 102b exchange graphical data. In yet another of these embodiments, the first agent 1002 on the first client 102a and a fourth agent executing on the second client 102b exchange graphical data.

The agent receives at least one entry in a z-order list including a z-order entry of at least one window in the computing environment and including the z-order entry of a proxy window corresponding to a local window on the local machine displaying output data generated by the local resource (step 1122). In one embodiment, the agent 1010 displays a local window 1014 displaying output data, generated by an execution of the resource 1020, and a plurality of windows 1006a-n formed in accordance with received window attribute data, in accordance with the at least one entry in the z-order. In another embodiment, the agent 1010 monitors the local display of the plurality of windows 1006a-n and of the local window 1014. In another embodiment, the agent 1010, in communication with a window management component of an operating system executing on the second client 102b, manages the local display of the plurality of windows 1006a-n and of the local window.

The agent modifies window attribute data for the displayed computing environment, responsive to the received z-order entry (step 1124). In some embodiments, the agent modifies a z-order entry for a local version of a window 1006a in the plurality of windows 1006a-n. In other embodiments, the agent modifies window attribute data for a local version of a window 1006a in the plurality of windows 1006a-n. In one of these embodiments, the agent resizes the local version of the window 1006a in the plurality of windows 1006a-n. In one of these embodiments, the agent repositions the local version of the window 1006a in the plurality of windows 1006a-n. For example, the agent may modify window attribute data of the local window 1014 responsive to the received z-order entry sent as a result of a window management component implementing a window cascade on the server.

In some embodiments, as described above in connection with FIG. 9A (step 1106), rather than receiving a z-order entry, the second agent 1010 receives an identification of a clipping region in the computing environment corresponding to a region on the local display 1012 associated with a local resource 1020. In one of these embodiments, the second agent 1010 receives the identification from the first agent 1002. In another of these embodiments, described in additional detail above, the second agent 1010 identifies the region responsive to information received from the first agent 1002. In still another of these embodiments, as described in additional detail above, the second agent 1010 identifies the region responsive to identifying a color key in a communication from the first agent 1002.

The agent executing on the local machine transmits, to an agent on the remote machine, an identification of a change to a z-order entry of a local window on the local machine displaying output data generated by the local resource (step 1126). In one embodiment, when a user of the second client 102b makes a change to a local window 1014, for example, by minimizing, maximizing, or resizing the window, the agent 1010 transmits a message to the agent 1002 to make a corresponding change to the proxy window 1008 and to its z-order entry in the z-order list ordering the plurality of windows 1006a-n and the proxy window 1008.

The agent on the remote machine modifies a z-order entry for a proxy window representing the local window in a z-order list on the remote machine, responsive to the identification of the change, the proxy window having a z-order entry in a z-order list associated with the plurality of windows in the computing environment (step 1128). In one embodiment, the agent 1010 assigns the local window 1014 a z-order entry synchronized with the z-order entry of the proxy window 1008, which has a z-order entry in a z-order list including z-order entries for a plurality of windows 1006a-n. In another embodiment, generating a z-order list including entries both for windows generated by a resource executing on a server 106 and for windows generated by a resource executing on a client 102 allows for integrated and overlapping displays of local and remote windows.

Figure 10A:
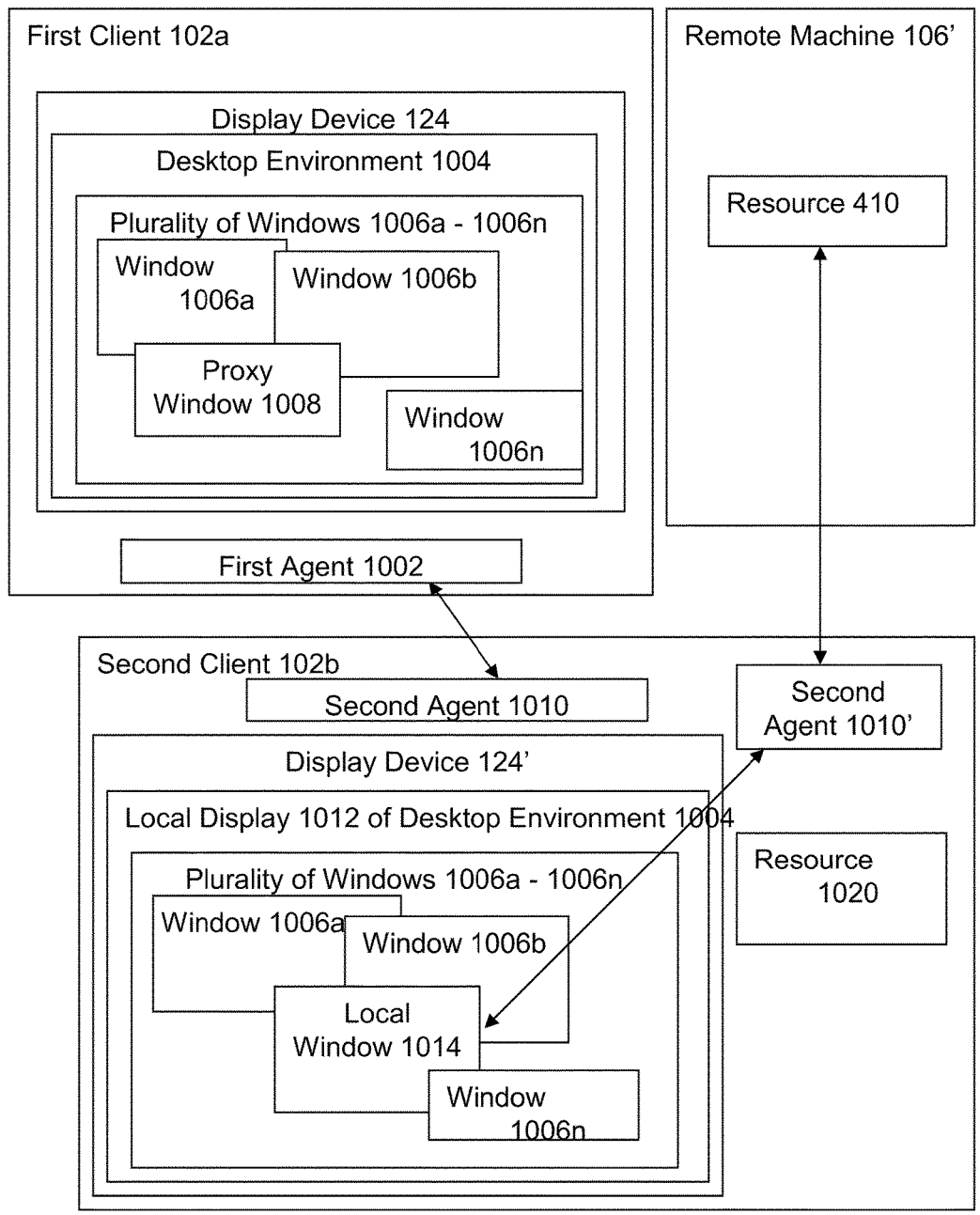
FIG. 10A is a block diagram depicting an embodiment of a system for generating a computing environment incorporating output data from multiple remote machines for display on a local machine.

Referring now to FIG. 10A, a block diagram depicts one embodiment of a system for generating a computing environment on the remote machine for display on the local machine, the computing environment providing integrated access to both resources provided by the local machine and to resources provided by a second remote machine. In brief overview, the system includes a first client 102a, a first agent 1002, a second client 102b, a second agent 1010, and a remote machine 106'. The first agent 1002 receives an identification of a remote resource 1210 available to a user of the second client 102b and provided by the remote machine 106'. The first agent 1002, executing on the first client 102a, generates a computing environment 1004, which includes a plurality of windows 1006a-206n and provides access to i) a resource 1210 available to a user of the second client 102b and provided by the remote machine 106', and ii) a resource 1020 provided by the second client 102b that is available to the user of the second client 102b. The first agent 1002 receives a request for execution of the remote resource 1210 provided by the remote machine 106'. The first agent 1002 directs the second agent 1010 on the second client 102b to request execution of the remote resource 1210 provided by the remote machine 106'. The second agent 1010 transmits to the first agent 1002 an identification of a change to a z-order entry of a local window 1014 on the second client 102b, the local window 1014 displaying output data generated by the remote resource 1210 provided by the remote machine 106'. The first agent 1002 modifies a z-order entry for a proxy window 1008 representing the local window 1014 in a z-order list on the first client 102a, responsive to the identification of the change, the proxy window 1008 having a z-order entry in a z-order list associated with the plurality of windows 1006 in the computing environment 1004.

The second agent 1010 provides access to the computing environment 1004. In some embodiments, establishment of a seamless pass-through presentation layer protocol connection between the computing environment 1004 and the remote machine 106' is requested. In one of these embodiments, a second client agent 1010' is executed on the second client 102b to instead establish the connection between the second client 102b and the remote machine 106'. In another of these embodiments, the second client agent 1010' looks like a client-side application that is accordingly integrated into the remote desktop by the second agent 1010 and the first agent 1002 using the methods described above in connection with FIGS. 8A, 8B, 9A, and 9B. In one embodiment, the second client agent 1010' is an RDP client. In another embodiment, the second client agent 1010' is an ICA client.

Figure 10B:
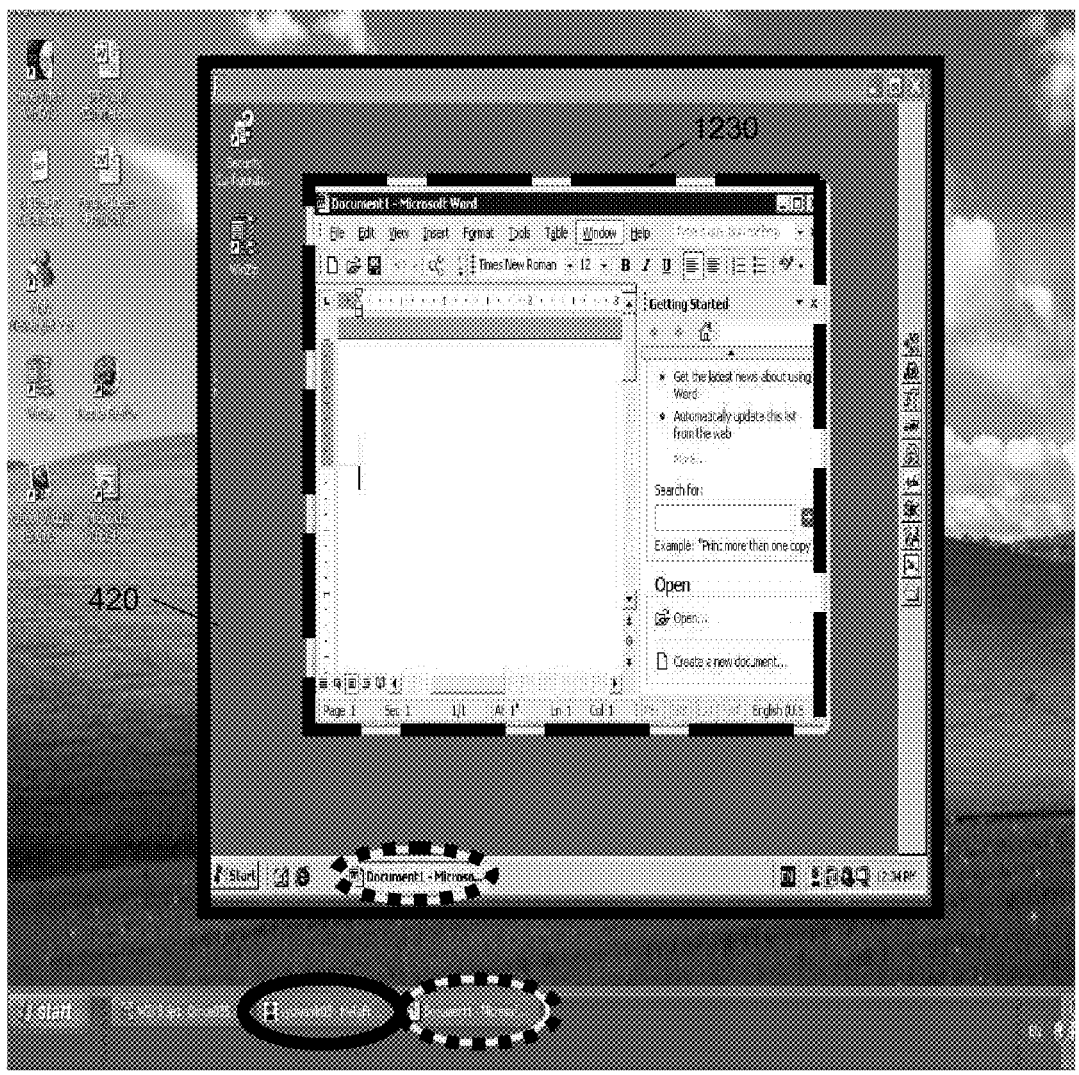
FIG. 10B is a screen shot depicts one embodiment of a system for generating a computing environment incorporating output data from multiple remote machines for display on a local machine.

Referring now to FIG. 10B, a screen shot depicts one embodiment of a system for generating a computing environment on the remote machine for display on the local machine, the computing environment providing integrated access to both resources provided by the local machine and to resources provided by a second remote machine. As depicted in FIG. 10B, two presentation layer protocol sessions are executed on the second client 102b. Session 1220, with the bold boundary, is an ICA session providing access to a desktop environment 1004. Session 1230, with the dashed boundary, is an ICA session providing access to a resource (in FIG. 10B, the resource is a word processing program, MICROSOFT WORD). The WORD application window, which is local window 1014, has been merged with the presentation of the desktop session, which is represented by the computing environment 1004. If the first client 102a had established the session, the first client 102a would have received the output data and would have then forwarded the output data to the second client 102b for display. Instead, in this embodiment, the second client 102b established the presentation layer protocol session required to access WORD, instead of the first client 102a establishing a presentation layer protocol session, and the second client 102b receives the output data directly from the remote machine 106.

Figure 11:
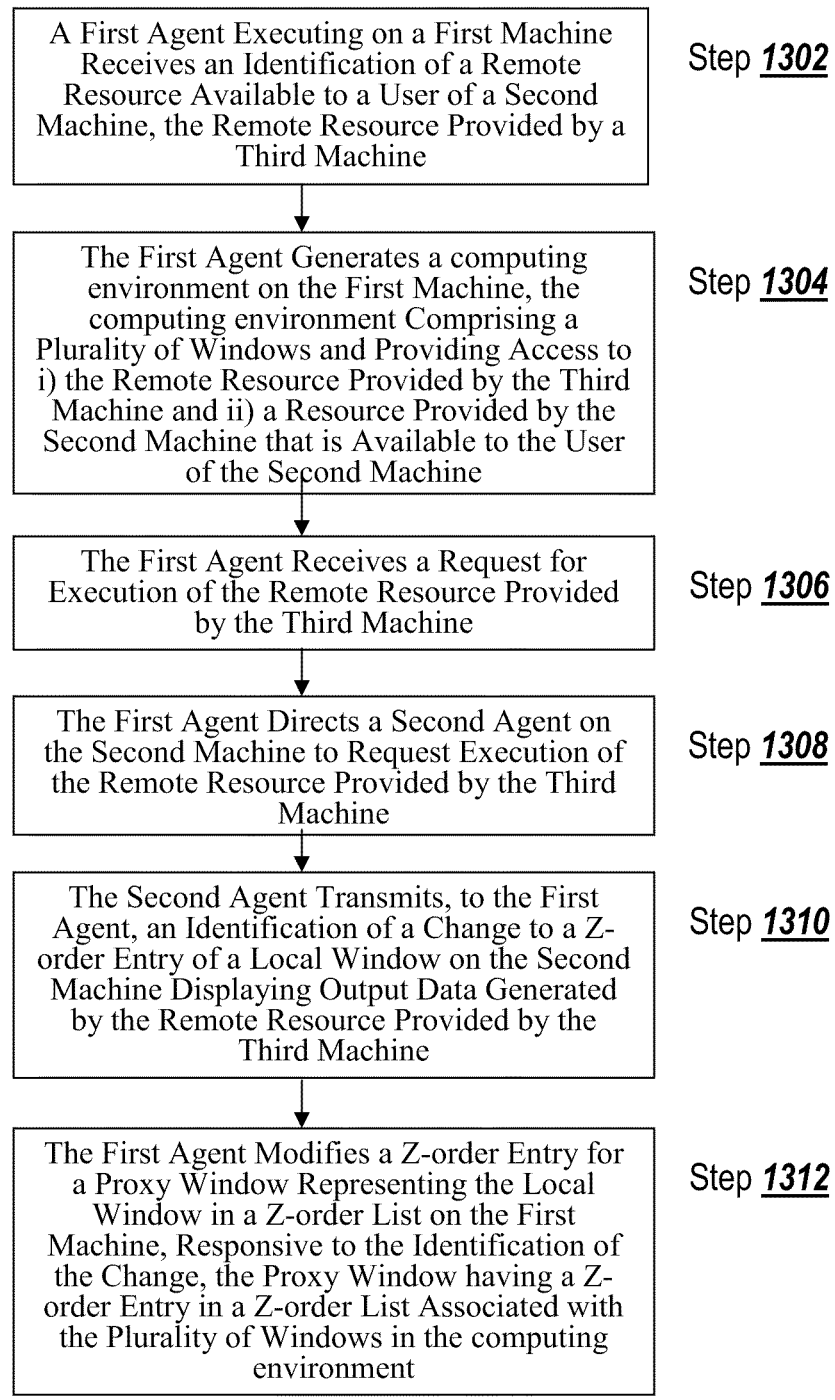
FIG. 11 is a flow diagram depicting one embodiment of a method for generating a computing environment incorporating output data from multiple remote machines for display on a local machine.

Referring now to FIG. 11, a flow diagram depicts one embodiment of the steps taken in a method for generating a computing environment on the remote machine for display on the local machine, the computing environment providing integrated access to both resources provided by the local machine and to resources provided by a second remote machine, includes the step of receiving, by a first agent executing on a first machine, an identification of a remote resource available to a user of a second machine, the remote resource provided by a third machine (step 1302). The first agent monitors a computing environment on the first machine, the computing environment comprising a plurality of windows and providing access to i) the remote resource provided by the third machine and ii) a resource provided by the second machine that is available to the user of the second machine (step 1304). The first agent receives a request for execution of the remote resource provided by the third machine (step 1306). The first agent directs a second agent on the second machine to request execution of the remote resource provided by the third machine (step 1308). The second agent transmits, to the first agent, an identification of a change to a z-order entry of a local window on the second machine displaying output data generated by the remote resource provided by the third machine (step 1310). The first agent modifies a z-order entry for a proxy window representing the local window in a z-order list on the first machine, responsive to the identification of the change, the proxy window having a z-order entry in a z-order list associated with the plurality of windows in the computing environment (step 1312).

Referring now to FIG. 11, and in greater detail, a first agent executing on a first machine receives an identification of a remote resource available to a user of a second machine, the remote resource provided by a third machine (step 1302). In one embodiment, the first agent 1002 receives the identification from the remote machine 106'. In another embodiment, the first agent 1002 receives the identification from the second client 102b. In still another embodiment, the first agent 1002 receives the identification from an agent on one of the remote machine 106' and the second client 102b. In yet another embodiment, the first agent 1002 receives the identification from a fourth machine 106'''. In one embodiment, a resource 1210 comprises a program, an application, a document, a file, a plurality of applications, a plurality of files, an executable program file, a desktop environment, a computing environment, or other resource made available to a user of the second client 102b. The resource 1210 may be delivered to the remote machine 106 via a plurality of access methods including, but not limited to, conventional installation directly on the remote machine 106, delivery to the remote machine 106 via a method for application streaming, or execution from a removable storage device connected to the remote machine 106, such as a USB device.

The first agent monitors a computing environment on the first machine, the computing environment comprising a plurality of windows and providing access to i) the remote resource provided by the third machine and ii) a resource provided by the second machine that is available to the user of the second machine (step 1304). In some embodiments, the first agent monitors the computing environment 1004 as described above in connection with FIGS. 8A, 8B, 9A, and 9B.

The first agent receives a request for execution of the remote resource provided by the third machine (step 1306). In one embodiment, the first agent 1002 receives the request via a communications channel, such as an ICA channel, between the first agent 1002 and the second agent 1010. In another embodiment, the first agent 1002 receives the request when a user of the second client 102b selects a graphical representation of the remote resource 1210 depicted in the local display 1012 of the computing environment 1004. For example, the first agent 1002 may generate a graphical representation of the remote resource 1210, such as an icon, and incorporate the icon into the computing environment 1004 upon receiving the identification of the remote resource 1210 from the remote machine 106'. In still another embodiment, the first agent 1002 receives a request for execution of the remote resource 1210 when a resource executing on one of the first client 102a and the second client 102b attempts to access a resource, such as a file, that requires the execution of the remote resource 1210.

The first agent directs a second agent on the second machine to request execution of the remote resource provided by the third machine (step 1308). In one embodiment, the first agent 1002 directs the second agent 1010 to execute another agent 1010' on the second client 102b and to instruct the second agent 1010' to request execution of the remote resource 1210 provided by the remote machine 106'. In another embodiment, the second agent 1010' is a presentation layer protocol client, such as an ICA or RDP client. In still another embodiment, the second agent 1010' establishes a connection to the remote machine 106' and requests execution of the remote resource 1210. In yet another embodiment, the second agent 1010' receives output data generated by the execution of the remote resource 1210 and displays the output data in the local window 1014. In some embodiments, the second agent 1010 directs the first agent 1002 to request execution of the remote resource 1210 on server 106 upon making a determination the requested resource is unavailable or not executable from the second client 102b.

The second agent transmits, to the first agent, an identification of a change to a z-order entry of a local window on the second machine displaying output data generated by the remote resource provided by the third machine (step 1310). In one embodiment the second agent 1010 transmits the identification of the change to the z-order entry of the local window 1014 to the first agent 1002. In another embodiment the second agent 1010 transmits the identification of the change to the z-order entry of the local window 1014 to the first agent 1002 as described above in connection with FIGS. 8A, 8B, 9A, and 9B.

The first agent modifies a z-order entry for a proxy window representing the local window in a z-order list on the first machine, responsive to the identification of the change, the proxy window having a z-order entry in a z-order list associated with the plurality of windows in the computing environment (step 1312). In some embodiments, the first agent 1002 modifies a z-order entry for a proxy window 1008 as described above in connection with FIGS. 8A, 8B, 9A, and 9B.

In some embodiments, methods and systems described herein provide functionality for addressing limitations on displaying output data on mobile devices, including limitations resulting from the relatively small display form factor and the limited computing capacity. In one of these embodiments, methods and systems are provided for turning the mobile device into an application delivery channel. In another of these embodiments, no changes are required of existing desktop applications to implement these methods and systems, and a wide variety of applications can be accessed on such an application-delivery enabled mobile device.

Figure 12A:
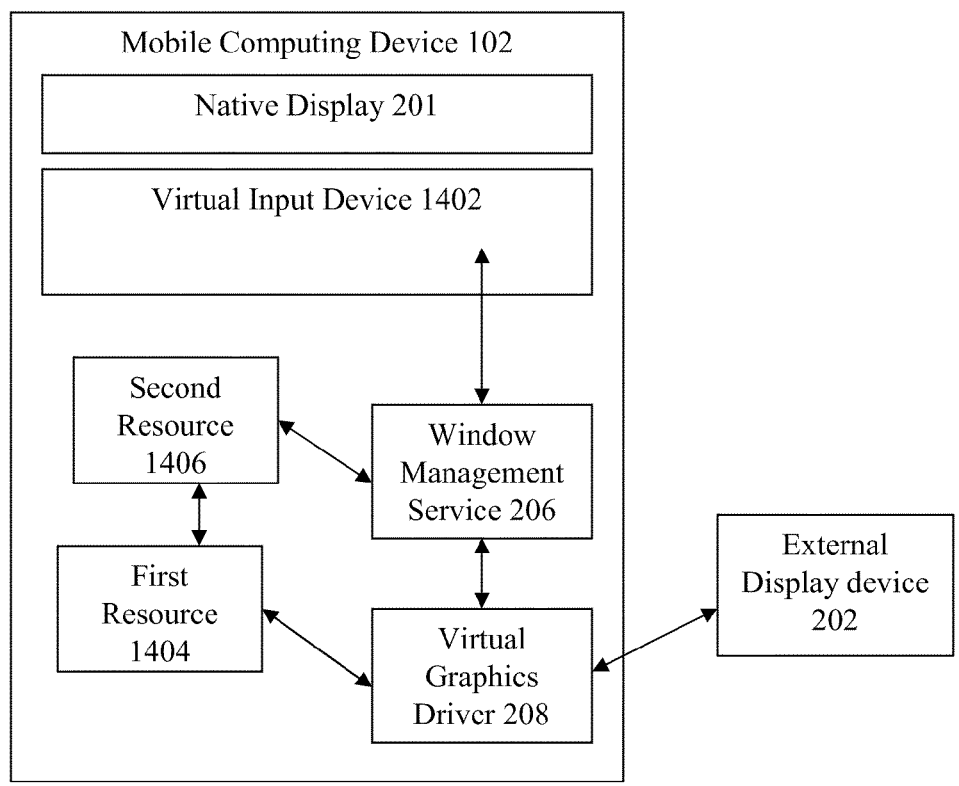
FIG. 12A is a block diagram depicting one embodiment of a system for displaying, on a screen of a mobile computing device, a virtual input device for interacting with a resource generating output data displayed on a display surface external to the mobile computing device.

Referring now to FIG. 12A, a block diagram depicts one embodiment of a system for executing on a mobile computing device a virtual input device for interacting with a resource, wherein output data for the resource is displayed on an external display device. In brief overview, the system includes a mobile computing device 102, a native display 201 on the mobile computing device 102, an external display device 202, and a virtual input device 1402. The mobile computing device 102 executes a first resource 1404. The external display device 202 displays output data generated by the execution of the first resource 1404. The mobile computing device 102 executes a second resource 1406. The second resource 1406 generates a virtual input device 1402. The virtual input device 1402 leverages one or more capabilities of the mobile computing device 102. The virtual input device 1402 allows interaction by a user of the mobile computing device 102 with the display of output data generated by the execution of the first resource 1404.

Referring now to FIG. 12A, and in greater detail, the system includes a mobile computing device 102. In one embodiment, the system is a mobile device 102 as described above. In another embodiment, the system includes a native display 201 on the mobile computing device 102, an external display device 202, and a virtual input device 1402. The mobile computing device 102 executes a first resource 1404.

The external display device 202 displays output data generated by the execution of the first resource 1404. In one embodiment, the external display device 202 is a monitor. In another embodiment, the external display device 202 is a projector. In still another embodiment, the mobile computing device 102 is connected or attached to an external display device 202, such as a projector that transmits output data to an external display surface. In various embodiments, the external display device 202 may be integrated into the mobile computing device 102. For example, the mobile computing device 102 may include a pico projector, which directs a display of output data generated by a resource executing on the mobile computing device 102 to an external display surface such as a projection screen, wall, or other display surface. In some embodiments, the mobile computing device 102 may include a projection module based on a micro-electro-mechanical system (MEMS), such as, for example and without limitation, a PicoP Display Engine manufactured by Microvision, Inc., of Redmond, Wash.

The mobile computing device 102 executes a second resource 1406. The second resource 1406 generates a virtual input device 1402 for interaction by a user of the mobile computing device with the display of output data generated by the execution of the first resource. In various embodiments, the mobile computing device 102 may execute the second resource 1406 according to the input needs of the first resource 1404, the identification of the mobile computing device 102, or both. In one embodiment, a virtual input device 1402 includes a graphical representation of a keyboard. In another embodiment, a virtual input device 1402 includes a virtual track pad. In still another embodiment, a virtual input device 1402 includes a virtual pointing device, such as a cursor which may be manipulated by interacting with the virtual input device 1402.

The virtual input device 1402 may be displayed on the native display 201 on the mobile computing device 102. The virtual input device 1402 allows interaction by a user of the mobile computing device 102 with the display of output data generated by the execution of the first resource 1404. In some embodiments, the native display 201 on the mobile computing device 102 includes a touch-screen. In one of these embodiments, a touch-screen sensor includes a touch-responsive surface that detects touch input from a user of the mobile computing device 102. In another of these embodiments, the virtual input device 140 is displayed on the touch-responsive surface. In still another of these embodiments, the touch-screen sensor redirects an identification of a location of the touch input on the touch-responsive surface to an operating system on the mobile computing device 102. In another of these embodiments, the operating system redirects the identification of the location of the touch input to the second resource 1406 for processing. In still another of these embodiments, the second resource 1406 correlates the location of the touch input with a displayed user interaction element. In yet another of these embodiments, the second resource 1406 transmits an identification of a user interaction with the displayed user interaction element to the first resource 1404.

In one embodiment, the virtual input device 1402 includes both a virtual keyboard and a virtual pointing device and interactions with these virtual components are redirected to the mobile device capabilities or to secondary external devices. For example, in other embodiments, mobile devices that have full QWERTY keyboards and cursor positioning buttons or joystick keys can have input received by the virtual keyboard and mouse redirected to those capabilities. In still another embodiment, mobile devices with touch screens can be repurposed as a "soft keyboard" and "soft mouse" and the input received by the virtual keyboard and mouse can be redirected directly to an executing resource. In still even another embodiment, input data received by a mobile device with an externally connected keyboard or mouse can be redirected to the virtual keyboard and mouse.

In some embodiments, a first resource 1404 may also accept input from other devices, such as camera, microphone, point-of-sale (POS) device, etc. In one of these embodiments, a virtual input device 1402 may provide a virtualized version of any such devices and can redirect data communication for these devices. For instance, and in another of these embodiments, if a mobile computing device 102 has a built-in camera, an application displayed on an external display device 202 and accepting input from a camera could be directed to use the mobile device camera. In still another of these embodiments, and by way of example, an application that has audio output could be directed, for example, to the mobile device's speaker or headphone jack.

Figure 12B:
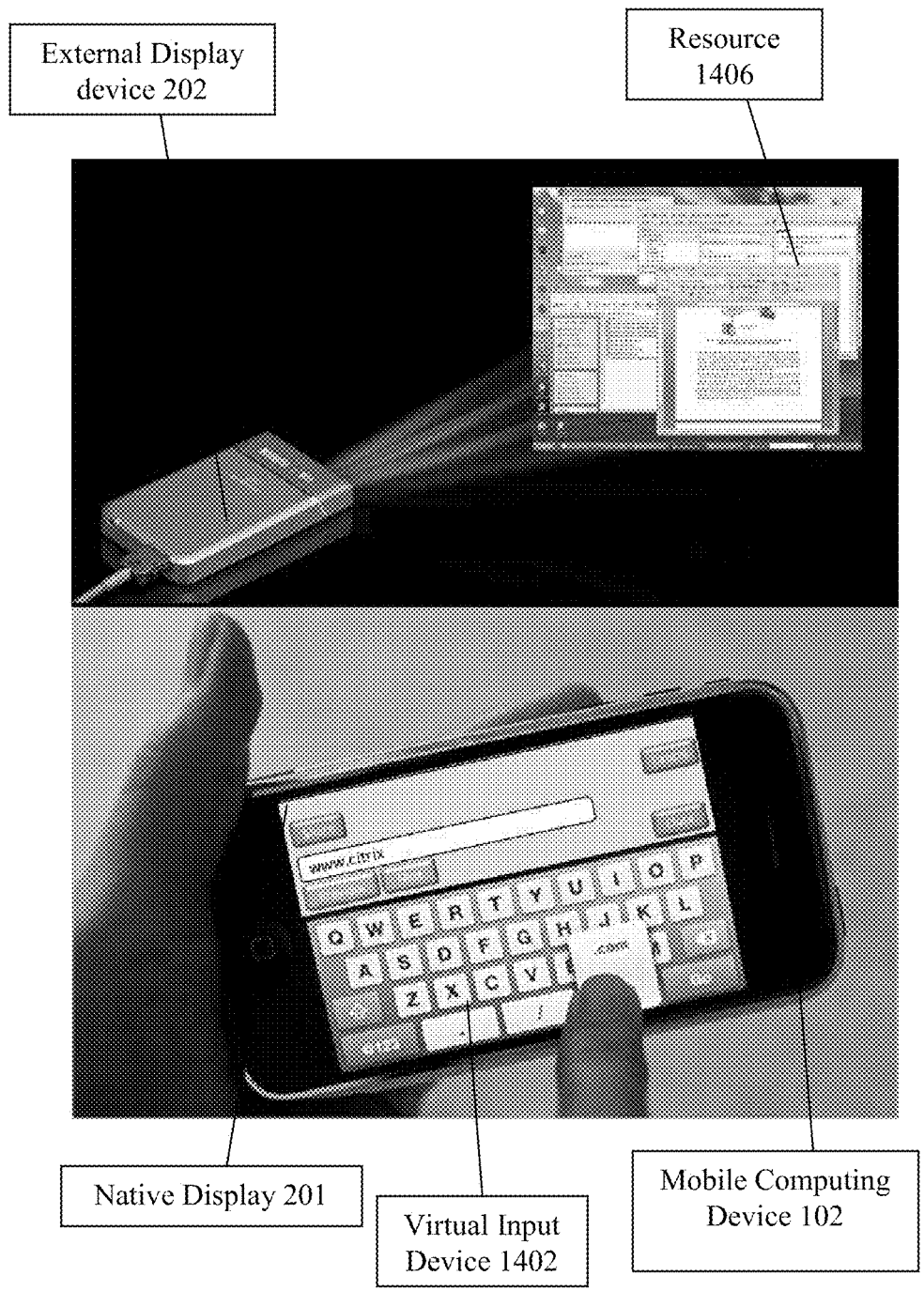
FIGS. 12B and 12C are screen shots depicting an embodiment of a mobile computing device displaying a virtual input device for interaction by a user of the mobile computing device with a display of output data generated by an execution of a resource.

Referring now to FIG. 12B, a screen shot depicts an embodiment of a mobile computing device 102 displaying a virtual input device 1402 on the native display 201, wherein the virtual input device 1402 permits the user to interact with the output data associated with a resource 1406, such as a word processing application. In this embodiment, the resource 1406 may be executing on the mobile computing device 102. When the mobile computing device 102 is connected to the external display device 202, the window management service 206 may detect the connection and display output data associated with the resource 1406 on the external display device 202 instead of the native display 201 of the mobile computing device 102. In this embodiment, the external display device 202 is a projector that displays the output data on a surface, such as a wall.

In response to output data being transferred to the external display device 202, the mobile computing device 102 may execute a resource that generates a virtual input device 1402. The mobile computing device 102 may evaluate the resource 1406 to determine its input needs. In some embodiments, the mobile computing device 102 may determine that a resource accepts alphanumeric input, audio input, video input, or any other type of input or combinations thereof. In this embodiment, the resource 1402 is a word processing application that needs at least alphanumeric input. In response, the mobile computing device 102 executes a resource to generate a virtual or "soft" keyboard for a virtual input device 1402. The virtual keyboard may be displayed on the native display 201, such as a touch-screen. The touch-screen may detect user interactions and redirect information associated with the user interactions to the virtual input device 1402. The virtual input device 1402 may communicate the user interactions to the resource 1402.

Figure 12C:
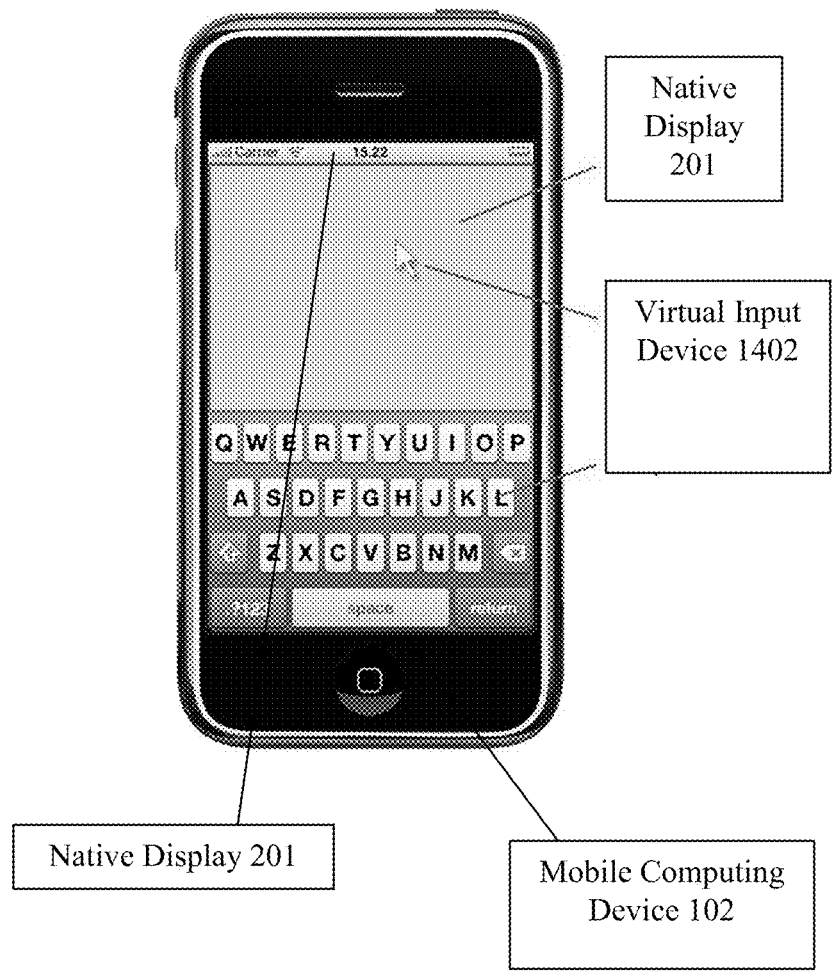

Referring now to FIG. 12C, a screen shot depicts an embodiment of a mobile computing device displaying a virtual input device 1402 for interaction by a user with a display of output data associated with a resource. In this embodiment, the mobile computing device 102 executes a resource to generate at least a virtual trackpad. The virtual trackpad may be displayed on the native display 201, such as a touch-screen, of the mobile computing device 102. When the touch-screen detects a user interaction, the touch-screen may redirect information associated with the user interaction to the resource generating the virtual input device 1402. The virtual input device 1402 may process the information and determine a user command. The virtual input device 1402 may communicate the user command to the resource being displayed on an external display device (not shown), and the resource being displayed may output data corresponding to the user command.

The embodiment in FIG. 12C also depicts a virtual input device 1402 that repurposes a keyboard on the mobile computing device 102 for the resource being displayed on an external display device. In this embodiment, the mobile computing device 102 displays a keyboard generated by an application installed on the device. The touch-screen may detect a user interaction and transmit information associated with the user interaction to the keyboard application. The keyboard application may interpret the user interaction to determine a user command, such as entering or deleting alphanumeric characters. The keyboard application may communicate the user command to the virtual input device 1402, which may transmit information about the user command to the resource whose output data is being displayed on an external display device. In various embodiments, one resource may generate a virtual trackpad and another resource may repurpose the keyboard on the mobile computing device 102. In other embodiments, the same resource may generate a virtual input device 1402 that generates the virtual trackpad and repurposes the keyboard.

While FIGS. 12A-12C describe using a virtual input device to control a resource that is displayed on an external display device, in other embodiments the virtual input device 1402 can be used to control a resource displayed on the mobile device 102. In some embodiments, the mobile device 102 can be a tablet computing device. The resource can be a virtual desktop, a remote application or any other resource contemplated herein. In some embodiments, a user can use the virtual input device 1402 to control and interact with the resource displayed on the mobile device 102. The virtual input device 1402 can be any virtual input device 1402 described herein. In particular, the virtual input device 1402 can be a virtual keyboard displayed on the mobile device. In other instances, the virtual input device 1402 can be a virtual trackpad displayed on the mobile device. The virtual trackpad, in some embodiments, can control a mouse pointer displayed on the screen of the mobile device 102.

Figure 13:
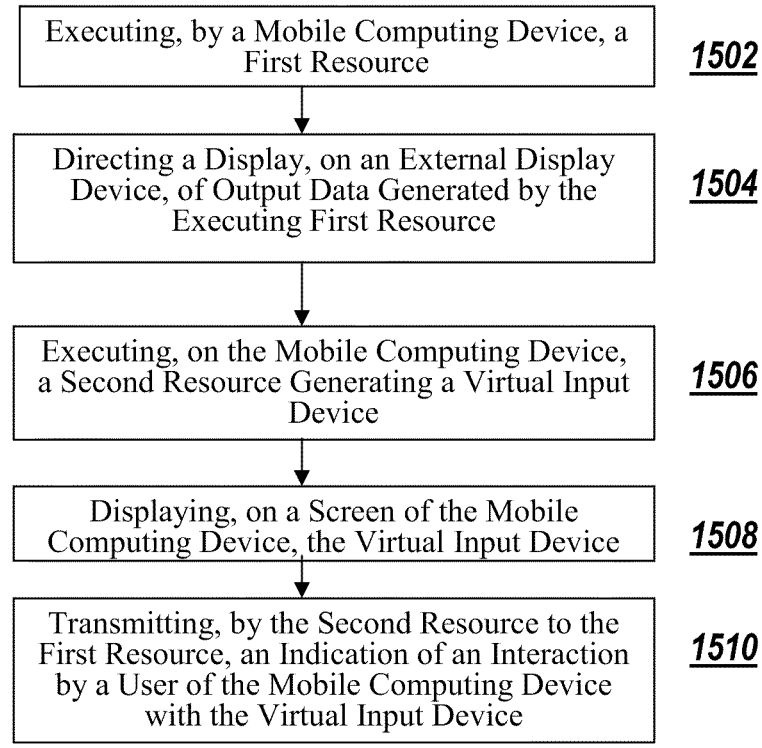
FIG. 13 is a flow diagram depicting one embodiment of a method for displaying, on a screen of a mobile computing device, a virtual input device for interacting with a resource generating output data displayed on a display surface external to the mobile computing device.

Referring now to FIG. 13, a flow diagram depicts one embodiment of a method for displaying, on a screen of a mobile computing device, a virtual input device for interacting with a resource generating output data displayed on a display surface external to the mobile computing device. The method includes executing, by a mobile computing device, a first resource (1502). The method includes directing a display, on an external display device, of output data generated by the executing first resource (1504). The method includes executing, on the mobile computing device, a second resource generating a virtual input device (1506). The method includes displaying, on a screen of the mobile computing device, the virtual input device (1508). The method includes transmitting, by the second resource to the first resource, an indication of an interaction by a user of the mobile computing device with the virtual input device (1510). In some embodiments, the mobile device 102 is repurposed as a virtual input device that transmits user input to either a locally-executing application or, via presentation-layer protocols, to a remotely-executing application.

Referring now to FIG. 13, and in greater detail, a mobile computing device 102 executes a first resource (1502). In one embodiment, the mobile computing device 102 executes an application generating output data for display to a user of the mobile computing device. In some embodiments, the first resource requests, from a remote computing device, execution of a remotely-located resource. In one of these embodiments, a first resource communicates with the remote computing device according to a presentation layer protocol, for example, by communicating via the ICA protocol, or the RDP protocol. In another of these embodiments, the first resource directs the display of remotely-generated output data on a display device associated with the mobile computing device. In other embodiments, the first resource is stored on the mobile computing device, executes locally, and directs the display of locally-generated output data on a display device associated with the mobile computing device.

A display, by an external display device, of output data generated by the executing first resource is directed (1504). In one embodiment, a window management service directs the display of output data to the external display device 124b. In one embodiment, an operating system executing on the mobile computing device 102 and in communication with the external display device 124b directs the display of output data to the external display device 124b. In another embodiment, the external display device projects the output data to an external display surface, such as a wall, screen, or other surface. In still another embodiment, the display of the output data occurs without modification to the output data generated by the execution of the first resource. In some embodiments, the output data is rendered on a secondary physical display, such as an embedded or external micro projector, heads-up display, laptop, HDTV, or other display. In one of these embodiments, displayed output from the first resource is shown via the secondary display and is, therefore, not limited to only the display capabilities of the mobile computing device display.

The mobile computing device executes a second resource generating a virtual input device (1506). In one embodiment, the second resource communicates with the first resource. In another embodiment, the second resource identifies a type of virtual input device to display; for example, the second resource may select a type of virtual input device to display based on a type of interaction supported by the first resource.

The virtual input device is displayed on a screen of the mobile computing device (1508). In one embodiment, the virtual input device is displayed in conjunction with an existing virtual input device; for example, the mobile computing device may display a virtual (or "soft") keyboard and the second resource may generate a second virtual input device, such as a virtual trackpad displayed in conjunction with the virtual keyboard. In another embodiment, the second resource may generate a customized virtual input device displayed on the mobile computing device in place of the display of output data generated by the first resource. In still another embodiment, the display of the output data generated by the first resource is separated from the display of the virtual input device, instead of combined into a singled display surface, such as either an internal or an external display device.

The second resource transmits, to the first resource, an indication of an interaction by a user of the mobile computing device with the virtual input device (1510). In some embodiments, the second resource communicates with the first resource, allowing a user to interact with the first resource via the virtual input device generated by the second resource and displayed on a separate display device than the first resource.

In one embodiment, the first resource is a client application executing on the mobile computing device 102 and communicating with a remote computing device 106 according to a presentation layer protocol. In another embodiment, the first resource requests execution of a remote resource by the remote computing device. In still another embodiment, the first resource receives, from the remote computing device, output data generated by an execution of the remote resource on the remote computing device. In still even another embodiment, the first resource transmits, to the remote computing device, execution of a remote resource, and receives, from a second remote computing device, output data generated by an execution of the remote resource on the second remote computing device. In yet another embodiment, the mobile computing device directs a display of the remotely-generated output data on the external display device.

In some embodiments, the methods and systems described herein provide functionality for smart translation of user interaction with endpoint devices. In one of these embodiments, methods and systems are provided for translating a user interaction with an endpoint device into a command for processing by a remotely-executing resource. In another of these embodiments, for example, a resource may execute on a first computing device and generate output data that is displayed on a second computing device, which may be referred to as an endpoint device; a user interaction with the endpoint device may be translated into a command that is transmitted to the resource on the first computing device for processing.

In some embodiments, a resource executing on a first computing device provides a user interface allowing a user to interact with output data generated by a resource. In one of these embodiments, for example, output data may include one or more graphical user interface elements, such as a cursor or a scroll bar, displayed with data, such as the text in a word processing application or an image in an image viewing or editing software, and the graphical user interface elements provide a mechanism by which a user of the resource may interact with data generated by the resource. In another of these embodiments, the type of user interface varies based upon the computing environment from which the user views the output data. As described above, a first type of user interface may be provided when a user accesses output data from a mobile computing device and a second type of user interface may be provided when a user accesses output data from a different type of computing device, such as a laptop, or when the user has access to a different type of display device.

In some embodiments, methods for interacting with a user interface are different across different user interfaces—for example, users may access a pointing device (such as a mouse) to manipulate an image of a cursor on a screen in order to interact with a graphical user interface element, or users may interact with a touch screen on a display device and use their fingers to tap on or drag graphical user interface elements from one portion of the display to another. In other embodiments, a method for interacting with a first type of user interface (for example, connecting a mouse to a computing device and using the mouse to control a cursor shown on a display device to interact with the first type of user interface) does not work when applied to a second type of user interface (for example, if a second type of user interface accepts as input a user touch to a screen, the second type of user interface may not provide functionality for displaying a cursor or for accepting input from a pointing device); even if the method does work, it may be a suboptimal method for interacting with the second type of user interface or it may only provide limited functionality for interacting with the second type of user interface. In one of these embodiments, a first type of user interface may be preferable for use on a first type of computing device—for example, a user interface that supports a user entering commands by touching a screen may be better suited for use on a computing device that includes a touch screen than on one that does not. In still other embodiments, a remotely-executing application generates and displays a first type of user interface intended for access via a first type of computing device but which is displayed to a user accessing the user interface from a second type of computing device. For example, a user may access a first type of user interface that was designed for access from a computing device including a pointing device from a computing device that includes a touch screen but not a pointing device.

In some embodiments, the methods and systems described herein provide functionality for translating input of a first type into a second type. In one of these embodiments, input provided by a user via a first type of interface is translated into a command that a second type of interface can process. In another of these embodiments, and by way of example, a user may view data including a user interface displaying interface elements such as a scroll bar and accepting input commands from the user via a pointing device; however, the user may enter a command via a touch screen and the command is translated into a format that the user interface can process. In still another of these embodiments, and as another example, a user viewing a first section of data may have requested a display of a second section of data, for example by using a touch screen to scroll through the data; the command to scroll from the first section of data to the second may be translated into a command to select a graphical user interface element for scrolling down (such as an arrow in a scroll bar) and transmitted to the resource generating the data. In yet another of these embodiments, implementation of this functionality allows a user of a first type of computing device to interact with a display of a first type of user interface using a second type of user interface element optimized for use on the first type of computing device.

Figure 14:
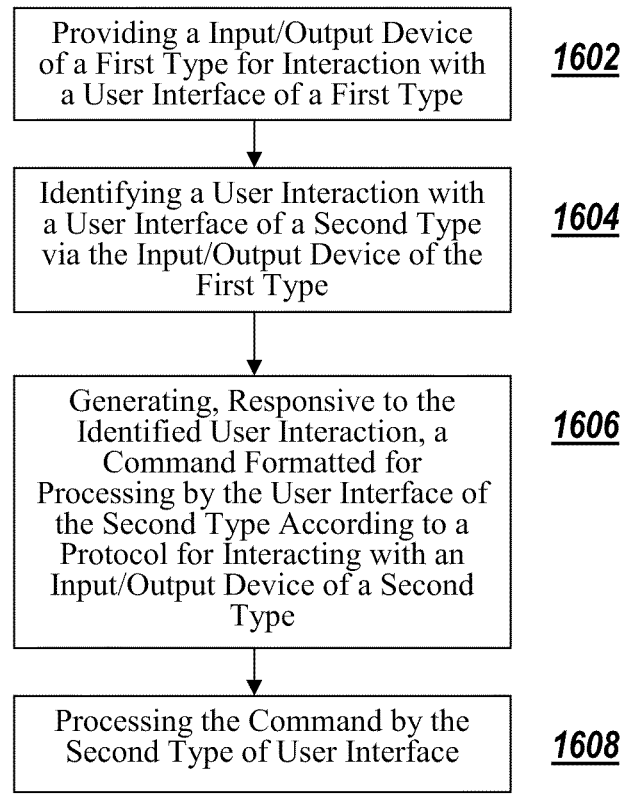
FIG. 14 is a flow diagram depicting one embodiment of a method for translating a user interaction with an input/output device of a first type into a command for processing by a user interface supporting interaction with an input/output device of a second type.

Referring now to FIG. 14, a flow diagram depicts one embodiment of a method for translating a user interaction with an input/output device of a first type into a command for processing by a user interface supporting interaction with an input/output device of a second type. In brief overview, the method includes providing an input/output device of a first type for interaction with a user interface of a first type (1602). The method includes identifying a user interaction with a user interface of a second type via the input/output device of the first type (1604). The method includes generating, responsive to the identified user interaction, a command formatted for processing by the user interface of the second type according to a protocol for interacting with an input/output device of a second type (1606). The method includes processing the command by the user interface of the second type (1608).

Referring now to FIG. 14, and in greater detail, an input/output device of a first type is provided for interaction with a user interface of a first type (1602). In one embodiment, the input/output device of the first type is a touch screen. In another embodiment, the user interface of the first type includes functionality for processing touch screen-based interactions with user interface elements displayed by the user interface of the first type. In still another embodiment, the input/output device of the first type is an input/output device such as a keyboard or pointing device. In still even another embodiment, the user interface of the first type includes a graphical element (such as a cursor) displayed to a user and with which the user interacts via the input/output device of the first type. In yet another embodiment, the user interface of the first type provides functionality for processing interactions with the graphical element received via input/output devices such as keyboards or pointing devices.

In some embodiments, a user interface of a second type is displayed to a user. In one of these embodiments, a user of a mobile computing device 102 views a user interface of the second type generated by a resource executing on the mobile computing device 102. In another of these embodiments, a user of a mobile computing device 102 views a user interface of the second type generated by a resource executing on a remote computing device 106. In still another of these embodiments, the user interface of the second type does not include functionality for processing user input generated by user interactions with the input/output device of the first type. In yet another of these embodiments, and by way of example, a user interface of the second type may be a windowing environment that displays widgets such as pull-down menus, scroll bars, and task bars and that includes functionality for processing user input generated by a user interaction with a pointing device or keyboard (e.g., a user clicking on a scroll bar with a mouse), but may not include functionality for processing user input generated by a user interaction with a touch screen.

A user interaction with a user interface of a second type via the input/output device of the first type is identified (1604). In one embodiment, an interaction management component identifies the user interaction. In another embodiment, the user interaction is transmitted to an interaction management component for processing. In an embodiment in which the input/output device of the first type is a touch screen, a user may touch the screen of a mobile computing device in an attempt to manipulate data displayed by the user interface of the second type, such as a windowing environment displaying a pull-down menu.

A command is generated responsive to the identified user interaction, the command formatted for processing by the user interface of the second type according to a protocol for interacting with an input/output device of a second type (1606). In one embodiment, an interaction management component accesses a mapping, table, or other data structure storing configuration data to generate the command. In another embodiment, the interaction management component analyzes the user interaction with input/output device of the first type to identify a request or command intended by the user interaction; for example, the interaction management component may determine that a user touching a section of a touch screen intending to request access to data or to generate a command to modify an existing display of data. In still another embodiment, the interaction management component generates a type of command that is typically a result of a user interaction with the user interface of the second type. In yet another embodiment, and by way of example, the interaction management component determines that a user has interacted with a touch screen in order to request a modification of an existing display of data and the interaction management component generates a command equivalent to a command that would have been generated if the user had accessed an input/output device such as a mouse to select a graphical user interface element.

The command is processed by the user interface of the second type (1608). In one embodiment, the interaction management component transmits the command to a resource generating the user interface of the second type. In another embodiment, the interaction management component transmits the command to a resource executing on the mobile computing device 102. In another embodiment, the interaction management component transmits the command to a resource executing on a second computing device 106.

Section D: Displaying and Interacting with Applications Displayed within a Virtual Desktop FIG. 15A, in some embodiments, illustrates a tablet computing device 1710 or other hand-held device that executes an operating system which generates and displays a native desktop 1714. A virtual desktop application executing locally on the tablet device 1710 or remotely on a server, generates a virtual desktop 1716 that can be displayed within the context of the native desktop 1714. In some embodiments, the virtual desktop 1716 can include one or more icons 1718 which can correspond to one or more applications, similarly the virtual desktop 1716 can include a navigation bar 1712 much like the navigation bar 1712 displayed on the native desktop 1714. The virtual desktop 1716 can further include application output window(s) 1786, a virtual trackpad 1776 and a mouse pointer 1715. The virtual desktop 1716 can also include a virtual keyboard such as any virtual keyboard described herein. In some embodiments, the virtual keyboard available within the virtual desktop 1716 can include additional keys that are not available in the virtual keyboard displayed when the user accesses the native desktop 1714.

Figure 15A:
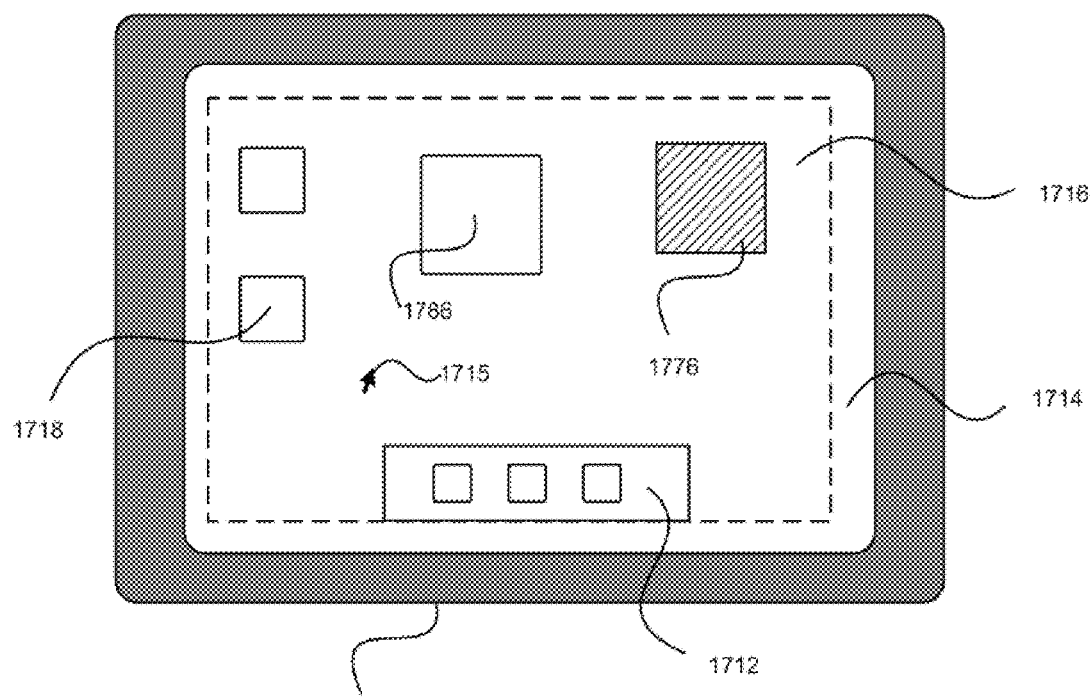
FIGS. 15A and 15B are block diagrams that illustrate embodiments of a virtual desktop and a system for controlling a pointer displayed within a virtual desktop.

Further referring to FIG. 15A, in some instances the virtual desktop 1716 can provide substantially the same functionality as the native desktop 1714. For example, the virtual desktop 1716 can include a search function that allows a user to search through the applications and content provided through the virtual desktop 1716. Thus, if a user wants to search for an application titled, CarpeDiem Time Tracker, the user can search through the list of applications available through the virtual desktop 1716 for such an application. In some embodiments, the search function can be substantially the same as the search function available for the native desktop 1714, however the applications and content that is searched using the search function is only the content that is available through the virtual desktop 1716. In other embodiments, the virtual desktop 1716 can provide a help screen that is substantially the same as the help screen provided by the native desktop 1714 with the exception that the help menu is specific to using the virtual desktop 1716 and the applications, services and content displayed within the virtual desktop 1716.

The tablet device 1710, in some embodiments, can be any tablet computer or any tablet computing device described herein. In one embodiment, the tablet device 1710 can execute any operating system or embedded operating system. In other embodiments, the tablet can execute any tablet operating system described herein.

The virtual desktop application executing on the tablet device 1710, can generate a virtual desktop 1716 that can be displayed within the context of the native desktop 1714. In some embodiments, the virtual desktop 1716 can contain icons 1718 representative of remote applications. These remote applications, in some embodiments, can be accessed via a virtual channel established between the tablet device 1710 and a remote computer or server. The remote applications, in some embodiments, execute on the server in response to user input.

When executing, the applications can generate application output that the server intercepts and transmits to the tablet device 1710. The tablet device 1710 in turn displays the application output within application output windows 1786 displayed on the tablet device 1710. Application output windows 1786, in some embodiments, are windows configured to contain and display graphical content generated by an application when it executes.

The virtual desktop application, in some embodiments, can be referred to as a virtual desktop application, a virtual desktop generator or the like. In some embodiments, the virtual desktop application can be the CITRIX RECEIVER application. The virtual desktop application can generate, execute and/or display a local virtual desktop 1716 or a remote virtual desktop 1716. When the virtual desktop 1716 is remotely located, the virtual desktop application can receive the virtual desktop over a communication or virtual channel established between the tablet 1710 and a remote computer. Upon establishing the virtual channel, the tablet computing device 1710 can receive the virtual desktop information 1716 and display the virtual desktop 1716 on the tablet computer 1710.

A virtual desktop 1716 can contain application icons 1718 that correspond to remote applications executing on a remote computer or server. The desktop 1716 can further include a virtual trackpad 1776 and/or a mouse pointer 1715. Each of these components can be remotely generated on a remote computer and transmitted to the tablet 1710, or they can be locally drawn into the virtual desktop 1716.

The application icons 1718 included within the virtual desktop 1716 can be representative of remote applications. These applications exist and execute on a remote computer or server. In other embodiments, the application icons 1718 can include both remote applications and local applications accessible through the native desktop 1714. In some embodiments, the remote applications that correspond to the application icons 1718 are not available to a user within the native desktop 1714. In one example, the list of application icons 1718 corresponds to a list of applications a user is permitted to access. For example, a user of the tablet computer 1710 may have a user account or user profile. The permissions assigned to this account or profile can include a list of remote applications the user may access. When a user boots the virtual desktop 1716 on the tablet computer 1710, the virtual desktop application can query a remote server for a list of applications available to the user. The server can transmit a list to the virtual desktop application and in turn the virtual desktop application can display application icons 1718 that correspond to the applications the user is permitted to access.

In some embodiments, the virtual desktop 1716 can be displayed over the native desktop 1714 such that the native desktop 1714 is not visible to a user of the hand-held device 1710. Both desktops can display icons 1718 that are representative of applications that can execute on the hand-held device 1710. Additionally, both desktops 1714, 1716 can display a menu 1712 that can include navigation buttons and application execution buttons.

In one embodiment, the applications and services available through the virtual desktop 1716 are not directly stored by the tablet device 1710, but rather are remotely hosted by a remote server. This remote server can be the same server that established the virtual channel with the tablet device 1710, or can be a different server in communication with the server that established the virtual channel with the tablet device 1710. In some embodiments, the virtual desktop application executing on the tablet device 1710 can stream or download application output from the remote server, and can display the application output on the tablet device 1710. For example, if a user tries to display the CarpeDiem Time Tracker application on the hand-held device 1710, the remote server can execute an instance of CarpeDiem Time Tracker, intercept the application output or draw commands issued by the CarpeDiem Time Tracker instance, and transmit or stream to the tablet device 1710 some combination of draw commands and bitmaps or images. The application executing on the tablet device 1710 can receive these draw commands and images and can use them to re-draw the application information on the screen of the tablet device 1710. In some instances, this application data is drawn within an application output window 1786.

In the example described above, a user can interact with the re-drawn CarpeDiem Time Tracker application displayed within the context of the virtual desktop 1716 in much the same way that a user could interact with an application displayed on the native desktop 1714. For example, a user can re-size and enter information into the CarpeDiem Time Tracker application much the same way a user could re-size and enter information into an application displayed on the native desktop 1714. Furthermore, the CarpeDiem Time Tracker application displayed within the virtual desktop 1716 can auto-rotate when the tablet device 1710 is rotated, and will auto-adjust to system changes the way that applications auto-adjust within the context of the native desktop 1714.

In some embodiments, the virtual desktop 1716 can display the same wallpaper theme as the native desktop 1714 and can include one or more of the user customizations that are displayed or included within the native desktop 1714. Thus, the virtual desktop 1716 can function and appear substantially the same as the native desktop 1714 with the exception that the applications and content available within the context desktop 1716 are specific to the application that generates the virtual desktop 1716. In some embodiments, the collection of applications and content available within the virtual desktop 1716 is a suite of applications and services assigned to or made available to a particular user. Thus, when a user signs into the tablet device 1710 or into the virtual desktop application generating the virtual desktop 1716, a menu of items and desktop layout specific to that user is displayed to the user. The virtual desktop 1716, in some embodiments, can be a desktop provided by the user's cloud. When a user logs into his/her cloud, the cloud streams to the hand-held device 1710 a virtual desktop 1716 that includes the user's applications, content and services.

In some embodiments, the virtual desktop 1716 can include a mouse pointer 1715 that can be controlled via a variety of control methods. The pointer 1715 can be drawn by an application executing on the tablet 1710 to generate and display the virtual desktop 1716. In other embodiments, a remote application communicating with the tablet computing device 1710 and/or the application generating the virtual desktop 1716 can generate and display the pointer 1715. The pointer 1715, in some embodiments, can move freely around the virtual desktop 1716.

Figure 17A:
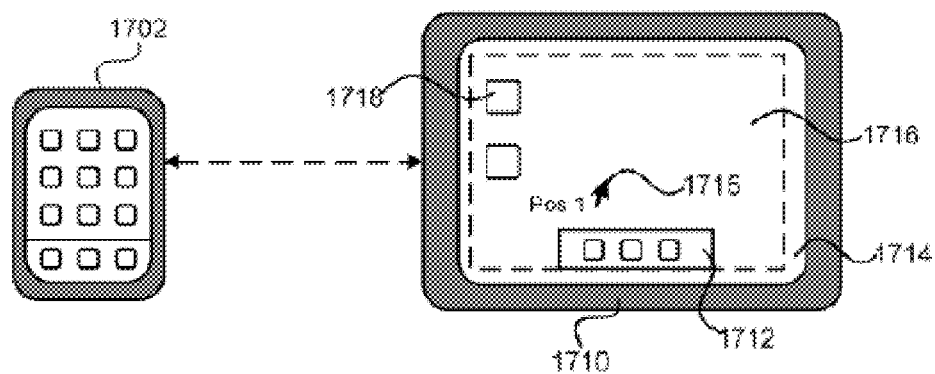
FIGS. 17A-17D are block diagrams depicting an embodiment of a system for using one hand-held device to control a pointer displayed in a second hand-held device.

In one embodiment, the mouse pointer 1715 can be controlled via an external input device. In other embodiments, the mouse pointer 1715 can be controlled using a virtual trackpad 1776. In other embodiments, the movement of a hand-held device 1702 in free space can also be used to control movement of the mouse pointer. In embodiments, where the movement of the device 1702 in free space controls the movement of the mouse, the start and stop coordinates of the initial hand-held device 1702 are transmitted to the other hand-held device 1710 where an application translates the coordinate position change into movement throughout the virtual desktop 1716. FIG. 17A illustrates one example of a system where the pointer 1715 is in an initial position, e.g. Pos. 1. This initial position corresponds to the initial position of the other hand-held device 1702.

The mouse pointer 1715, in some embodiments, can be drawn on the screen by the virtual desktop application executing on the hand-held device 1710. In other embodiments, the mouse pointer can be drawn by an application executing on a remote computer. In these embodiments, the application executing on the hand-held device 1710 establishes a virtual channel between the application and a server that executes one or more applications. The virtual desktop 1716, in some aspects, can be drawn by a remote application executing on the server. When the remote application issues draw commands, a client executing on the server intercepts the draw commands and sends them to the application executing on the hand-held device 1710 which then displays the drawn desktop on the screen of the hand-held device 1710. In some instances, the remote server application may only generate a portion of the desktop displayed on the hand-held device 1710 such as the mouse pointer or one or more aspects of the virtual desktop 1716. While the mouse pointer can be drawn as part of the virtual desktop 1716, in other embodiments, the mouse pointer can be drawn by a separate application executing on the server. In these embodiments, when the mouse pointer is drawn to the screen of the server, a client executing on the server intercepts the pointer drawn commands and sends them to the application executing on the hand-held device 1710 which then displays the drawn mouse pointer on the screen of the hand-held device 1710.

In some embodiments, the virtual desktop 1716 can include a virtual trackpad 1776. Movement of a mouse pointer 1715 displayed within the virtual desktop 1716 can be controlled using the virtual trackpad 1776. The virtual trackpad 1776 can be interactive such that a user can control movement of the mouse pointer 1715 using the trackpad 1776 in much the same way that a user would control movement of a mouse pointer using a physical trackpad. To control the pointer 1715, a user drags an appendage (e.g. a finger) or stylus over the portion of the screen designated as the trackpad 1776. The direction and magnitude of movement of the user's appendage over the virtual trackpad area 1776, is captured by the virtual desktop application or another application executing on the tablet device 1710. In some embodiments, the direction and magnitude can be captured as a series of translational vectors that correspond to the movement of the appendage within a coordinate system bound by the area of the virtual trackpad 1776. These translational vectors are applied to the mouse pointer's 1715 current position and the mouse pointer 1715 can be redrawn within the virtual desktop 1716 according to the calculated movement vector(s). For example, if a user drags his/her finger over the virtual trackpad 1776 in a left hand direction one inch, the application responsible for drawing the mouse pointer redraws the mouse pointer so that it is positioned one inch to the left of its original position.

The virtual trackpad 1776, in some embodiments, functions substantially the same as a physical trackpad on a laptop. In some embodiments, the virtual trackpad 1776 can be moved around the screen. In other embodiments, the size of the virtual trackpad 1776 can be expanded or minimized. In still other embodiments, tapping on the virtual trackpad 1776 can select or deselect items displayed within the virtual desktop 1716 or within an application displayed within the virtual desktop 1716. In still other embodiments, the virtual desktop 1716 may not include a virtual trackpad 1776.

Figure 15B:
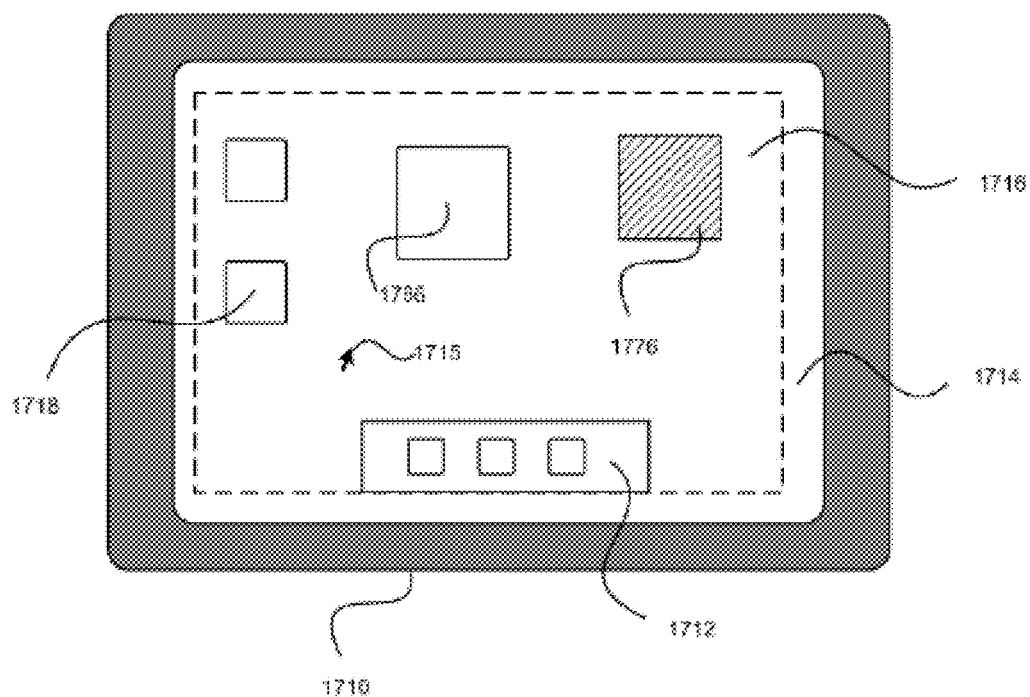
Figure 15B:
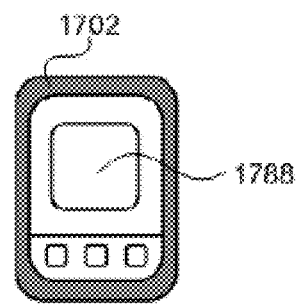

FIG. 15B illustrates another embodiment of a system where a mobile device 1702, e.g. a smartphone, can be used to control movement of the pointer 1715. In this embodiment, a virtual trackpad 1788 included on the screen of the mobile device 1702 can be used to control the movement of the mouse pointer 1715. Just as the virtual desktop application or other application captures the movement of an appendage over the virtual trackpad 1776 displayed within the virtual desktop 1716, an application executing on the mobile device 1702 can capture the movement of an appendage over a virtual trackpad 1788 displayed on the mobile device 1702. The application can generate a number of translational vectors which can be transmitted by the mobile device 1702 to the tablet 1710. The virtual desktop application can then use these vectors to cause the mouse pointer 1715 to be redrawn on the virtual desktop 1716. The movement of the pointer 1715 from its initial location to its final location can be based in part on the translational vectors captured during the movement of the user's appendage over the virtual trackpad 1788 of the mobile device 1702.

A virtual trackpad 1776, 1788 can be used to determine the start and stop coordinates of a user's appendage. These start and stop coordinates can be used to determine where to redraw the mouse pointer 1715 within the virtual desktop 1716. The virtual trackpad 1776, 1788 can function much the same way a physical trackpad functions, e.g. responsively selects items when double-tapped. The mouse pointer 1715 can be used to interact with remote applications displayed within the virtual desktop 1716. In some instances, these applications require the use of pointer 1715 to function. For example, an application may require the use of a pointer to select items on a screen.

Figure 15C:
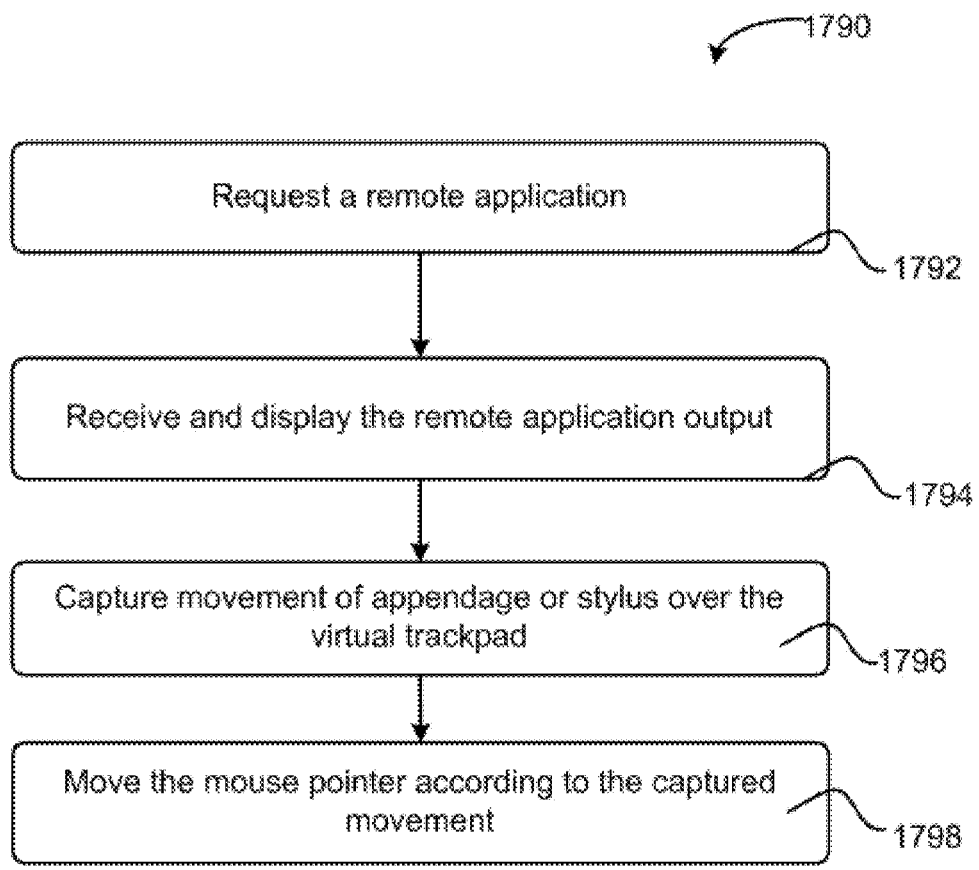
FIG. 15C is a flow diagram that illustrates a method for interacting with a remote application using a pointer displayed within a virtual desktop.

Illustrated in FIG. 15C is one embodiment of a method 1790 for interacting with a remote application using a drawn mouse pointer 1715 and a virtual trackpad 1776, 1788. A user submits a request to access a remote application (Step 1792) and upon execution of the remote application, receives and displays the application output generated by the remote application (Step 1794). Capture the movement of a user's appendage or a stylus over the virtual trackpad 1776, 1788 (Step 1796) and reposition the mouse pointer 1715 according to the captured movement (Step 1798).

Further referring to FIG. 15C, and in more detail, in one embodiment the virtual desktop application executing on the tablet computer 1710 responds to a user selection by requesting a remote application (Step 1792). In some embodiments, this user selection can be a user selection of an application icon 1718 display on the virtual desktop 1716. In other embodiments, the user selection can be a user command entered through the virtual desktop 1716 via any available user input method. The virtual desktop application transmits the user's request to execute a remote application to a remote computer or server. In some embodiments, the virtual desktop application transmits the request over a virtual channel established between the tablet computer 1710 and the remote server. In response to receiving the user request, the remote server or computer executes the requested application and redirects the application output generated by the executing requested application to the tablet computer 1710.

The tablet computer 1710 receives the application output generated by the executing remote application. Upon receiving the application output, the virtual desktop application or another application executing on the tablet computer 1710 (e.g. a desktop manager), displays the application output within an application output window 1786 (Step 1794). Thus, upon executing the remote application, a graphical representation of the executing remote application is displayed within an application output window that is displayed within the context of the virtual desktop 1716.

If a user wants to interact with the remote application, the user can reposition the drawn mouse pointer 1715 within the application output window to perform an action. Repositioning the mouse pointer 1715 can include moving an appendage or stylus over the surface of the virtual trackpad 1776, 1788. A virtual desktop application, or other application executing on the tablet 1710, can capture information representative of the movement of the appendage or stylus over the surface of the virtual trackpad 1776, 1788 (Step 1796). This information can be any of the following: a transfer function representative of the change in position of the appendage/stylus; start and stop coordinates of the appendage/stylus; translation vectors representative of the change in position of the appendage/stylus; or any other representation of the direction and magnitude of movement of the appendage/stylus from a start to a stop position. In some embodiments, the application can capture real-time changes made to the position of the appendage/stylus such that as the appendage/stylus moves over the surface of the virtual trackpad 1776, 1788, the pointer 1715 responsively moves about the landscape of the virtual desktop 1716.

Upon capturing the movement information for the appendage/stylus, the virtual desktop application or other application can cause the mouse pointer to move in the same direction and order of magnitude as the appendage/stylus (Step 1798). Movement of the mouse pointer 1715 about the desktop 1716 can include redrawing the mouse pointer 1715 in different places within the desktop 1716 according to the movement of the appendage or stylus.

Figure 16:
FIG. 16 is a screen shot of an embodiment of a virtual desktop.

Illustrated in FIG. 16 is a screen shot of a virtual desktop 1716. As illustrated in the screen shot, the virtual desktop 1716 is displayed as though it were the native desktop 1714. Furthermore, the virtual desktop 1716 includes substantially the same theme, functions and appearance of the native desktop 1714. The appearance of the native desktop 1714 can be configured according to a user customization. These customizations can include the type of wallpaper displayed in the background of the desktop, or a theme that illustrates the colors of the windows and other aspects of the desktop display. As shown in FIG. 16, the virtual desktop 1716 takes up substantially the entire screen such that no part of the native desktop 1714 can be seen. Furthermore, the wallpaper and themes of the native desktop 1714 are displayed in the virtual desktop 1716.

Illustrated in FIGS. 17A-17D is an embodiment of a system for controlling one computing device 1710 with another computing device 1702. The system can include one computing device 1702 communicatively connected to another computing device 1710. At least one of the computing devices can include a display that includes icons 1718 representative of applications, and two desktops, a native desktop 1714 and a virtual desktop 1716. Each desktop can include a menu 1712 and icons 1718. The virtual desktop, in some embodiments, can display a pointer 1715 that can be displayed in multiple positions. In one embodiment, the controlling device can be a smartphone or mobile phone 1702 and the controlled device can be a table computer or other mobile computer having touch screen functionality 1710.

Further referring to FIG. 17A, and in more detail, in one embodiment the system can include a computing device 1710 that is a tablet computing device such as any tablet computing device described herein. In other embodiments, the device 1710 can be any mobile device or computer described herein. The other computing device 1702 can be any mobile computing device having touch capabilities.

The two hand-held devices 1702, 1710 can communicate over a virtual channel or communicative connection. This connection can be established using BLUETOOTH technology. In other embodiments, the connection can be established using another networking protocol.

Figure 17B:
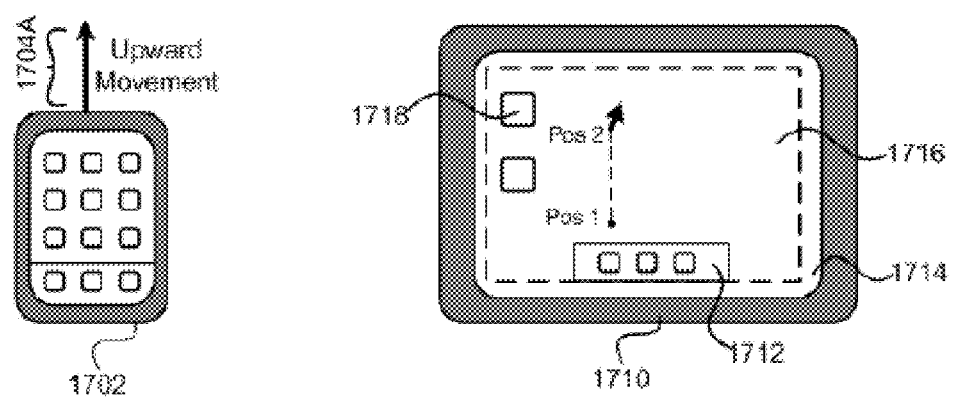

Illustrated in FIG. 17B is one embodiment of a mobile phone 1702 that moves along a direction of movement 1704A. The upward direction of movement 1704A of the one mobile phone 1702 correlates into movement of the pointer from Pos. 1 to Pos. 2. The direction of the movement of the pointer 1715 from Pos. 1 vertically to Pos. 2 corresponds to the upward direction of movement 1704A of the other mobile phone 1702. The magnitude of the pointer's displacement, in some embodiments, can also correlate to the distance which the mobile phone 1702 is moved. Thus, the mobile phone 1702 controls the magnitude and direction of movement of the pointer 1715.

Figure 17C:
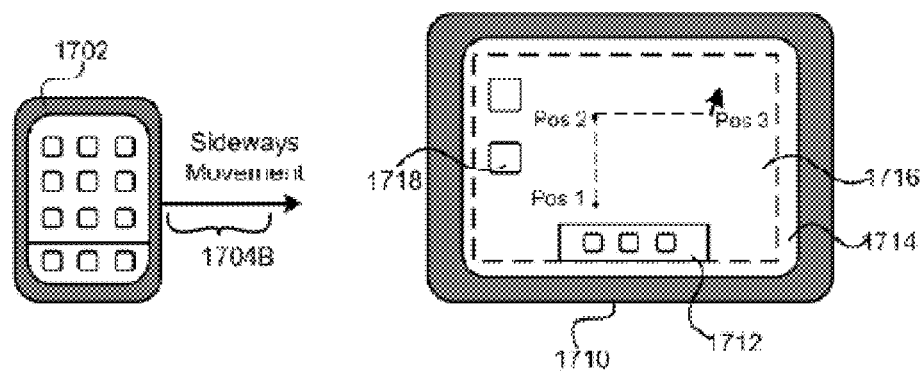

Illustrated in FIG. 17C is one embodiment of a mobile phone 1702 that moves in a sideways direction 1704B. The movement of the mobile phone 1702 translates into the movement of the pointer from Pos. 2 to Pos. 3, where Pos. 3 is a horizontal position parallel to Pos. 2. Thus, the movement of the pointer from Pos. 2 to Pos. 3 maps to the sideways movement 1704B of the mobile phone 1702.

Figure 17D:
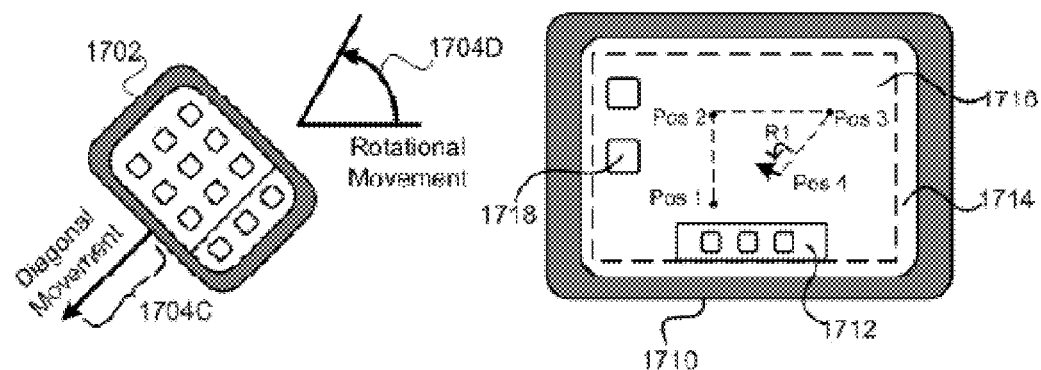

Illustrated in FIG. 17D is one embodiment of a mobile phone 1702 that moves in a diagonal movement 1704C and a rotational movement 1704D. The movement of the mobile phone 1702 translates into the movement of the pointer from Pos. 3 to Pos. 4 and the rotation of the pointer by R1 degrees/radians. Thus, the movement of the pointer from Pos. 3 to Pos. 4 maps to the diagonal movement 1704C of the mobile phone 1702, and the rotation of the pointer an angle of R1 maps to the rotational movement of the hand-held device 1702.

In one example, FIGS. 17A-17D illustrate a method for using a smartphone or other hand-held computer 1702 as a mouse to control a pointer drawn onto the screen of a tablet computing device 1710. The movement of the mobile phone 1702 translates into movement of a pointer on the screen of the tablet 1710.

Figure 18:
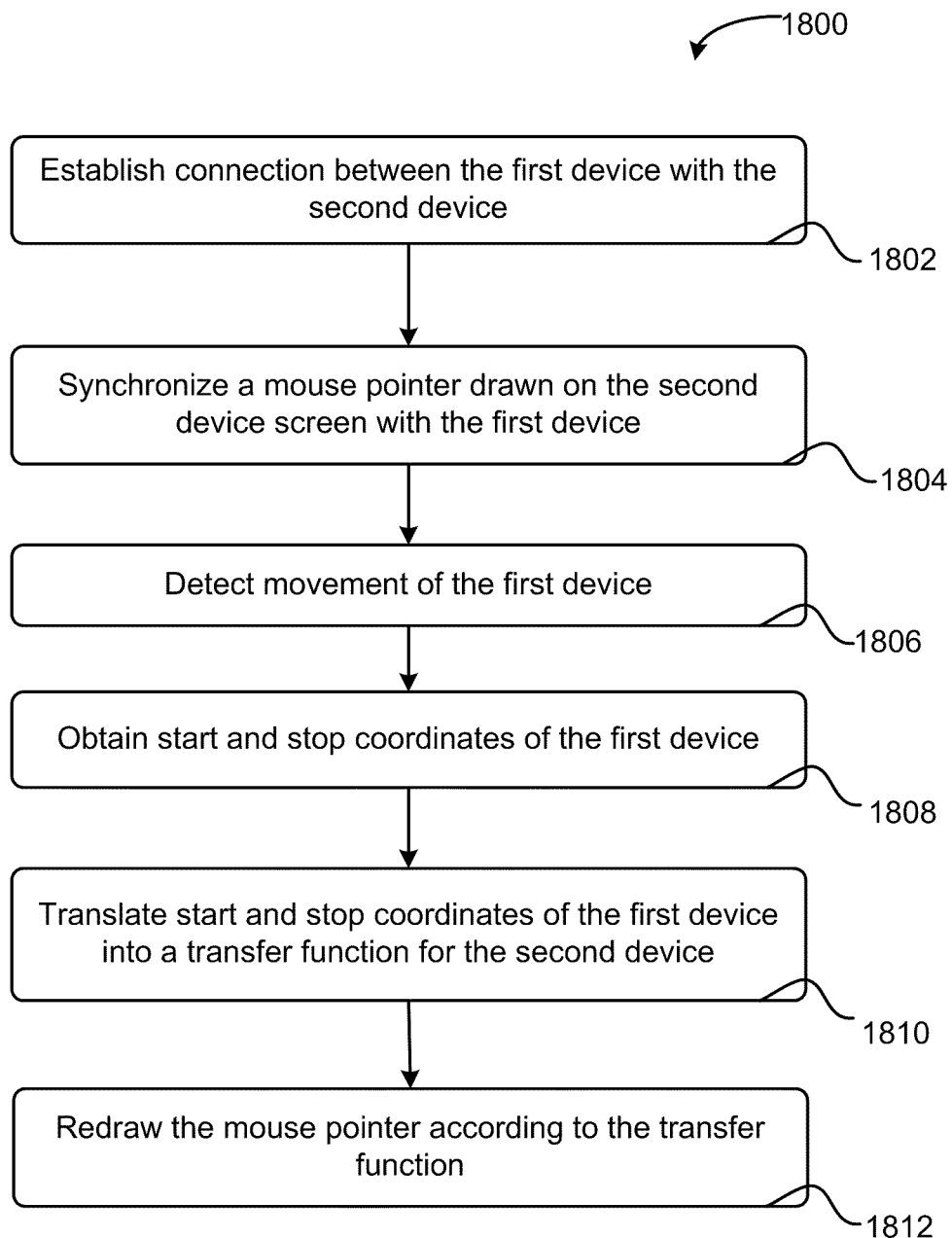
FIG. 18 is a flow diagram that illustrates an embodiment of a method for synching one hand-held device with another and using one of the devices to control the other.

Now referring to FIG. 18, in one embodiment, illustrated is a method 1800 for synching a mobile device 1702 with a tablet device 1710 and using the mobile device 1702 to control objects and a desktop displayed on the tablet device 1710. A connection between two devices, e.g. a first device and a second device, can be established (Step 1802). A mouse pointer drawn on the second device screen can be synchronized with the first device (Step 1804). An application executing on the second device can detect movement of or on the first device (Step 1806) and obtain the start and the stop coordinates of the movement (Step 1808).

The application can then translate the start and stop coordinates into a transfer function for the second device (Step 1810) and can use the transfer function to redraw the mouse pointer (Step 1812).

Further referring to FIG. 18, and in more detail, in one embodiment the method 1800 can first include establishing a connection between two different devices (Step 1802). In some embodiments, the two devices can be a first device and a second device, in other embodiments one device can be an iPhone 1702 and the other device can be an iPad 1710. In still other embodiments, the first device can be a smartphone 1702 and the second device can be a tablet computer 1710. Establishing the connection can include establishing a local network connection using BLUETOOTH or any other short-range network protocol. In other embodiments, the connection can include establishing a network connection using WI-FI or any other wireless internet protocol. In still other embodiments, the connection can be established using any of the network protocols described herein.

In some instances, a mouse pointer drawn on the screen of the tablet computer 1710 can be synchronized with movement of or on the smartphone 1702 such that the smartphone 1702 can control movement of the mouse pointer 1715 throughout the desktop of the tablet computer 1710 (Step 1804). Synchronizing the mouse pointer 1715 and the device 1702 can include synchronizing an initial position for each of the mouse pointer 1715 and the device 1702 so that any subsequent movement of or on the device 1702 can be translated into a movement of the pointer 1715. While FIG. 18 illustrates a method 1800 that includes synching the pointer 1715 and the device 1702, in other embodiments the method 1800 may not include the step of synching the pointer 1715 and the device 1702.

When movement of the smartphone 1702 (e.g. the controlling device that is controlling the movement of the pointer 1715), is detected (Step 1806), the tablet computer (e.g. the controlled device that displays the pointer 1715) can obtain the start and stop coordinates of the first device (Step 1808). In some embodiments, the controlling handheld device 1702 can execute an application that collects movement information and continuously transmits the movement information to the controlled device 1710. In other embodiments, the controlling device 1702 can issue a notification to the controlled device 1710 indicating that the controlling device 1702 changed position.

In some embodiments, the controlled device 1710 can obtain the start and stop coordinates from the controlling device 1702 to determine the direction and magnitude of movement of the controlling device 1702. In other embodiments, the controlling device 1702 can calculate a vector or transfer function representative of the magnitude and direction of movement of the controlling device 1702, and can send this vector or transfer function to the controlled device 1710. In these embodiments, the method 1800 may not include step 1810 because the transfer function will have already been calculated by the controlling device 1702.

When the controlled device 1710 obtains the start and stop coordinates of the controlling device 1702, the controlled device 1710 can then generate a vector or transfer function representative of the magnitude and direction of movement of the controlling device 1702 (Step 1810). Upon generating this vector or transfer function, the controlled device 1710 can redraw the mouse pointer 1715 on the virtual desktop 1716 (Step 1812) so that the mouse pointer 1715 moves from its initial position to a different position based on the calculated transfer function or vector. In some embodiments, this movement can reflect the magnitude and direction of movement of or on the controlling device 1702.

The movement of the controlling device 1702 can in some embodiments be the physical movement of the controlling device 1702 in a three dimensional space. In this embodiment, an accelerometer or similar sensor can be used to capture the magnitude and direction of movement of the controlling device 1702. In other embodiments, the movement of the controlling device 1702 can be the movement of an appendage or other actuator over the screen of the controlling device 1702. For example, the movement of a user's finger over the screen can be captured and translated into vectors or transfer functions representative of the finger movements. In this way, the screen of the controlling device 1702 can function as a virtual trackpad 1788.

While FIG. 18 relates to capturing the movement of a controlling device 1702, the method 1800 can also apply to capturing the movement of a user's appendage throughout a virtual trackpad 1776 displayed on a screen of a tablet computer 1710.

While certain exemplary embodiments have been described and shown in the accompanying drawings, it is to be understood that such embodiments are merely illustrative of and not restrictive on the methods and systems described herein. Additionally, it is possible to implement the methods and systems described herein or some of its features in hardware, programmable devices, firmware, software or a combination thereof. The methods and systems described herein or parts of the methods and systems described herein may also be embodied in a processor-readable storage medium or machine-readable medium such as a magnetic (e.g., hard drive, floppy drive), optical (e.g., compact disk, digital versatile disk, etc), or semiconductor storage medium (volatile and non-volatile).

What is claimed is:

1. A method for interacting with a remote application displayed within a virtual desktop on a tablet computing device using a mouse pointer, the method comprising:
   locally executing a virtual desktop on a tablet computing device executing an operating system that generates and displays a native desktop, wherein the tablet computing device operating system does not contemplate a mouse pointer;
   displaying the virtual desktop within a context of the native desktop such that the virtual desktop appears to be the native desktop;
   displaying a mouse pointer within the virtual desktop;
   receiving, by the virtual desktop, a request from a user of the tablet computing device to execute a remote application within a context of the virtual desktop;
   transmitting, by the virtual desktop, the received user request to a remote server over a virtual channel, wherein the remote server, in response to receiving the user request, executes the remote application and transmits application output generated by the remote application to the tablet computing device;
   displaying the received application output in an application output window displayed within a context of the virtual desktop; and
   interacting with the remote application within the virtual desktop on the tablet computing device using the mouse pointer, the mouse pointer drawn in the virtual desktop by the remote application.

2. The method of claim 1, further comprising displaying icons representative of remote applications within the virtual desktop.

3. The method of claim 2, wherein the remote applications corresponding to the displayed icons are not available within the native desktop.

4. The method of claim 2, wherein displaying icons representative of remote applications within the virtual desktop further comprises:
receiving from the remote server a list of user applications corresponding to the user of the tablet computing device;
displaying application icons on the virtual desktop, each application icon corresponding to a listed user application.

5. The method of claim 1, wherein locally executing the virtual desktop further comprises executing a virtual desktop that comprises one or more customizations of the native desktop.

6. The method of claim 5, wherein executing a virtual desktop that comprises one or more customizations further comprises displaying a wallpaper of the native desktop on a background of the virtual desktop.

7. The method of claim 5, wherein executing a virtual desktop that comprises one or more customizations further comprises displaying elements within the virtual desktop according to a theme of the native desktop.

8. The method of claim 1, further comprising controlling the mouse pointer with a virtual trackpad.

9. The method of claim 8, wherein the virtual trackpad comprises an interactive image of a trackpad displayed within the virtual desktop.

10. The method of claim 1, further comprising controlling the mouse pointer with an external input device.

11. The method of claim 10, wherein the external input device comprises a virtual trackpad.

12. A method for interacting with a remote application displayed within a virtual desktop using a mouse pointer, the method comprising:
locally executing a virtual desktop on a tablet computing device executing an operating system that generates and displays a native desktop, and that does not contemplate a mouse pointer;
displaying the virtual desktop within a context of the native desktop such that the virtual desktop appears to be the native desktop;
displaying a mouse pointer within the virtual desktop, wherein a user of the tablet computing device controls the mouse pointer using an interactive trackpad displayed within the virtual desktop;
receiving, by the virtual desktop, a request from the user to execute a remote application within a context of the virtual desktop;
transmitting, by the virtual desktop, the received user request to a remote server over a virtual channel, wherein the remote server, in response to receiving the user request, executes the remote application and transmits application output generated by the remote application to the tablet computing device;
displaying the received application output in an application output window displayed within a context of the virtual desktop; and
interacting with the remote application within the virtual desktop on the tablet computing device using the mouse pointer, the mouse pointer drawn in the virtual desktop by the remote application.

13. The method of claim 12, further comprising displaying icons representative of remote applications within the virtual desktop.

14. The method of claim 13, wherein displaying icons representative of remote applications within the virtual desktop further comprises:
receiving from the remote server a list of user applications corresponding to the user of the tablet computing device;
displaying application icons on the virtual desktop, each application icon corresponding to a listed user application.

15. A system for interacting with a remote application displayed within a virtual desktop using a mouse pointer, the system comprising:
a tablet computing device executing an operating system that generates and displays a native desktop, wherein the tablet computing device operating system does not contemplate a mouse pointer;
a virtual desktop, generated by a virtual desktop application, displayed within a context of the native desktop such that the virtual desktop appears to be the native desktop, wherein the virtual desktop comprises a mouse pointer; and
the virtual desktop application locally executing on the tablet computing device to:
receive a request from a user of the tablet computing device to execute a remote application within a context of the virtual desktop,
transmit the received user request to a remote server over a virtual channel, receive application output generated by the remote application executing on the server,
display the received application output in an application output window displayed within a context of the virtual desktop, and
interact with the remote application within the virtual desktop on the tablet computing device using the mouse pointer, the mouse pointer drawn in the virtual desktop by the remote application.

16. The system of claim 15, wherein the virtual desktop further comprises a virtual trackpad.

17. The system of claim 16, wherein a user controls movement of the mouse pointer using the virtual trackpad.

18. The system of claim 17, wherein controlling the movement of the mouse pointer further comprises capturing user input from the virtual trackpad and repositioning the mouse pointer according to the captured user input.

19. The system of claim 15, wherein the virtual desktop further comprises icons representative of remote applications.

20. The system of claim 15, wherein the remote server, in response to receiving the user request, executes the remote application.

* * * * *